(12) United States Patent
Chang et al.

(10) Patent No.: US 11,846,826 B2
(45) Date of Patent: Dec. 19, 2023

(54) IMAGING LENS ASSEMBLY MODULE, CAMERA MODULE AND ELECTRONIC DEVICE

(71) Applicant: LARGAN PRECISION CO., LTD., Taichung (TW)

(72) Inventors: Lin-An Chang, Taichung (TW); Ming-Ta Chou, Taichung (TW); Shu-Yun Yang, Taichung (TW); Cheng-Feng Lin, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 342 days.

(21) Appl. No.: 17/249,182

(22) Filed: Feb. 23, 2021

(65) Prior Publication Data
US 2021/0364731 A1    Nov. 25, 2021

Related U.S. Application Data

(60) Provisional application No. 63/027,390, filed on May 20, 2020.

(51) Int. Cl.
*G02B 7/09* (2021.01)
*G02B 7/02* (2021.01)
(Continued)

(52) U.S. Cl.
CPC ............... *G02B 7/09* (2013.01); *G02B 7/021* (2013.01); *G02B 27/646* (2013.01); *G03B 5/00* (2013.01);
(Continued)

(58) Field of Classification Search
None
See application file for complete search history.

(56) References Cited

U.S. PATENT DOCUMENTS

| 8,416,508 B2 | 4/2013 | Saori et al. |
| 9,400,383 B2 | 7/2016 | Liang |

(Continued)

FOREIGN PATENT DOCUMENTS

| CN | 102445749 A | 5/2012 |
| CN | 209674168 U | 11/2019 |
| CN | 210119621 U | 2/2020 |

*Primary Examiner* — Stephone B Allen
*Assistant Examiner* — Tamara Y. Washington
(74) *Attorney, Agent, or Firm* — McClure, Qualey & Rodack, LLP

(57) ABSTRACT

An imaging lens assembly module includes an imaging lens element set, a lens carrier and a light blocking structure. The imaging lens element set has an optical axis. At least one lens element of the lens elements is disposed in the lens carrier. The light blocking structure includes a light blocking opening. The optical axis passes through the light blocking opening, and the light blocking opening includes at least two arc portions and a shrinking portion. Each of the arc portions has a first curvature radius for defining a maximum diameter of the light blocking opening. The shrinking portion is connected to the arc portions for forming the light blocking opening into a non-circular shape. The shrinking portion includes at least one protruding arc which extends and shrinks gradually from the shrinking portion to the optical axis, and the protruding arc has a second curvature radius.

19 Claims, 42 Drawing Sheets

(51) Int. Cl.
*G03B 13/36* (2021.01)
*G03B 5/00* (2021.01)
*G03B 30/00* (2021.01)
*G02B 27/64* (2006.01)

(52) U.S. Cl.
CPC .............. *G03B 13/36* (2013.01); *G03B 30/00* (2021.01); *G03B 2205/0007* (2013.01)

(56) References Cited

U.S. PATENT DOCUMENTS

| | | |
|---|---|---|
| 10,082,649 B2 | 9/2018 | Park et al. |
| 10,228,497 B2 | 3/2019 | Chou et al. |
| 10,436,954 B2 | 10/2019 | Shih et al. |
| 10,473,879 B2 | 11/2019 | Choi et al. |
| 10,841,471 B1 | 11/2020 | Chang et al. |
| 2017/0269457 A1 | 9/2017 | Tang et al. |
| 2020/0310074 A1 | 10/2020 | Wu et al. |
| 2021/0364725 A1* | 11/2021 | Chang .................... G03B 11/04 |

* cited by examiner

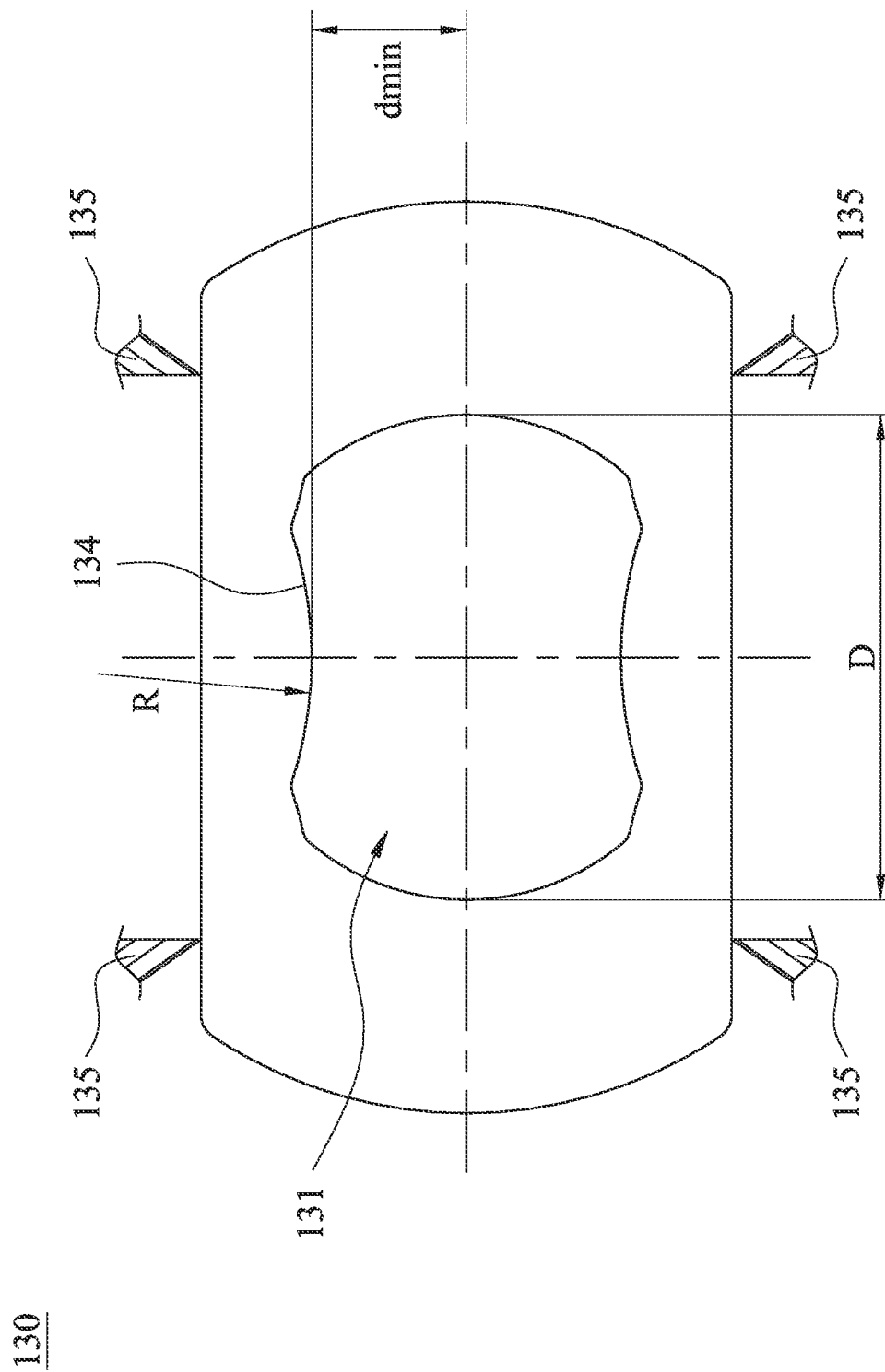

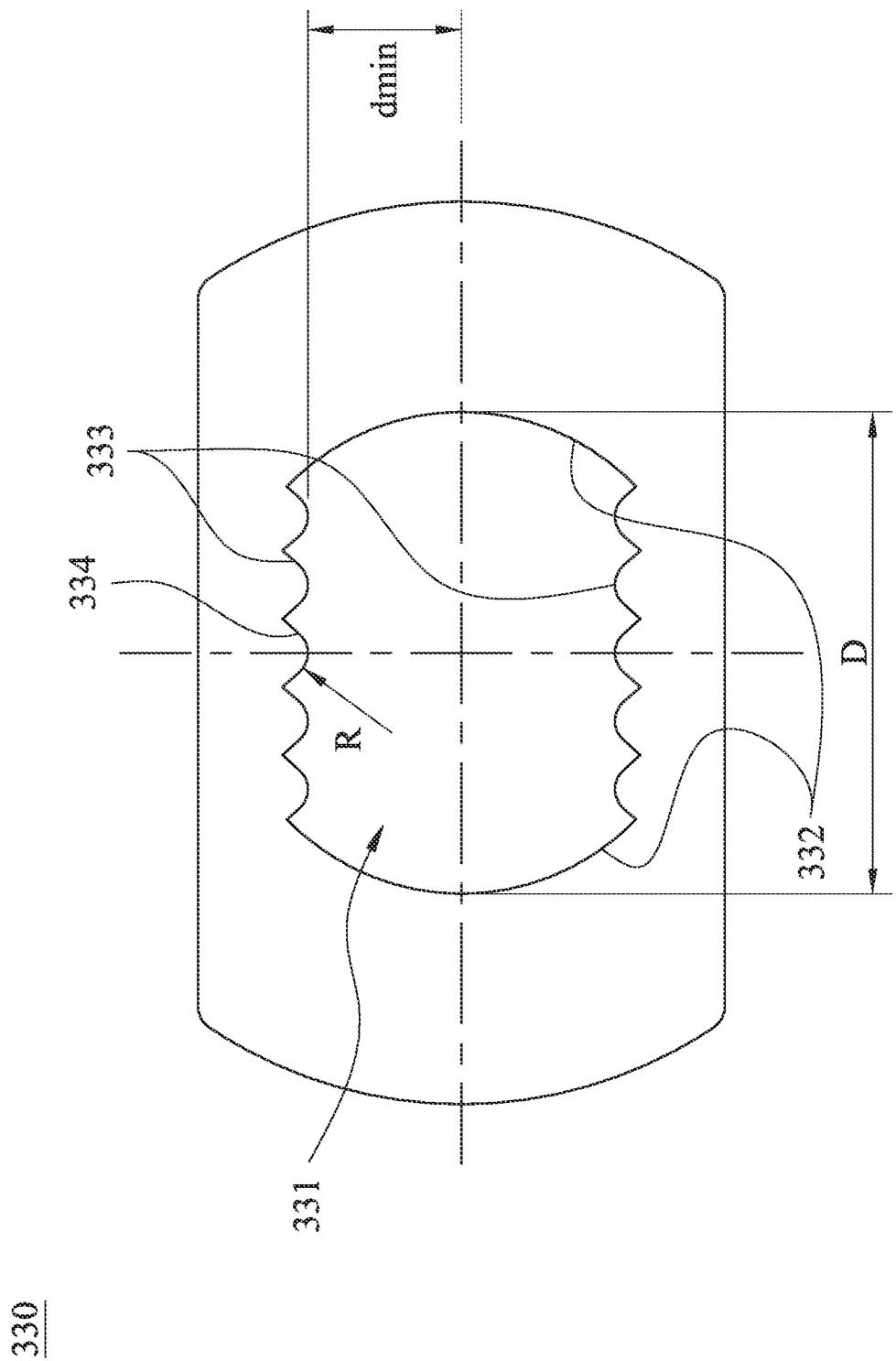

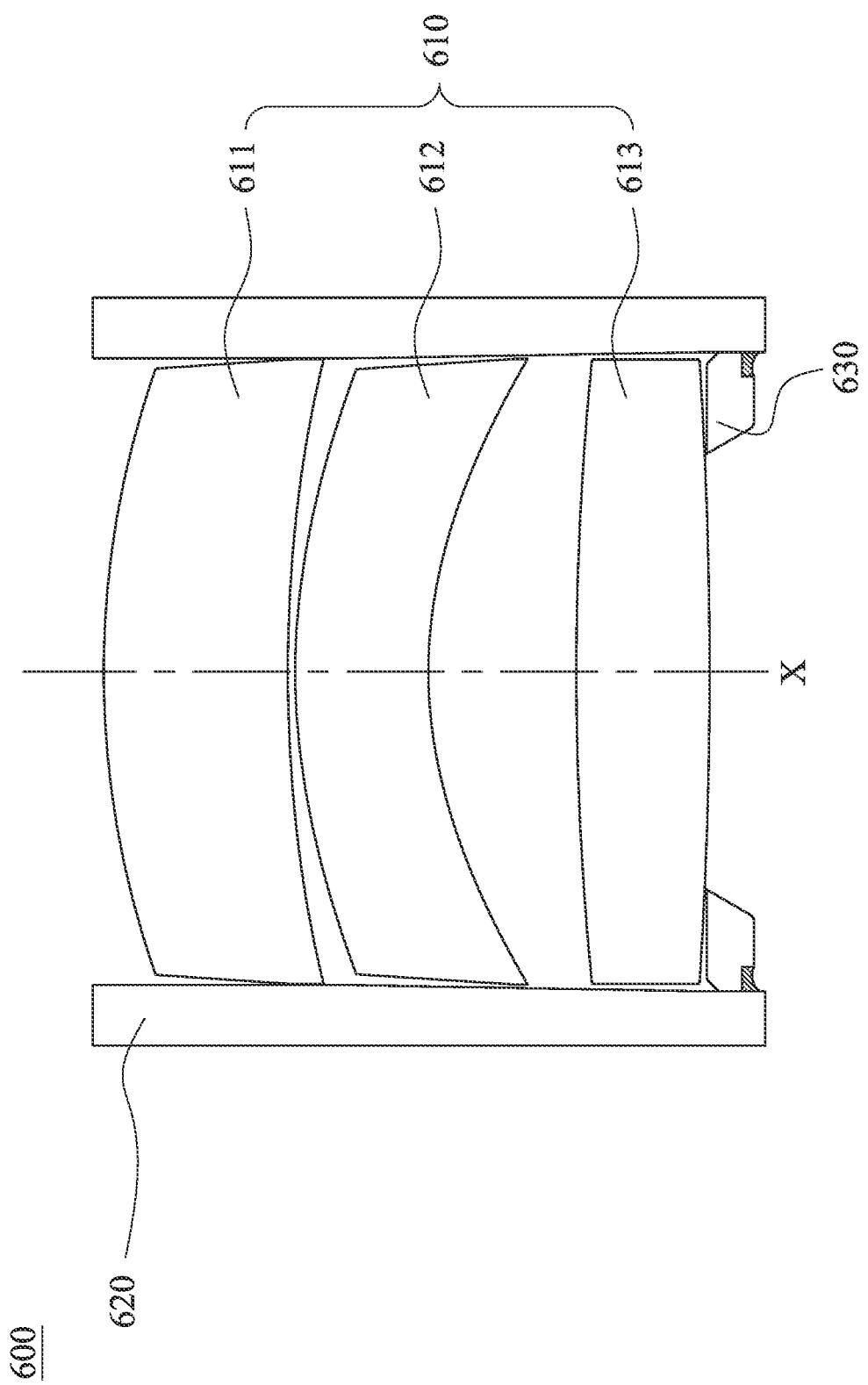

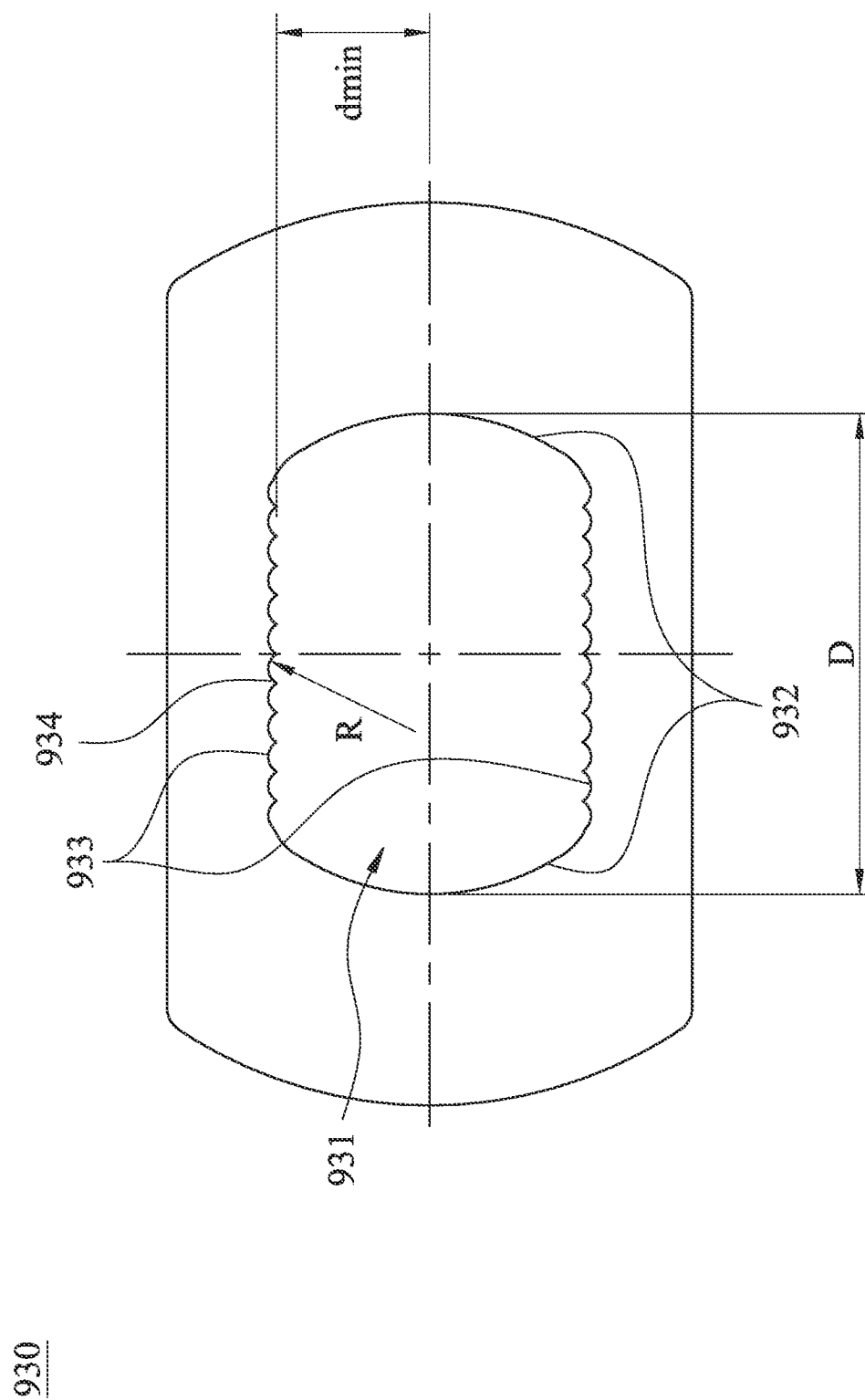

IMAGING LENS ASSEMBLY MODULE, CAMERA MODULE AND ELECTRONIC DEVICE

RELATED APPLICATIONS

This application claims priority to U.S. Provisional Application Ser. No. 63/027,390, filed May 20, 2020, which is herein incorporated by reference.

BACKGROUND

Technical Field

The present disclosure relates to an imaging lens assembly module and a camera module. More particularly, the present disclosure relates to an imaging lens assembly module and a camera module applied in portable electronic devices.

Description of Related Art

In recent years, portable electronic devices, such as intelligent electronic devices, tablets, etc., are developed rapidly and have been filled with the lives of modern people. Accordingly, the camera module and the imaging lens assembly module which are disposed on the portable electronic device are also flourished. However, as technology is more and more advanced, demands for the quality of the imaging lens assembly module from users have become higher and higher. Therefore, developing an imaging lens assembly module which can decrease a possibility of generating a stray light and maintain the better image quality becomes an important and solving problem in industry.

SUMMARY

According to one aspect of the present disclosure, an imaging lens assembly module includes an imaging lens element set, a lens carrier and a light blocking structure. The imaging lens element set includes a plurality of lens elements and has an optical axis. At least one lens element of the lens elements is disposed in the lens carrier. The light blocking structure is located on an image side of the at least one lens element and includes a light blocking opening. The optical axis passes through the light blocking opening, and the light blocking opening includes at least two arc portions and a shrinking portion. Each of the at least two arc portions has a first curvature radius which is for defining a maximum diameter of the light blocking opening. The shrinking portion is connected to the at least two arc portions for forming the light blocking opening into a non-circular shape. The shrinking portion includes at least one protruding arc which extends and shrinks gradually from the shrinking portion to the optical axis, and the at least one protruding arc has a second curvature radius. The maximum diameter of the light blocking opening is D, the second curvature radius of the protruding arc is R, and the following condition is satisfied: $0.01 < R/D < 3$.

According to one aspect of the present disclosure, an imaging lens assembly module includes an imaging lens elements set, a lens carrier and a light blocking structure. The imaging lens element set includes a plurality of lens elements and has an optical axis. At least one lens element of the lens elements is disposed in the lens carrier. The light blocking structure is located on an image side of the at least one lens element and includes a light blocking opening. The optical axis passes through the light blocking opening, and the light blocking opening includes at least two arc portions and a shrinking portion. Each of the at least two arc portions has a first curvature radius which is for defining a maximum diameter of the light blocking opening. The shrinking portion is connected to the at least two arc portions and includes at least one protruding arc which extends and shrinks gradually from the shrinking portion to the optical axis, and the at least one protruding arc has a second curvature radius. The maximum diameter of the light blocking opening is D, a cross-sectional area of the light blocking opening is A, and the following condition is satisfied: $0.30 < A/[\pi \times (D/2)^2] < 0.95$, wherein $\pi$ is a ratio of a circumference of a circle to a diameter of the circle.

According to one aspect of the present disclosure, a camera module includes the imaging lens assembly module of the aforementioned aspect and an image sensor. The image sensor is disposed on an image surface of the imaging lens assembly module.

According to one aspect of the present disclosure, an electronic device includes the camera module of the aforementioned aspect.

BRIEF DESCRIPTION OF THE DRAWINGS

The present disclosure can be more fully understood by reading the following detailed description of the embodiment, with reference made to the accompanying drawings as follows:

FIG. 3F is a schematic view of the parameters of the light blocking structure according to the 3rd embodiment in FIG. 3A.

FIG. 6B is another schematic view of the imaging lens assembly module according to the 6th embodiment in FIG. 6A.

FIG. 9 is a schematic view of a light blocking structure according to the 9th embodiment of the present disclosure.

FIG. 10 is a schematic view of a light blocking structure according to the 10th embodiment of the present disclosure.

DETAILED DESCRIPTION

Figure 1A:
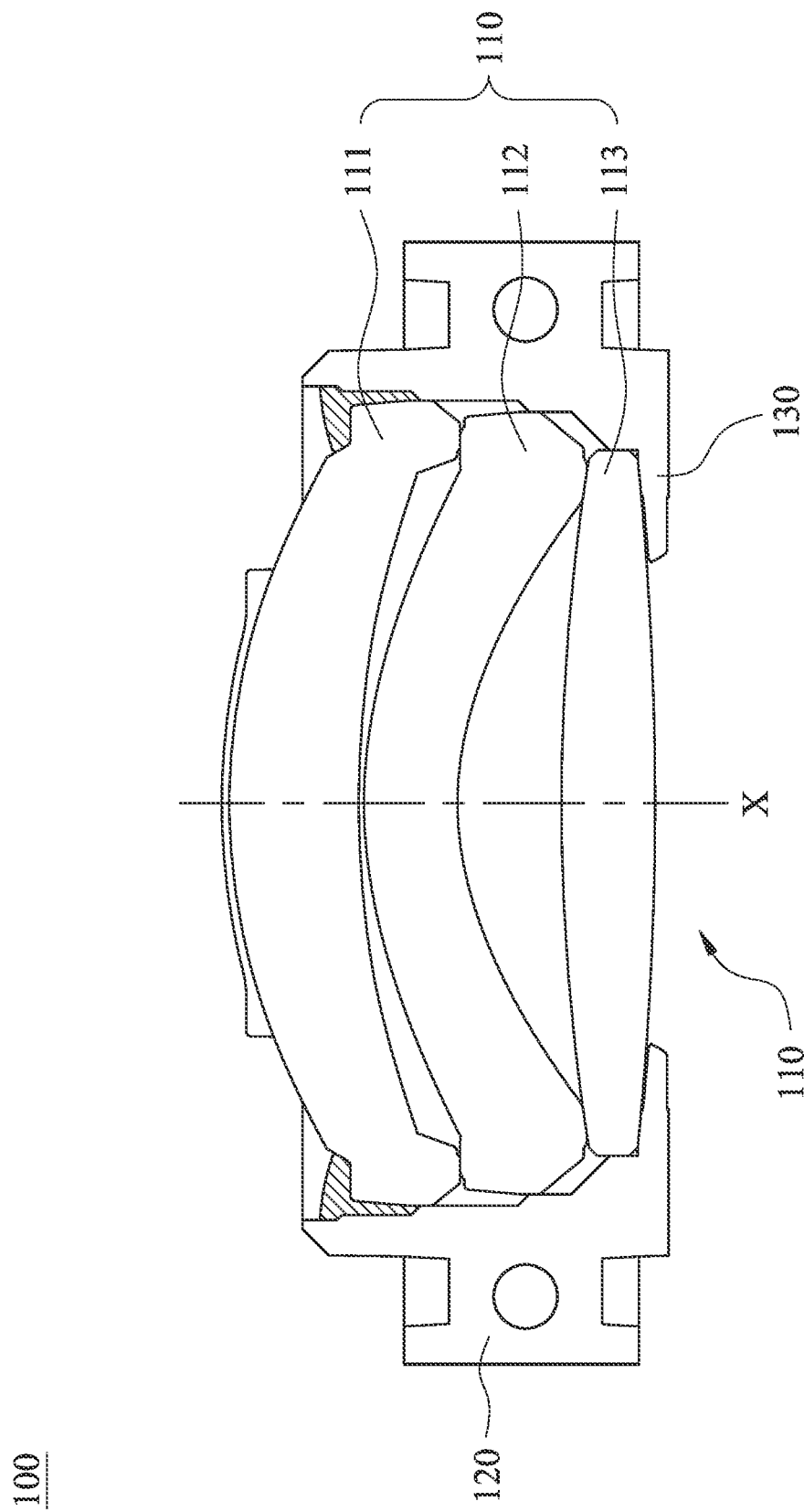
FIG. 1A is a schematic view of an imaging lens assembly module according to the 1st embodiment of the present disclosure.

The present disclosure provides an imaging lens assembly module, and the imaging lens assembly module includes an imaging lens element set, a lens carrier and a light blocking structure. The imaging lens element set includes a plurality of lens elements and has an optical axis. At least one lens element of the lens elements is disposed in the lens carrier. The light blocking structure is located on an image side of the lens elements and includes a light blocking opening, and the optical axis passes through the light blocking opening. The light blocking opening includes at least two arc portions and a shrinking portion. Each of the at least two arc portions has a first curvature radius, and the first curvature radius is for defining a maximum diameter of the light blocking opening. The shrinking portion is connected to the at least two arc portions and includes at least one protruding arc which extends and shrinks gradually from the shrinking portion to the optical axis, wherein the protruding arc has a second curvature radius. In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Hence, according to the present disclosure, a possibility of the stray light generated by the light blocking opening is decreased and the better image quality is maintained via a design of the light blocking opening, and an intensity of a light diffraction can be decreased via the protruding arc.

Furthermore, the lens carrier can be a lens barrel or a plastic injection-molded member where a driver is disposed, wherein the lens carrier can be any structure which can carry the lens elements, but the present disclosure is not limited thereto. The light blocking structure can be a light blocking sheet, a spacer, a retainer, a lens carrier or a metal light blocking sheet, but the present disclosure is not limited thereto.

The arc portions can be arranged relatively along the optical axis as a center. The shrinking portion is connected to the arc portions for forming an opening at a center of the light blocking structure, and the light blocking opening is formed into a non-circular shape. Moreover, the protruding arc can be a convex-shape arc or a shrinking protrusion made of concave arcs, but the present disclosure is not limited thereto. Specifically, the protruding arc can further be a convex light blocking structure formed by one of a concave arc having a curvature radius and a convex arc having a curvature radius.

The first curvature radius of the arc portion is R', the maximum diameter of the light blocking opening is D, and the center of the light blocking opening is a center point of the first curvature radius of the arc portion. Thus, the maximum diameter of the light blocking opening is twice the first curvature radius of the arc portion, that is, D=2R'.

The light blocking structure can be an aperture stop of the imaging lens assembly module for controlling an amount of an incident light of the imaging lens assembly module. Hence, it is favorable for increasing an efficiency of eliminating the stray light.

The light blocking structure can be a light blocking sheet mounted on the lens carrier, wherein the assembling can be a assembling via overlaying elements, an adhesion via spot gluing, arrangement of spatial mechanisms and so on, but the present disclosure is not limited thereto. Hence, it is favorable for assembling and does not occupy too much the space.

The light blocking structure can be a black plastic element and includes at least two gate traces. Hence, it is favorable for providing an opening structure in a high accuracy and increasing the yield rate of the products.

The light blocking structure and the lens carrier can be made of plastic material and formed integrally. Hence, it is favorable for simplifying a procedure of manufacturing so as to promote the production.

The imaging lens assembly module can further include at least one reflecting element, wherein the reflecting element is located on at least one side of an object side and an image side of the imaging lens assembly module. Hence, it is favorable for a space usage of a miniaturized lens assembly to achieve more efficient arrangement.

The imaging lens assembly module can further include a driving device, wherein the driving device is for driving the imaging lens element set and the light blocking structure to move simultaneously along at least one direction. Specifically, the driving device can be a voice coil motor, a piezoelectric motor or a microelectromechanical systems (MEMS) actuator, but the present disclosure is not limited thereto. Hence, it is favorable for achieving an autofocus or image stabilizing function.

When the maximum diameter of the light blocking opening is D, and the second curvature radius of the protruding arc is R, the following condition is satisfied: $0.01<R/D<3$. Specifically, the aforementioned range of values is a more ideal range which is inductive of a consideration for a size and a manufacturability of the light blocking opening.

When the maximum diameter of the light blocking opening is D, and a cross-sectional area of the light blocking opening is A, the following condition is satisfied: $0.30<A/[\pi\times(D/2)^2]<0.95$, wherein $\pi$ is a ratio of a circumference of a circle to a diameter of the circle. Hence, it is favorable for achieving the more ideal image quality. Further, the following condition can be satisfied: $0.50<A/[\pi\times(D/2)^2]<0.90$, wherein $\pi$ is the ratio of the circumference of the circle to the diameter of the circle. Hence, it is favorable for having better image quality under the more strict exposure condition in a real shot environment.

When the maximum diameter of the light blocking opening is D, and a minimum distance between the protruding arc and a center of the light blocking opening is dmin, the following condition can be satisfied: $0.20<dmin/D<0.45$. Specifically, an appearance of the light blocking opening is an I-cut shrinking shape. Hence, it is favorable for providing a feasibility of the miniaturization of the imaging lens assembly module. Further, the following condition can be satisfied: $0.25<dmin/D<0.40$. Hence, it is favorable for obtaining a more balanced size range between a shrinking quantity of the light blocking opening and a sharpness of the image.

When a number of the lens elements of the imaging lens element set is N, the following condition can be satisfied: $3\leq N\leq 8$. Hence, it is favorable for providing the better resolving power.

When a maximum field of view of the imaging lens assembly module is FOV, the following condition can be satisfied: 3 degrees$\leq$FOV$\leq$40 degrees. Specifically, it is favorable for a telephoto lens assembly with a high magnification ratio. Hence, an image capturing in a small visual field can be provided.

Each of the aforementioned features of the imaging lens assembly module of the present disclosure can be utilized in various combinations for achieving the corresponding effects.

The present disclosure provides a camera module, and the camera module includes the aforementioned imaging lens assembly module and an image sensor, wherein the image sensor is disposed on an image surface of the imaging lens assembly module.

The present disclosure provides an electronic device, and the electronic device includes the aforementioned camera module.

According to the above description of the present disclosure, the following specific embodiments are provided for further explanation.

1st Embodiment

Figure 1B:
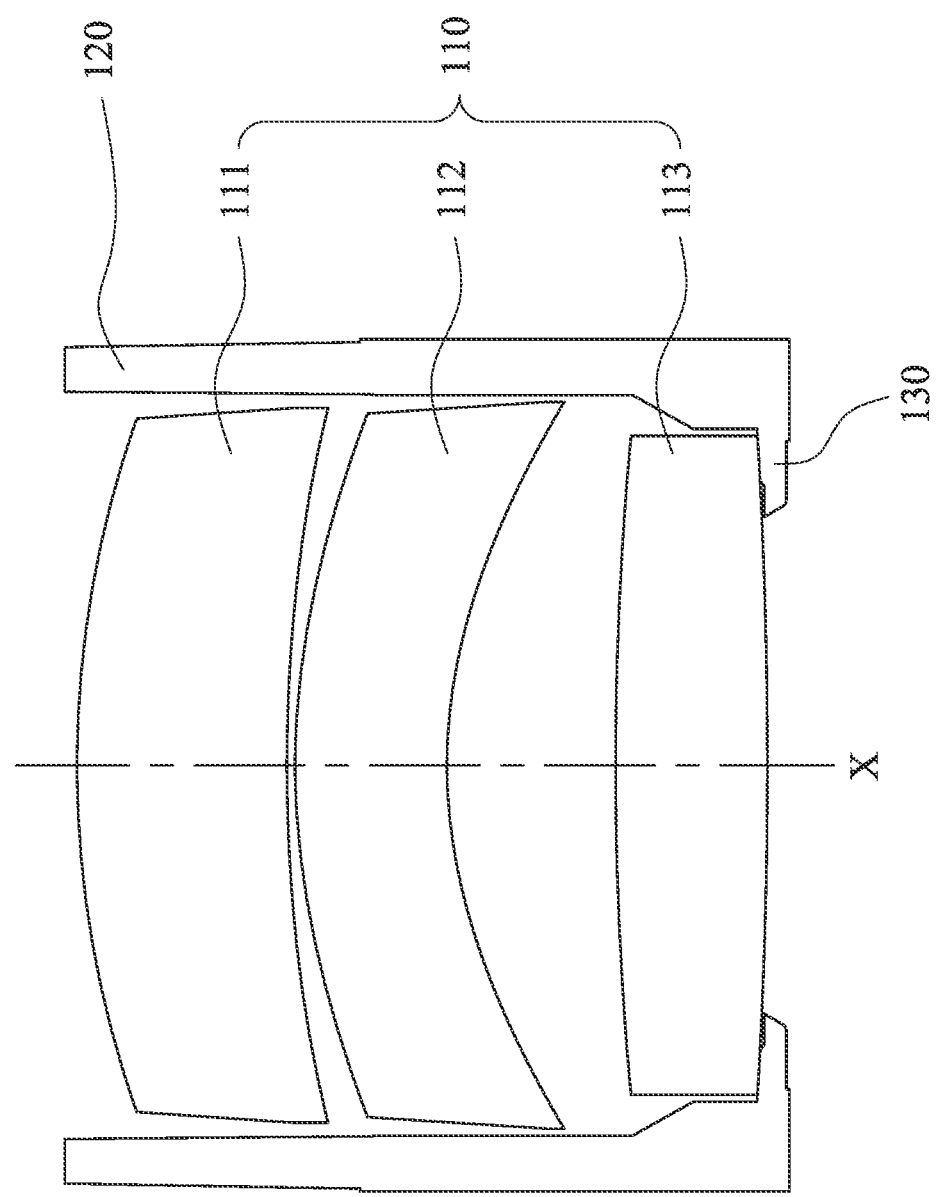
FIG. 1B is another schematic view of the imaging lens assembly module according to the 1st embodiment in FIG. 1A.
Figure 1C:
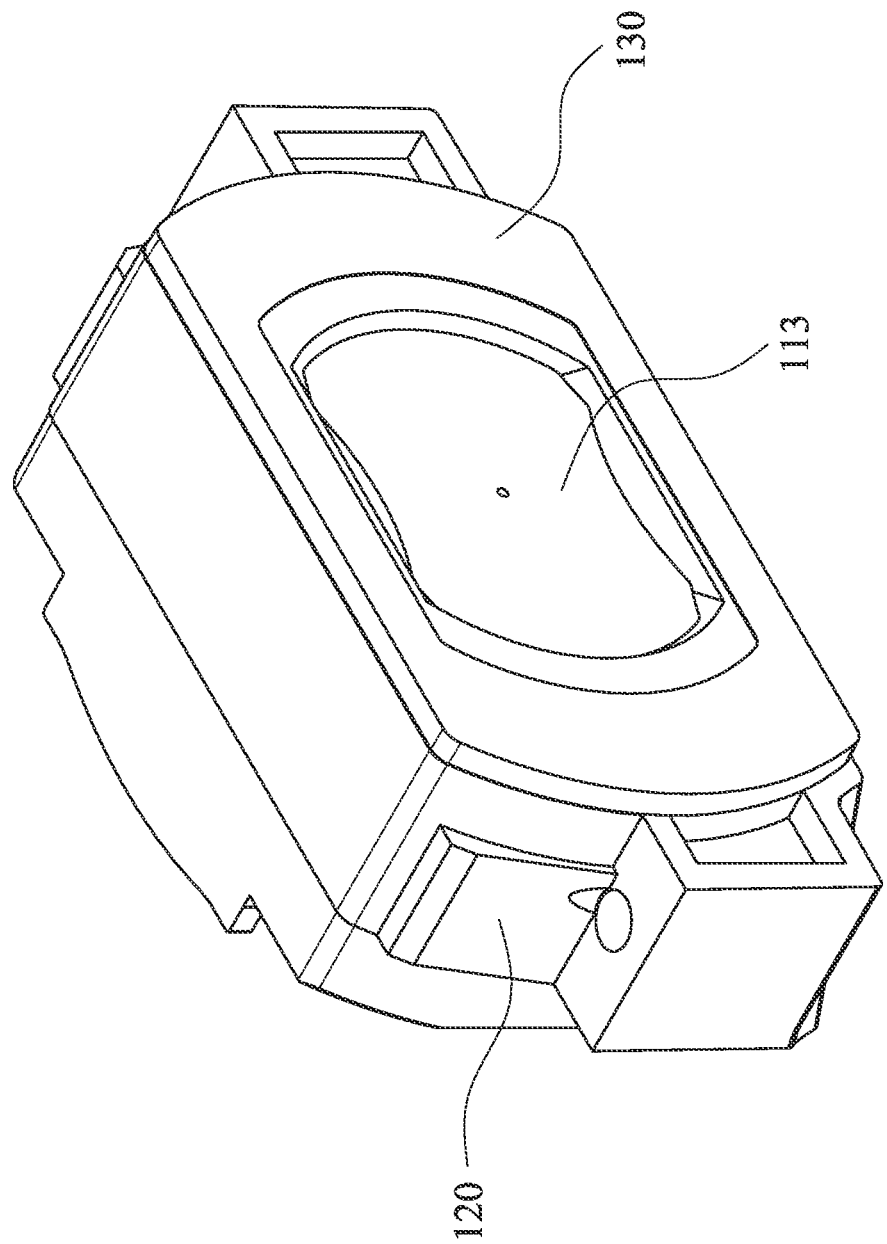
FIG. 1D is an exploded view of the imaging lens assembly module according to the 1st embodiment in FIG. 1A.
FIG. 1E is a schematic view of a light blocking structure according to the 1st embodiment in FIG. 1A.
FIG. 1F is a schematic view of the parameters of the light blocking structure according to the 1st embodiment in FIG. 1A.
Figure 1D:
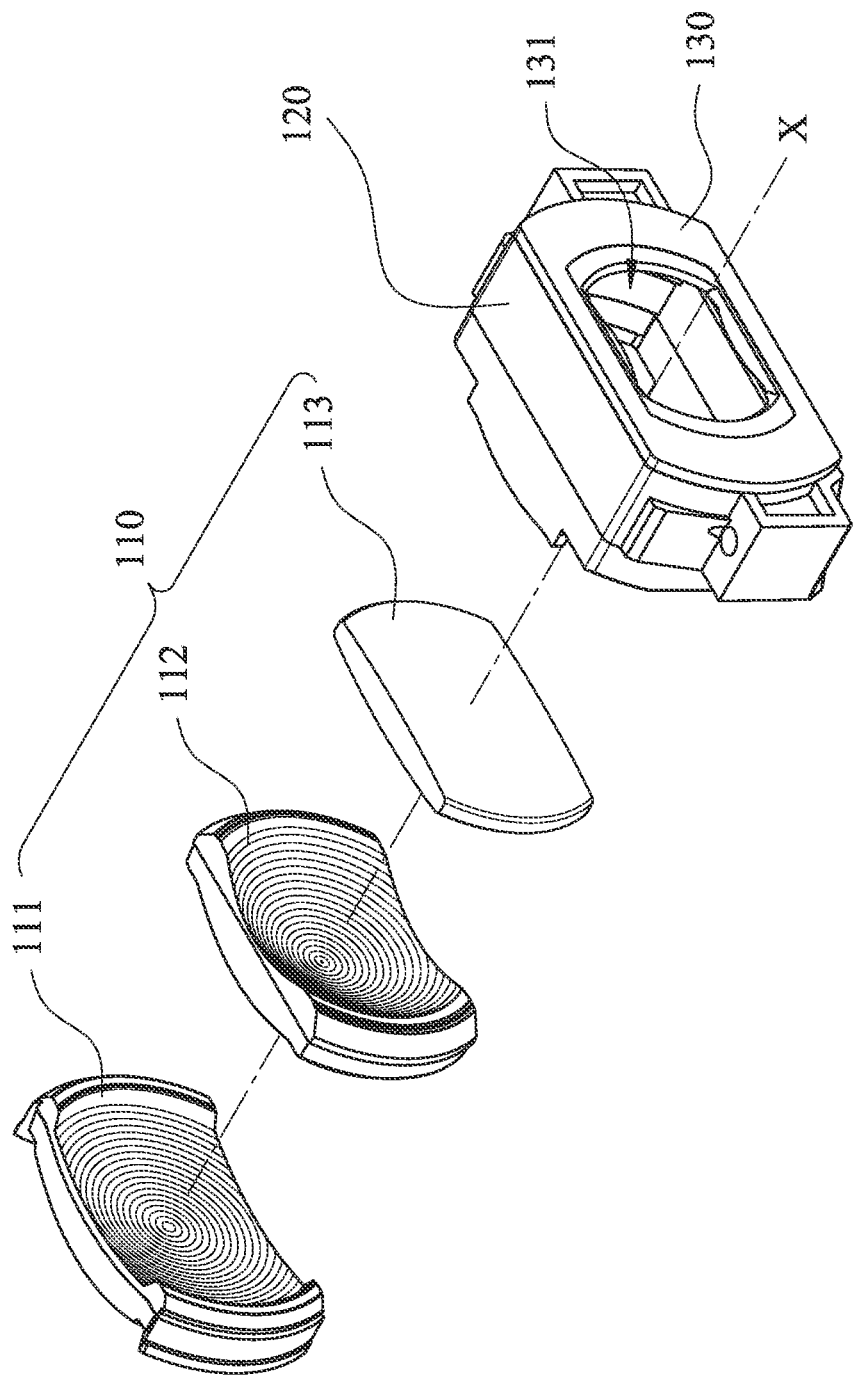

FIG. 1A is a schematic view of an imaging lens assembly module 100 according to the 1st embodiment, FIG. 1B is another schematic view of the imaging lens assembly module 100 according to the 1st embodiment in FIG. 1A, FIG. 1O is a three-dimensional schematic view of the imaging lens assembly module 100 according to the 1st embodiment in FIG. 1A, and FIG. 1D is an exploded view of the imaging lens assembly module 100 in FIG. 1A according to the 1st embodiment of the present disclosure. In FIG. 1A to FIG. 1D, the imaging lens assembly module 100 includes an imaging lens element set 110, a lens carrier 120 and a light blocking structure 130.

The imaging lens element set 110 includes a plurality of lens elements and has an optical axis X. In the 1st embodiment, the imaging lens element set 110 from an object side to an image side includes a first lens element 111, a second lens element 112 and a third lens element 113.

At least one lens element of the lens elements of the imaging lens element set 110 is disposed in the lens carrier 120, and the light blocking structure 130 is located on an image side of the lens elements. In the 1st embodiment, the first lens element 111, the second lens element 112 and the third lens element 113 are disposed in the lens carrier 120, and the light blocking structure 130 is located on an image side of the third lens element 113.

Furthermore, the lens carrier 120 can be a lens barrel or a plastic injection-molded member where a driver is disposed, wherein the lens carrier 120 can be any structure which can carry the lens elements, but the present disclosure is not limited thereto.

The light blocking structure 130 can be a light blocking sheet, a spacer, a retainer, a lens carrier or a metal light blocking sheet, but the present disclosure is not limited thereto. In the 1st embodiment, the light blocking structure 130 is a black plastic element. Hence, it is favorable for providing an opening structure in a high accuracy and increasing the yield rate of the products. Simultaneously, the light blocking structure 130 and the lens carrier 120 can be made of plastic material and formed integrally. Hence, it is favorable for simplifying a procedure of manufacturing so as to promote the production. The light blocking structure 130 can be an aperture stop of the imaging lens assembly module 100 for controlling an amount of an incident light of the imaging lens assembly module 100. Hence, it is favorable for increasing an efficiency of eliminating the stray light.

Figure 1E:
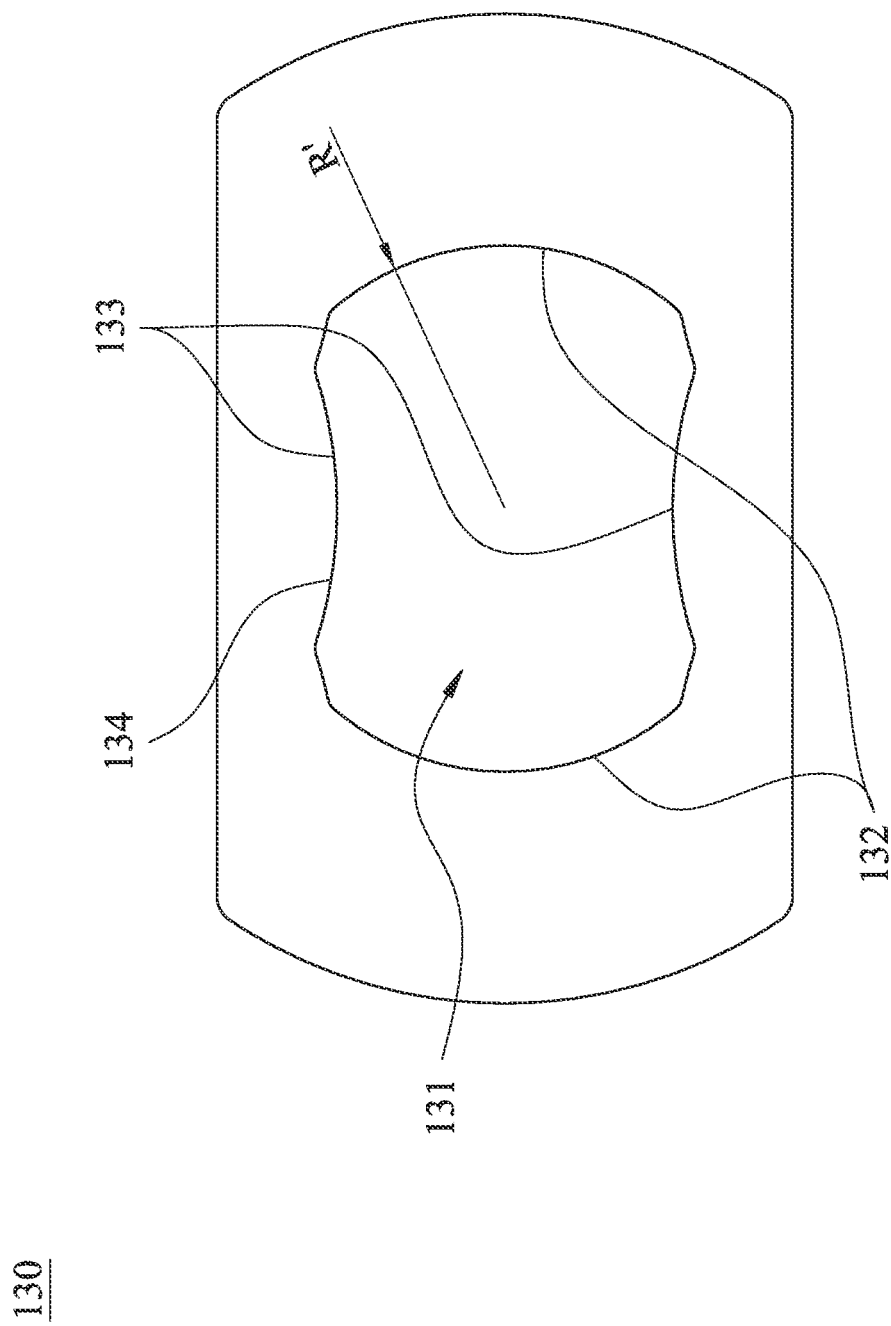

FIG. 1E is a schematic view of the light blocking structure 130 according to the 1st embodiment in FIG. 1A, and FIG. 1F is a schematic view of the parameters of the light blocking structure 130 according to the 1st embodiment in FIG. 1A. In FIG. 1E and FIG. 1F, the light blocking structure 130 includes a light blocking opening 131, and the optical axis X passes through the light blocking opening 131. The light blocking opening 131 includes at least two arc portions 132, a shrinking portion 133 and at least two gate traces 135, and the light blocking opening 131 forms an opening at a center of the light blocking structure 130. Each of the at least two arc portions 132 has a first curvature radius, and the first curvature radius is for defining a maximum diameter of the light blocking opening 131. The arc portions 132 can be arranged relatively along the optical axis X as a center. The shrinking portion 133 is connected to the arc portions 132 for forming the light blocking opening 131 into a non-circular shape, and the shrinking portion 133 includes at least one protruding arc 134. The protruding arc 134 extends and shrinks gradually from the shrinking portion 133 to the optical axis X, and the protruding arc 134 has a second curvature radius. In the 1st embodiment, a number of the arc portions 132 is two, a number of the gate traces 135 is four, a number of the at least one protruding arc 134 is two, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 1st embodiment, a possibility of the stray light generated by the blocking opening 131 is decreased and the better image quality is maintained via a design of the light blocking opening 131. Moreover, an intensity of a light diffraction can be decreased via the protruding arc 134.

The protruding arc 134 can be a convex-shape arc or a shrinking protrusion made of concave arcs, but the present disclosure is not limited thereto. Specifically, the protruding arc 134 can further be a convex light blocking structure formed by one of a concave arc having a curvature radius and a convex arc having a curvature radius.

In FIG. 1F, when the maximum diameter of the light blocking opening 131 is D, the second curvature radius of the protruding arc 134 is R, a cross-sectional area of the light blocking opening 131 is A, a minimum distance between the protruding arc 134 and a center of the light blocking opening 131 is dmin, a maximum field of view of the imaging lens assembly module 100 is FOV, and a number of the lens elements of the imaging lens element set 110 is N, wherein $\pi$ is a ratio of a circumference of a circle to a diameter of the circle, the condition related to the parameters can be satisfied as the following Table 1.

TABLE 1

| the 1st embodiment | | | |
|---|---|---|---|
| D (mm) | 5.66 | $A/[\pi \times (D/2)^2]$ | 0.787 |
| R (mm) | 4.63 | dmin/D | 0.318 |
| A (mm$^2$) | 19.80 | FOV (degree) | 10.1 |
| dmin (mm) | 1.80 | N | 3 |
| R/D | 0.818 | | |

It is worth to be mentioned that the first curvature radius of the arc portion 132 is R', and the center of the light blocking opening 131 is a center point of the first curvature radius of the arc portion 132. Thus, the maximum diameter of the light blocking opening 131 is twice the first curvature radius of the arc portion 132, that is, D=2R'.

2nd Embodiment

Figure 2A:
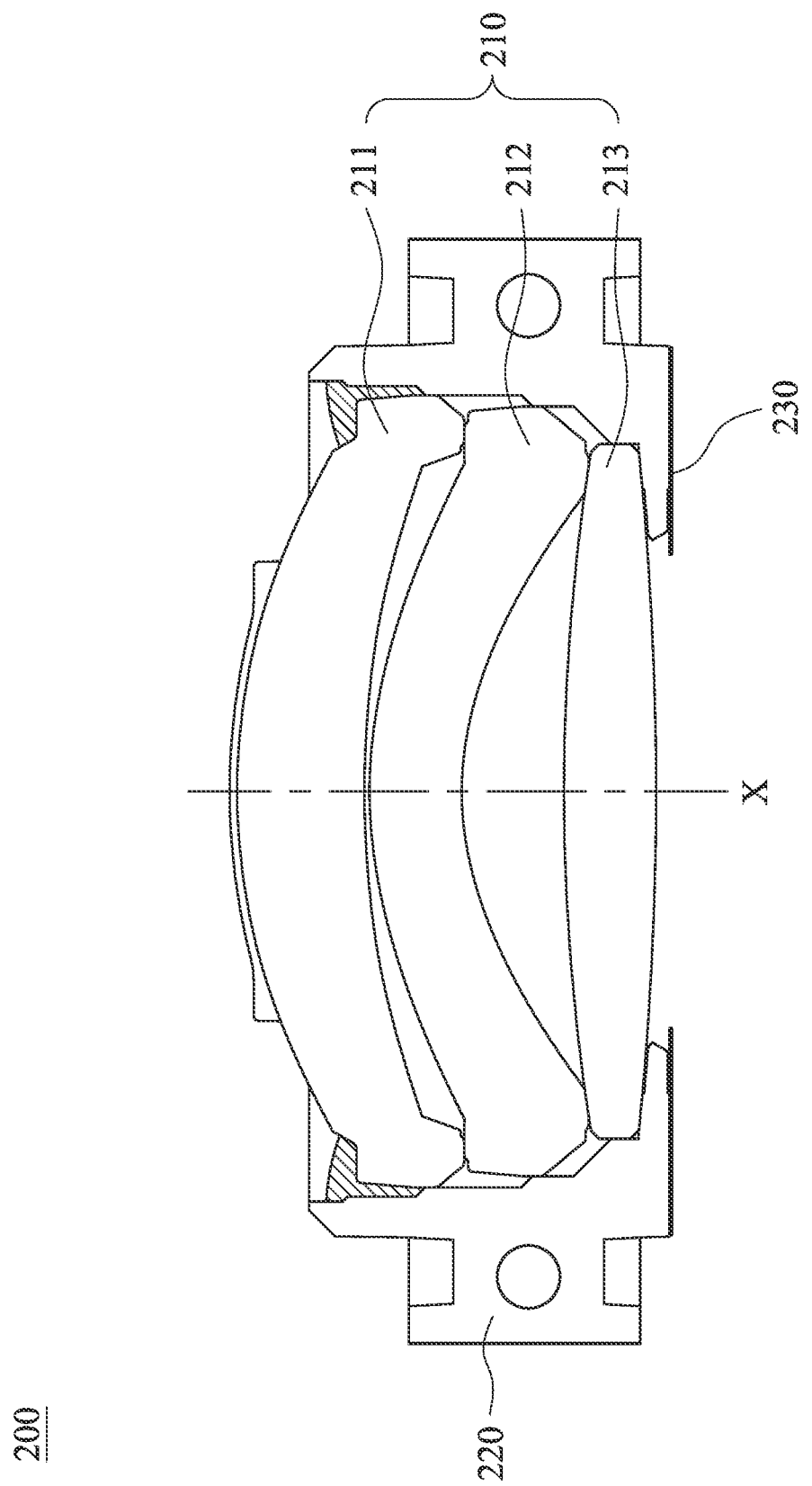
FIG. 2A is a schematic view of an imaging lens assembly module according to the 2nd embodiment of the present disclosure.
Figure 2B:
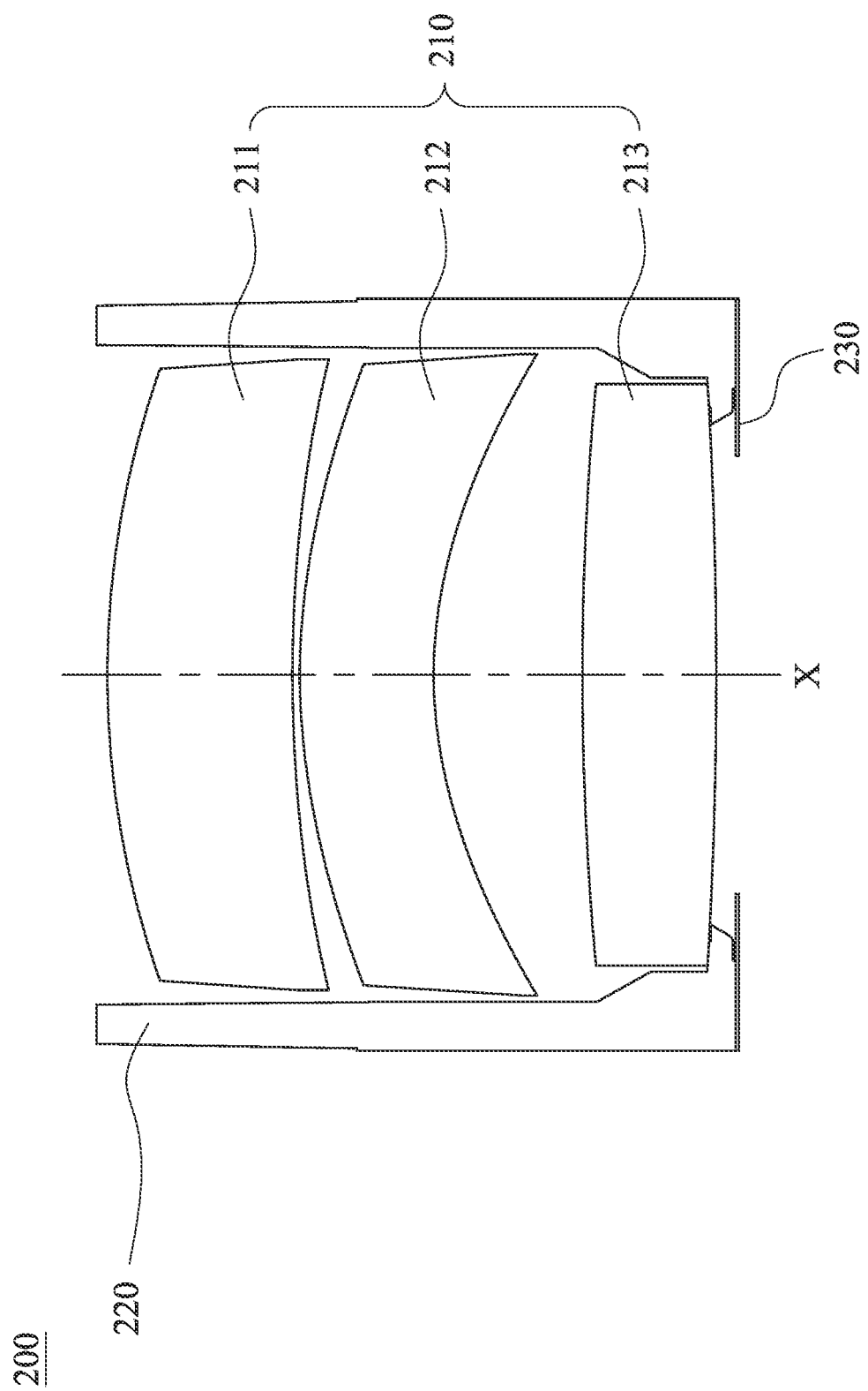
FIG. 2B is another schematic view of the imaging lens assembly module according to the 2nd embodiment in FIG. 2A.

FIG. 2A is a schematic view of an imaging lens assembly module 200 according to the 2nd embodiment of the present disclosure, and FIG. 2B is another schematic view of the imaging lens assembly module 200 according to the 2nd embodiment in FIG. 2A. In FIG. 2A and FIG. 2B, the imaging lens assembly module 200 includes an imaging lens element set 210, a lens carrier 220 and a light blocking structure 230.

The imaging lens element set 210 includes a plurality of lens elements and has an optical axis X. In the 2nd embodiment, the imaging lens element set 210 from an object side to an image side includes a first lens element 211, a second lens element 212 and a third lens element 213.

At least one lens element of the lens elements of the imaging lens element set 210 is disposed in the lens carrier 220, and the light blocking structure 230 is located on an image side of the lens elements. In the 2nd embodiment, the first lens element 211, the second lens element 212 and the third lens element 213 are disposed in the lens carrier 220, and the light blocking structure 230 is located on an image side of the third lens element 213. Specifically, the light blocking structure 230 is disposed on the image side of the third lens element 213.

Furthermore, the lens carrier 220 can be a lens barrel or a plastic injection-molded member where a driver is disposed, wherein the lens carrier 220 can be any structure which can carry the lens elements, but the present disclosure is not limited thereto.

The light blocking structure 230 can be a light blocking sheet, a spacer, a retainer, a lens carrier or a metal light blocking sheet, but the present disclosure is not limited thereto. In the 2nd embodiment, the light blocking structure 230 is a light blocking sheet mounted on the lens carrier 220, and the light blocking structure 230 is disposed on the image side of the lens carrier 220, wherein the assembling can be a assembling via overlaying elements, an adhesion via spot gluing, arrangement of spatial mechanisms and so on, but the present disclosure is not limited thereto. Hence, it is favorable for assembling and does not occupy too much the space. The light blocking structure 230 can be an aperture stop of the imaging lens assembly module 200 for controlling an amount of an incident light of the imaging lens assembly module 200. Hence, it is favorable for increasing an efficiency of eliminating the stray light.

Figure 2C:
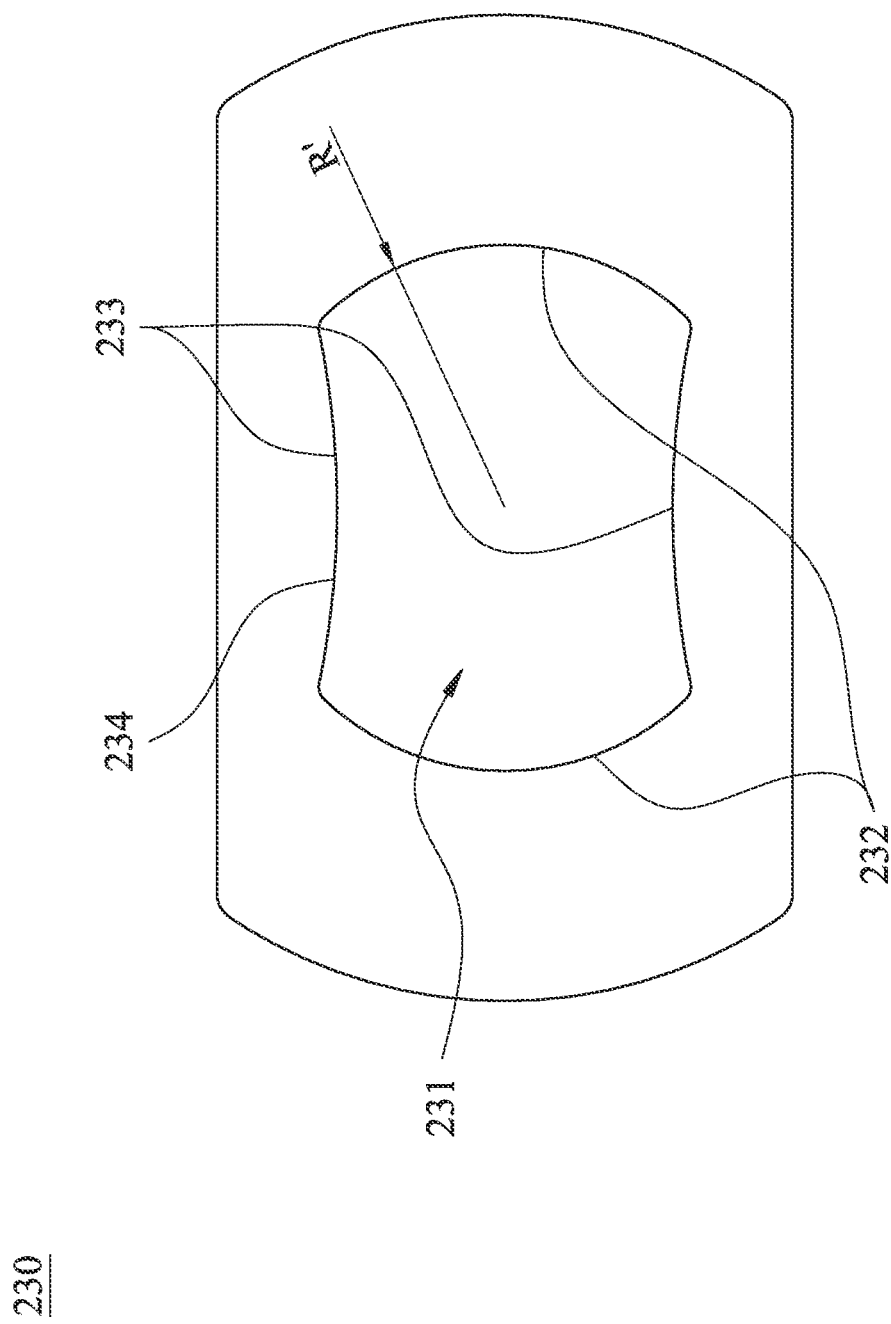
FIG. 2C is a schematic view of a light blocking structure according to the 2nd embodiment in FIG. 2A.
Figure 2D:
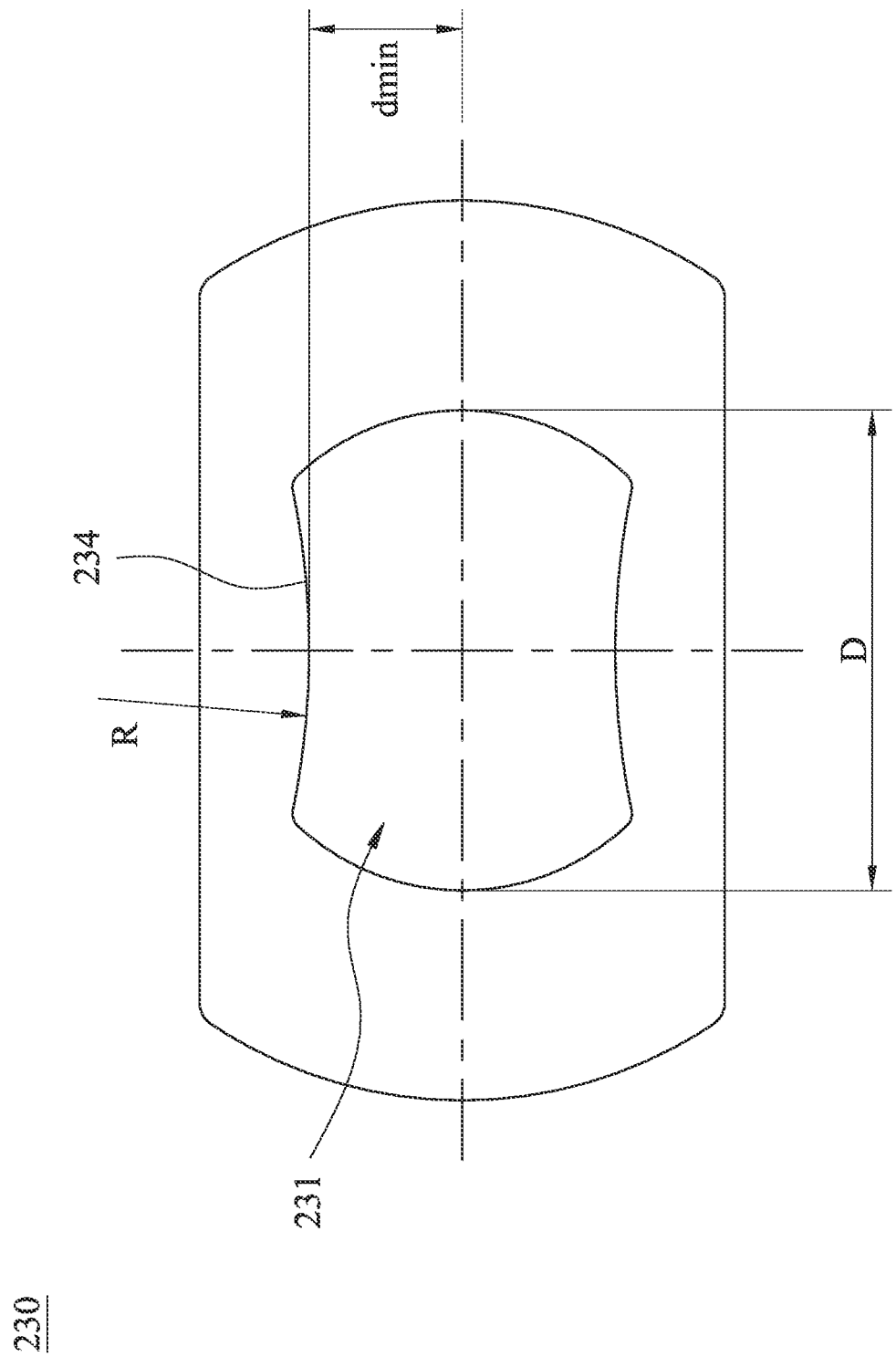
FIG. 2D is a schematic view of the parameters of the light blocking structure according to the 2nd embodiment in FIG. 2A.

FIG. 2C is a schematic view of the light blocking structure 230 according to the 2nd embodiment in FIG. 2A, and FIG. 2D is a schematic view of the parameters of the light blocking structure 230 according to the 2nd embodiment in FIG. 2A. In FIG. 2C and FIG. 2D, the light blocking structure 230 includes a light blocking opening 231, and the optical axis X passes through the light blocking opening 231. The light blocking opening 231 includes at least two arc portions 232 and a shrinking portion 233, and the light blocking opening 231 forms an opening at a center of the light blocking structure 230. Each of the at least two arc portions 232 has a first curvature radius, and the first curvature radius is for defining a maximum diameter of the light blocking opening 231. The arc portions 232 can be arranged relatively along the optical axis X as a center. The shrinking portion 233 is connected to the arc portions 232 for forming the light blocking opening 231 into a non-circular shape, and the shrinking portion 233 includes at least one protruding arc 234. The protruding arc 234 extends and shrinks gradually from the shrinking portion 233 to the optical axis X, and the protruding arc 234 has a second curvature radius. In the 2nd embodiment, a number of the arc portions 232 is two, a number of the at least one protruding arc 234 is two, but the present disclosure is not limited to the aforementioned numbers.

In detail, in the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 2nd embodiment, a possibility of the stray light generated by the blocking opening 231 is decreased and the better image quality is maintained via a design of the light blocking opening 231. Moreover, an intensity of a light diffraction can be decreased via the protruding arc 234.

The protruding arc 234 can be a convex-shape arc or a shrinking protrusion made of concave arcs, but the present disclosure is not limited thereto. Specifically, the protruding arc 234 can further be a convex light blocking structure formed by one of a concave arc having a curvature radius and a convex arc having a curvature radius.

In FIG. 2D, when the maximum diameter of the light blocking opening 231 is D, the second curvature radius of the protruding arc 234 is R, a cross-sectional area of the light blocking opening 231 is A, a minimum distance between the protruding arc 234 and a center of the light blocking opening 231 is dmin, a maximum field of view of the imaging lens assembly module 200 is FOV, and a number of the lens elements of the imaging lens element set 210 is N, wherein $\pi$ is a ratio of a circumference of a circle to a diameter of the circle, the condition related to the parameters can be satisfied as the following Table 2.

TABLE 2

| the 2nd embodiment | | | |
|---|---|---|---|
| D (mm) | 5.66 | $A/[\pi \times (D/2)^2]$ | 0.777 |
| R (mm) | 9.29 | dmin/D | 0.318 |
| A (mm$^2$) | 19.55 | FOV (degree) | 10.1 |
| dmin (mm) | 1.80 | N | 3 |
| R/D | 1.641 | | |

It is worth to be mentioned that the first curvature radius of the arc portion 232 is R', and the center of the light blocking opening 231 is a center point of the first curvature radius of the arc portion 232. Thus, the maximum diameter of the light blocking opening 231 is twice the first curvature radius of the arc portion 232, that is, D=2R'.

3rd Embodiment

Figure 3A:
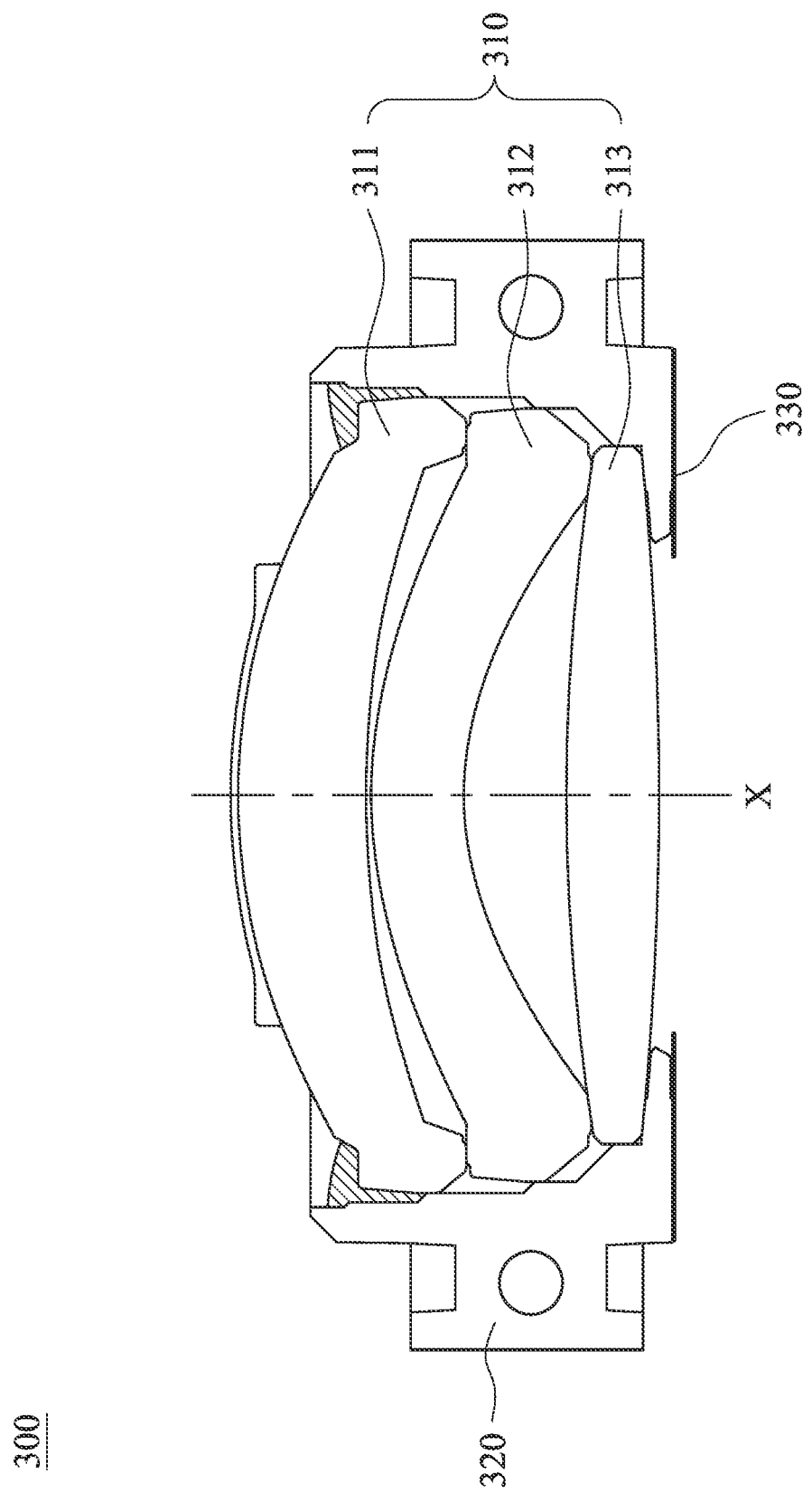
FIG. 3A is a schematic view of an imaging lens assembly module according to the 3rd embodiment of the present disclosure.
Figure 3B:
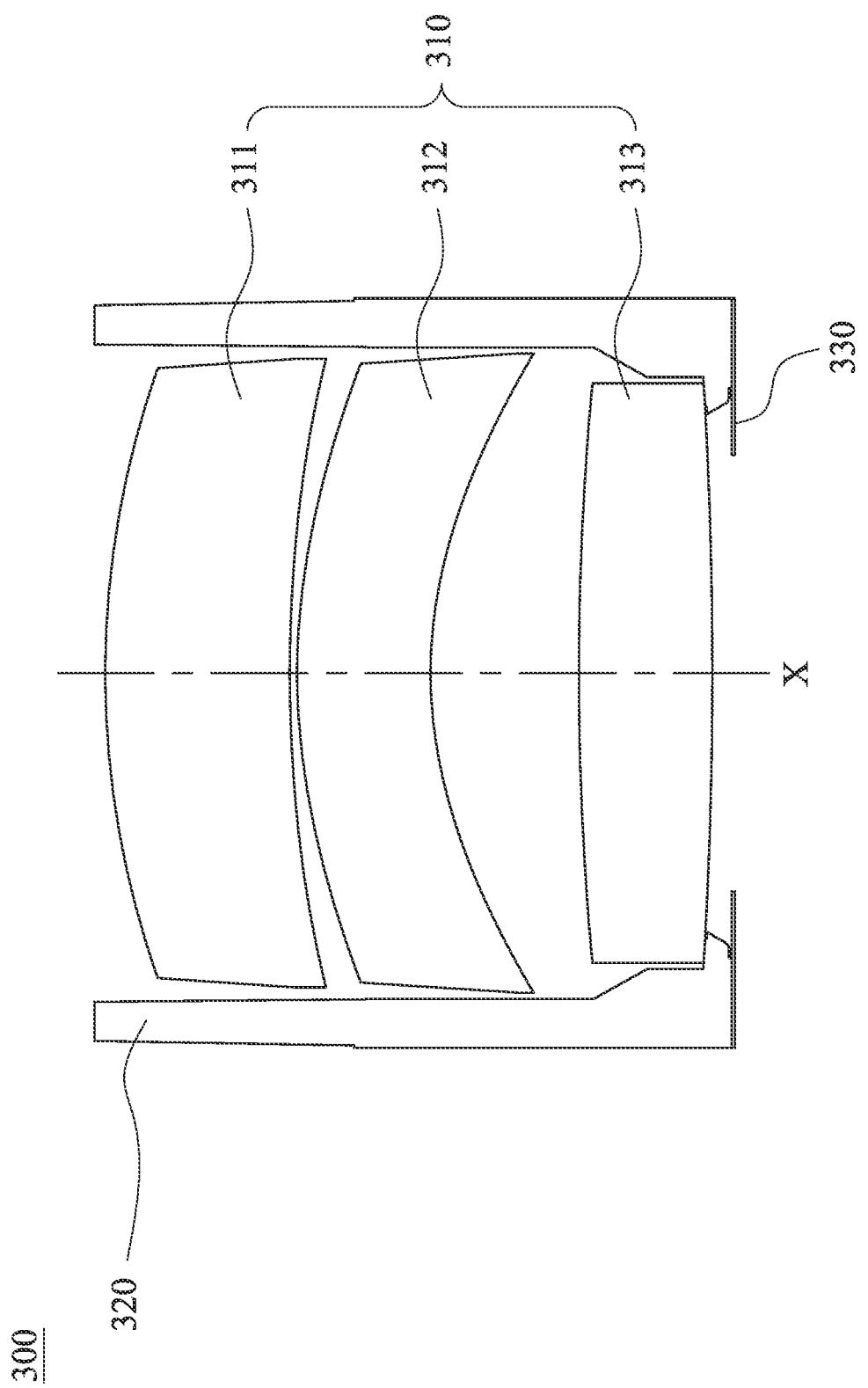
FIG. 3B is another schematic view of the imaging lens assembly module according to the 3rd embodiment in FIG. 3A.
Figure 3C:
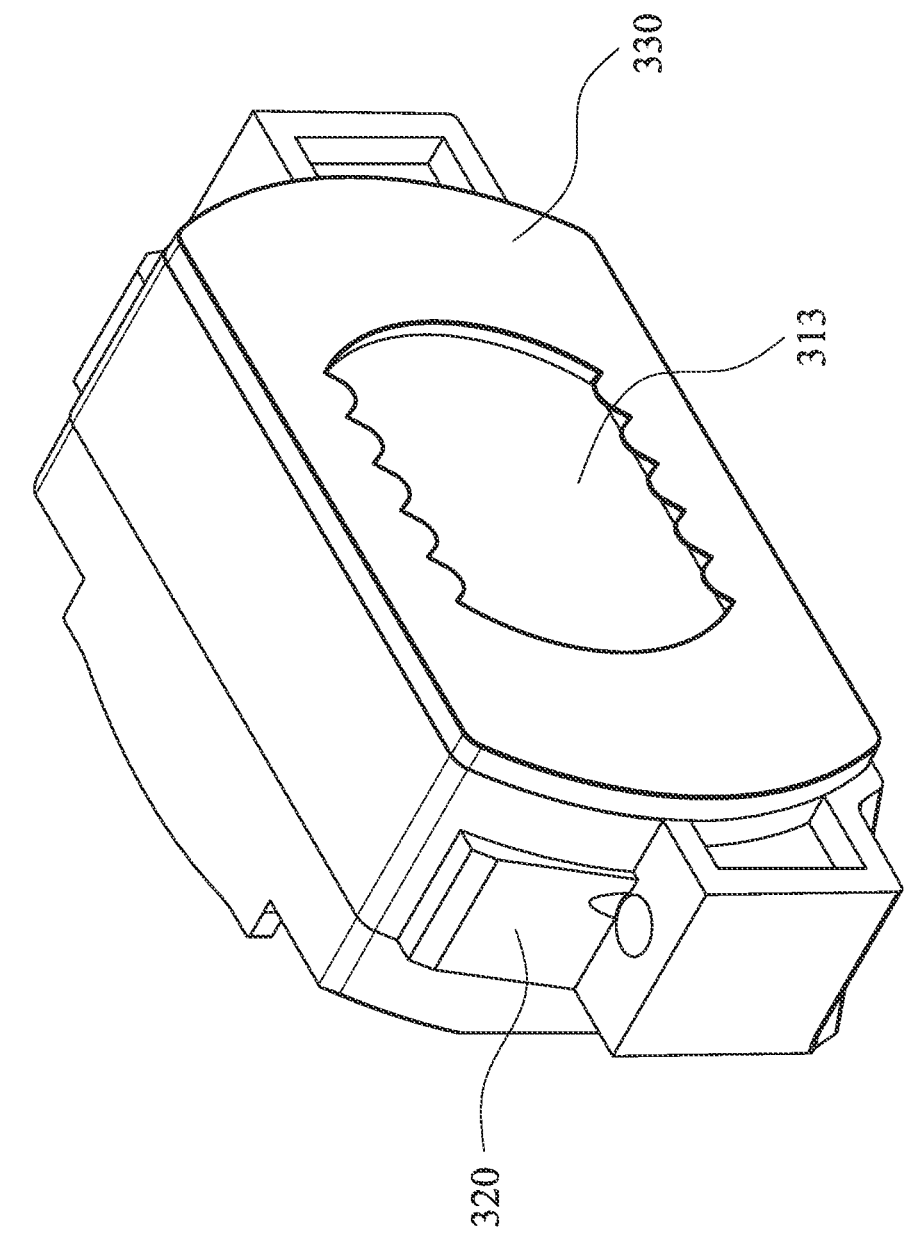
FIG. 3C is a three-dimensional schematic view of the imaging lens assembly module according to the 3rd embodiment in FIG. 3A.
Figure 3D:
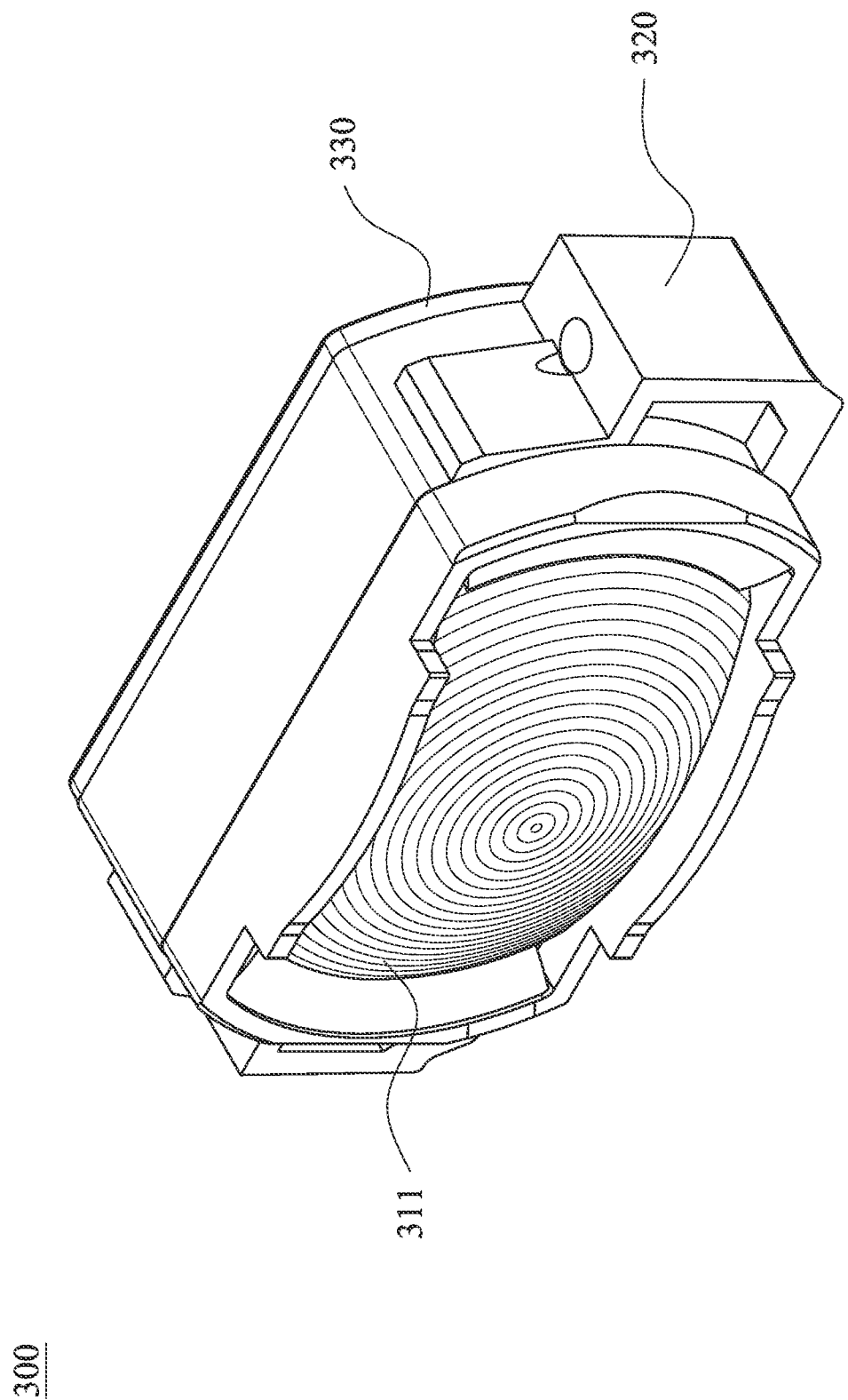
FIG. 3D is another three-dimensional schematic view of the imaging lens assembly module according to the 3rd embodiment in FIG. 3A.
Figure 3E:
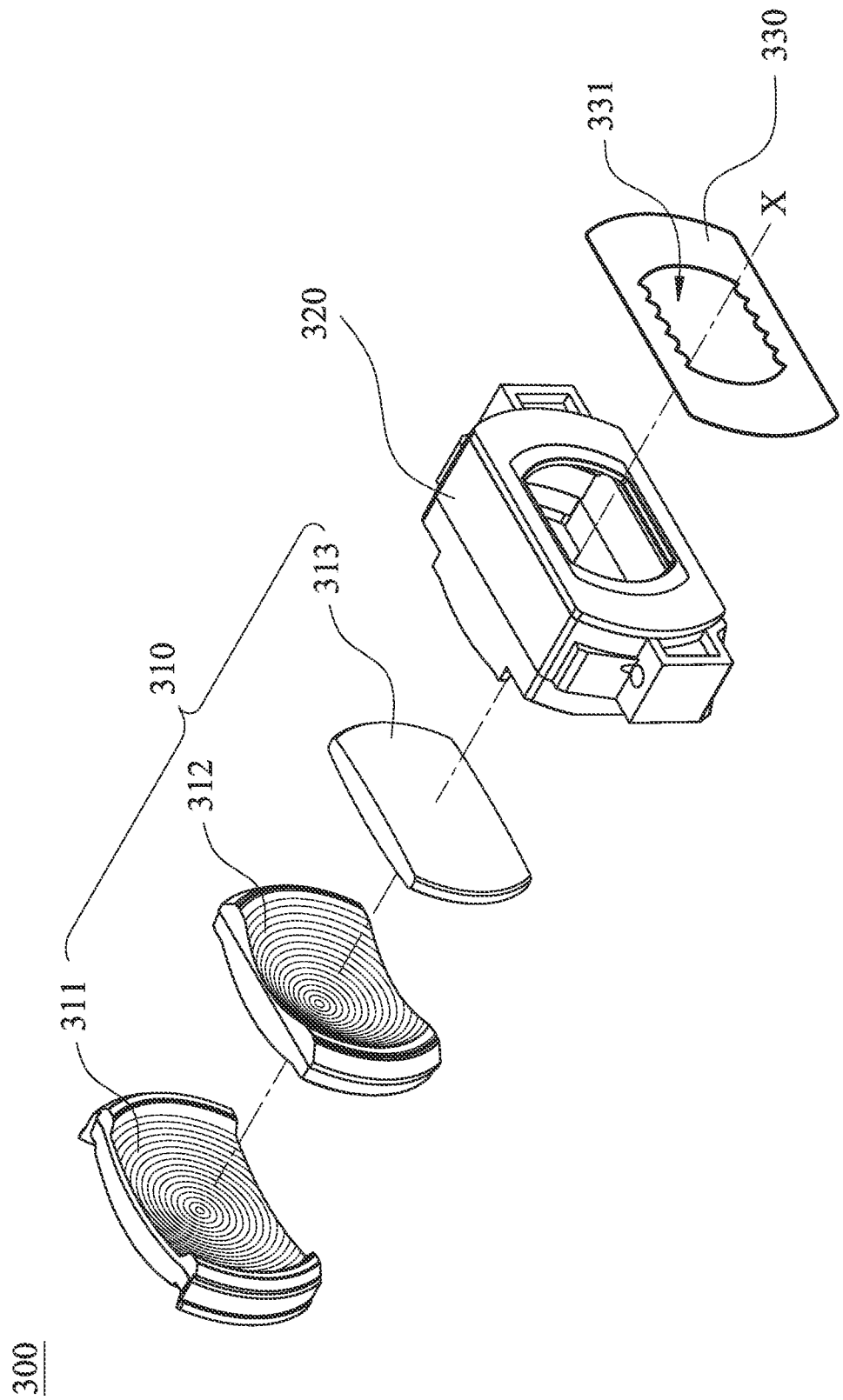
FIG. 3E is an exploded view of the imaging lens assembly module according to the 3rd embodiment in FIG. 3A.

FIG. 3A is a schematic view of an imaging lens assembly module 300 according to the 3rd embodiment of the present disclosure, FIG. 3B is another schematic view of the imaging lens assembly module 300 in FIG. 3A according to the 3rd embodiment of the present disclosure, FIG. 3C is a three-dimensional schematic view of the imaging lens assembly module 300 in FIG. 3A according to the 3rd embodiment of the present disclosure, FIG. 3D is another three-dimensional schematic view of the imaging lens assembly module 300 in FIG. 3A according to the 3rd embodiment of the present disclosure, and FIG. 3E is an exploded view of the imaging lens assembly module 300 in FIG. 3A according to the 3rd embodiment of the present disclosure. In FIG. 3A to FIG. 3E, the imaging lens assembly module 300 includes an imaging lens element set 310, a lens carrier 320 and a light blocking structure 330.

The imaging lens element set 310 includes a plurality of lens elements and has an optical axis X. In the 3rd embodiment, the imaging lens element set 310 from an object side to an image side includes a first lens element 311, a second lens element 312 and a third lens element 313.

At least one lens element of the lens elements of the imaging lens element set 310 is disposed in the lens carrier 320, and the light blocking structure 330 is located on an image side of the lens elements. In the 3rd embodiment, the first lens element 311, the second lens element 312 and the third lens element 313 are disposed in the lens carrier 320, and the light blocking structure 330 is located on an image side of the third lens element 313. Specifically, the light blocking structure 330 is disposed on the image side of the third lens element 313.

Furthermore, the lens carrier 320 can be a lens barrel or a plastic injection-molded member where a driver is disposed, wherein the lens carrier 320 can be any structure which can carry the lens elements, but the present disclosure is not limited thereto.

The light blocking structure 330 can be a light blocking sheet, a spacer, a retainer, a lens carrier or a metal light blocking sheet, but the present disclosure is not limited thereto. In the 3rd embodiment, the light blocking structure 330 is a light blocking sheet mounted on the lens carrier 320, and the light blocking structure 330 is disposed on the image side of the lens carrier 320, wherein the assembling can be a assembling via overlaying elements, an adhesion via spot gluing, arrangement of spatial mechanisms and so on, but the present disclosure is not limited thereto. Hence, it is favorable for assembling and does not occupy too much the space. The light blocking structure 330 can be an aperture stop of the imaging lens assembly module 300 for controlling an amount of an incident light of the imaging lens assembly module 300. Hence, it is favorable for increasing an efficiency of eliminating the stray light.

FIG. 3F is a schematic view of the parameters of the light blocking structure 330 according to the 3rd embodiment in FIG. 3A. In FIG. 3E and FIG. 3F, the light blocking structure 330 includes a light blocking opening 331, and the optical axis X passes through the light blocking opening 331. The light blocking opening 331 includes at least two arc portions 332 and a shrinking portion 333, and the light blocking opening 331 forms an opening at a center of the light blocking structure 330. Each of the at least two arc portions 332 has a first curvature radius, and the first curvature radius is for defining a maximum diameter of the light blocking opening 331. The arc portions 332 can be arranged relatively along the optical axis X as a center. The shrinking portion 333 is connected to the arc portions 332 for forming the light blocking opening 331 into a non-circular shape, and the shrinking portion 333 includes at least one protruding arc 334. The protruding arc 334 extends and shrinks gradually from the shrinking portion 333 to the optical axis X, and the protruding arc 334 has a second curvature radius. In the 3rd embodiment, a number of the arc portions 332 is two, a number of the at least one protruding arc 334 is ten, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 3rd embodiment, a possibility of the stray light generated by the blocking opening 331 is decreased and the better image quality is maintained via a design of the light blocking opening 331. Moreover, an intensity of a light diffraction can be decreased via the protruding arc 334.

The protruding arc 334 can be a convex-shape arc or a shrinking protrusion made of concave arcs, but the present disclosure is not limited thereto. Specifically, the protruding arc 334 can further be a convex light blocking structure formed by one of a concave arc having a curvature radius and a convex arc having a curvature radius.

In FIG. 3F, when the maximum diameter of the light blocking opening 331 is D, the second curvature radius of the protruding arc 334 is R, a cross-sectional area of the light blocking opening 331 is A, a minimum distance between the protruding arc 334 and a center of the light blocking opening 331 is dmin, a maximum field of view of the imaging lens assembly module 300 is FOV, and a number of the lens elements of the imaging lens element set 310 is N, wherein π is a ratio of a circumference of a circle to a diameter of the circle, the condition related to the parameters can be satisfied as the following Table 3.

TABLE 3 the 3rd embodiment

| | | | |
|---|---|---|---|
| D (mm) | 5.66 | $A/[\pi \times (D/2)^2]$ | 0.787 |
| R (mm) | 0.30 | dmin/D | 0.318 |
| A (mm$^2$) | 19.81 | FOV (degree) | 10.1 |
| dmin (mm) | 1.80 | N | 3 |
| R/D | 0.053 | | |

4th Embodiment

Figure 4A:
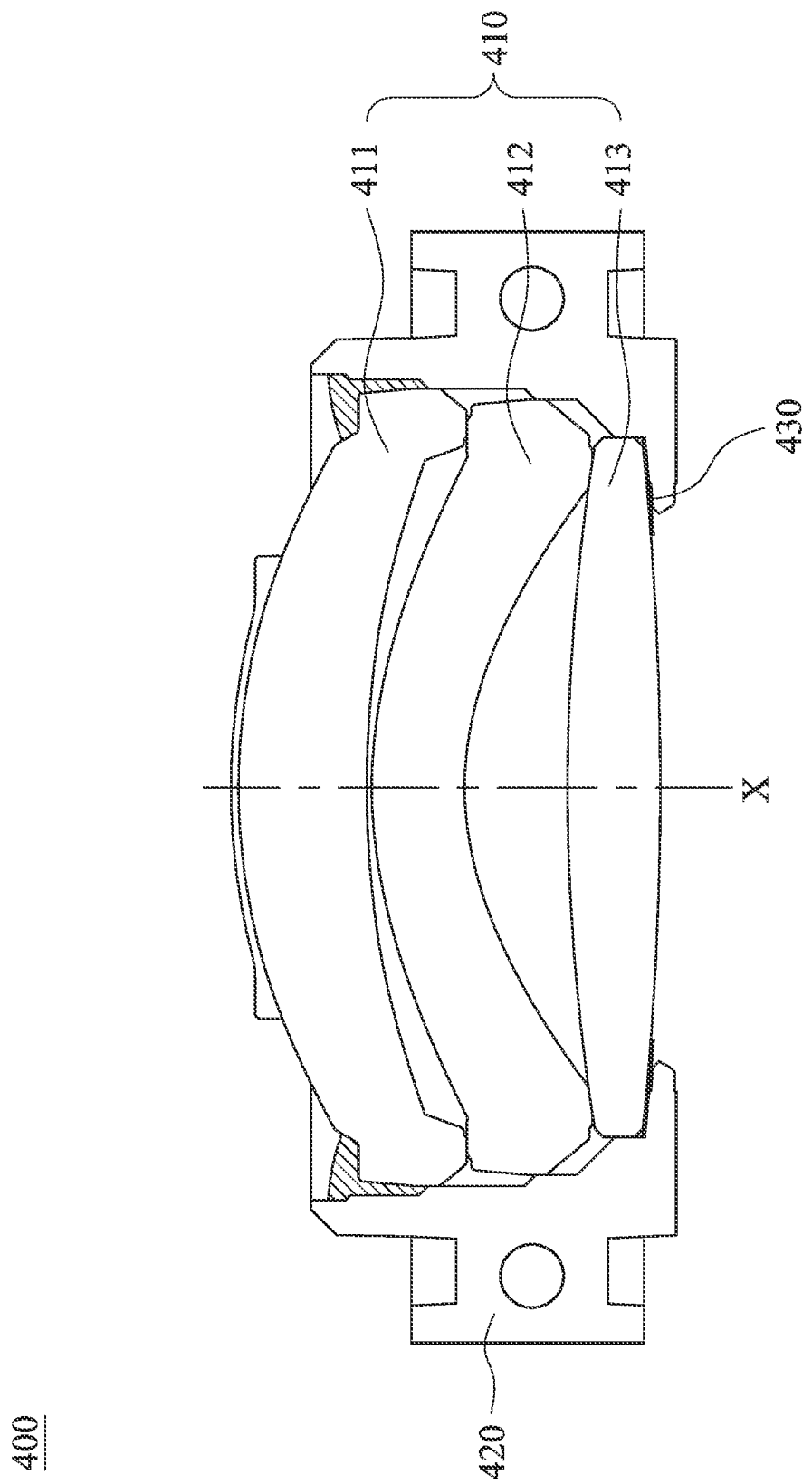
FIG. 4A is a schematic view of an imaging lens assembly module according to the 4th embodiment of the present disclosure.
Figure 4B:
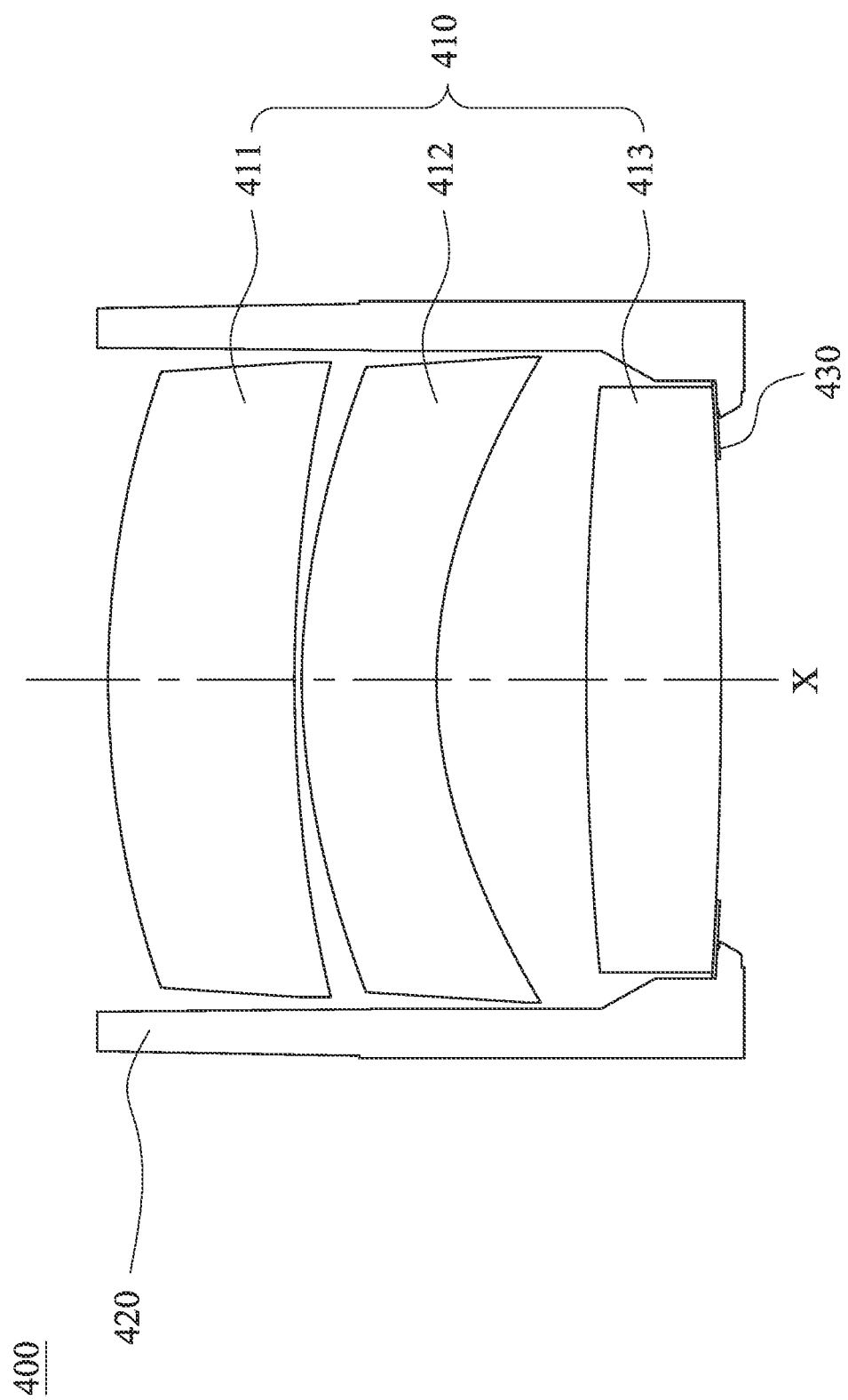
FIG. 4B is another schematic view of the imaging lens assembly module according to the 4th embodiment in FIG. 4A.

FIG. 4A is a schematic view of an imaging lens assembly module 400 according to the 4th embodiment of the present disclosure, and FIG. 4B is another schematic view of the imaging lens assembly module according to the 4th embodiment in FIG. 4A. In FIG. 4A and FIG. 4B, the imaging lens assembly module 400 includes an imaging lens element set 410, a lens carrier 420 and a light blocking structure 430.

The imaging lens element set 410 includes a plurality of lens elements and has an optical axis X. In the 4th embodiment, the imaging lens element set 410 from an object side to an image side includes a first lens element 411, a second lens element 412 and a third lens element 413.

At least one lens element of the lens elements of the imaging lens element set 410 is disposed in the lens carrier 420, and the light blocking structure 430 is located on an image side of the lens elements. In the 4th embodiment, the first lens element 411, the second lens element 412 and the third lens element 413 are disposed in the lens carrier 420, and the light blocking structure 430 is located on an image side of the third lens element 413. Specifically, the light blocking structure 430 is disposed on the image side of the third lens element 413.

Furthermore, the lens carrier 420 can be a lens barrel or a plastic injection-molded member where a driver is disposed, wherein the lens carrier 420 can be any structure which can carry the lens elements, but the present disclosure is not limited thereto.

The light blocking structure 430 can be a light blocking sheet, a spacer, a retainer, a lens carrier or a metal light blocking sheet, but the present disclosure is not limited thereto. In the 4th embodiment, the light blocking structure 430 is a light blocking sheet mounted on the lens carrier 420, and the light blocking structure 430 is disposed in the lens carrier 420, wherein the assembling can be a assembling via overlaying elements, an adhesion via spot gluing, arrangement of spatial mechanisms and so on, but the present disclosure is not limited thereto. Hence, it is favorable for assembling and does not occupy too much the space. The light blocking structure 430 can be an aperture stop of the imaging lens assembly module 400 for controlling an amount of an incident light of the imaging lens assembly module 400. Hence, it is favorable for increasing an efficiency of eliminating the stray light.

Figure 4C:
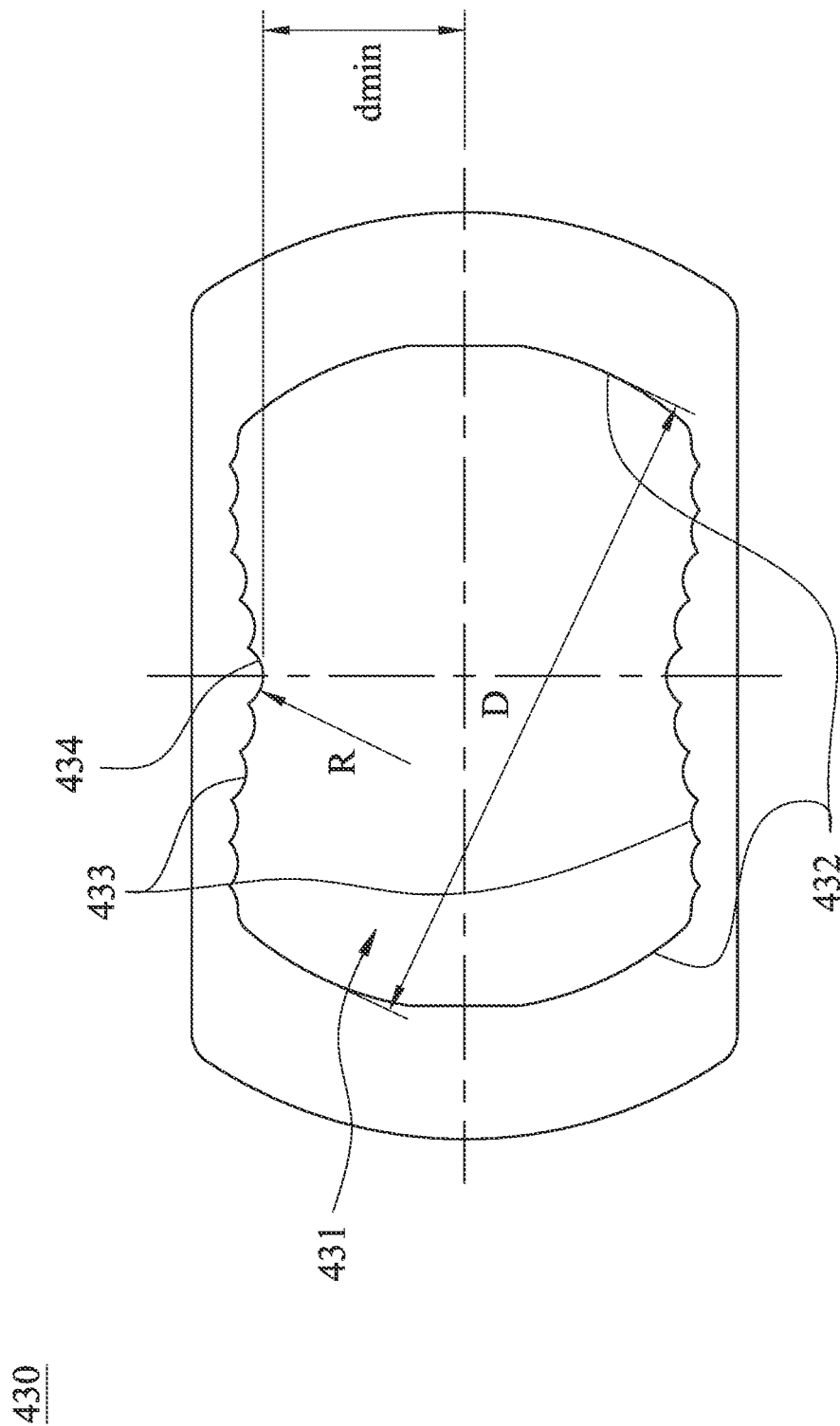
FIG. 4C is a schematic view of the parameters of the light blocking structure according to the 4th embodiment in FIG. 4A.

FIG. 4C is a schematic view of the parameters of the light blocking structure 430 according to the 4th embodiment in FIG. 4A. In FIG. 4C, the light blocking structure 430 includes a light blocking opening 431, and the optical axis X passes through the light blocking opening 431. The light blocking opening 431 includes at least two arc portions 432 and a shrinking portion 433, and the light blocking opening 431 forms an opening at a center of the light blocking structure 430. Each of the at least two arc portions 432 has a first curvature radius, and the first curvature radius is for defining a maximum diameter of the light blocking opening 431. The arc portions 432 can be arranged relatively along the optical axis X as a center. The shrinking portion 433 is connected to the arc portions 432 for forming the light blocking opening 431 into a non-circular shape, and the shrinking portion 433 includes at least one protruding arc 434. The protruding arc 434 extends and shrinks gradually from the shrinking portion 433 to the optical axis X, and the protruding arc 434 has a second curvature radius. In the 4th embodiment, a number of the arc portions 432 is two, a number of the at least one protruding arc 434 is twenty two, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 4th embodiment, a possibility of the stray light generated by the blocking opening 431 is decreased and the better image quality is maintained via a design of the light blocking opening 431. Moreover, an intensity of a light diffraction can be decreased via the protruding arc 434.

The protruding arc 434 can be a convex-shape arc or a shrinking protrusion made of concave arcs, but the present disclosure is not limited thereto. Specifically, the protruding arc 434 can further be a convex light blocking structure formed by one of a concave arc having a curvature radius and a convex arc having a curvature radius.

In FIG. 4C, when the maximum diameter of the light blocking opening 431 is D, the second curvature radius of the protruding arc 434 is R, a cross-sectional area of the light blocking opening 431 is A, a minimum distance between the protruding arc 434 and a center of the light blocking opening 431 is dmin, a maximum field of view of the imaging lens assembly module 400 is FOV, and a number of the lens elements of the imaging lens element set 410 is N, wherein π is a ratio of a circumference of a circle to a diameter of the circle, the condition related to the parameters can be satisfied as the following Table 4.

TABLE 4 the 4th embodiment

| D (mm) | 5.99 | A/[π × (D/2)$^2$] | 0.776 |
|---|---|---|---|
| R (mm) | 0.30 | dmin/D | 0.301 |
| A (mm$^2$) | 21.88 | FOV (degree) | 10.1 |
| dmin (mm) | 1.80 | N | 3 |
| R/D | 0.050 | | |

5th Embodiment

Figure 5A:
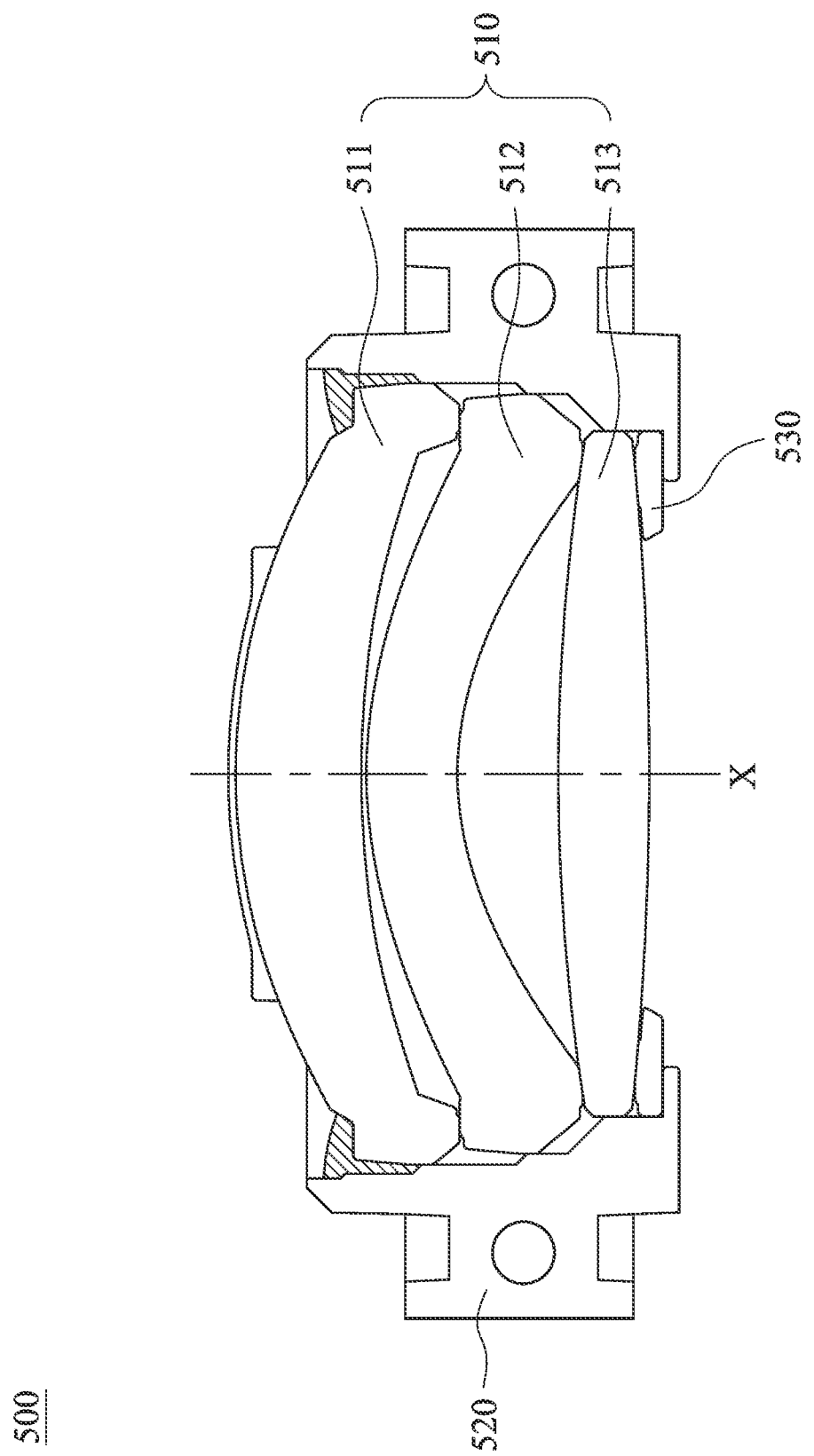
FIG. 5A is a schematic view of an imaging lens assembly module according to the 5th embodiment of the present disclosure.
Figure 5B:
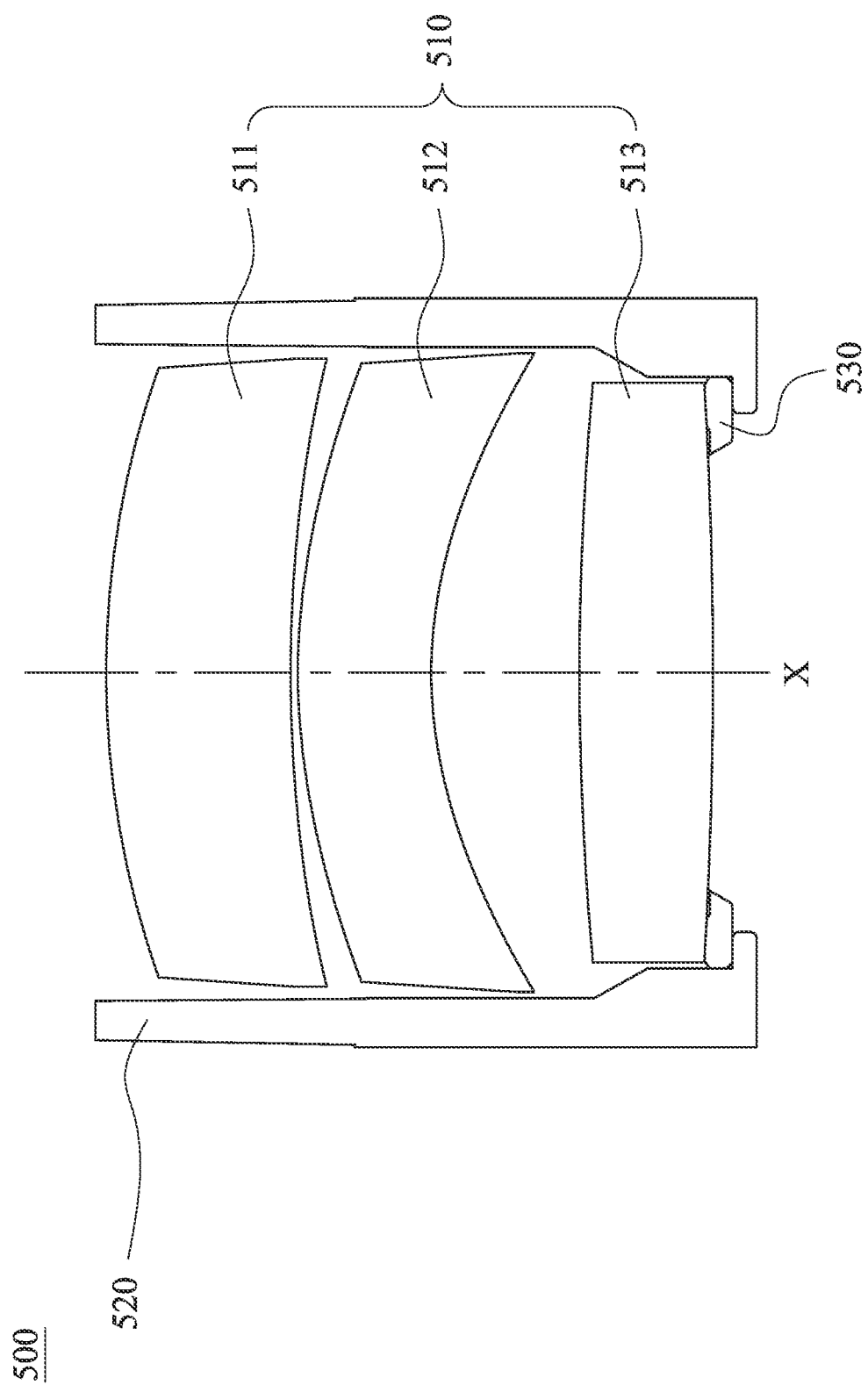
FIG. 5B is another schematic view of the imaging lens assembly module according to the 5th embodiment in FIG. 5A.

FIG. 5A is a schematic view of an imaging lens assembly module 500 according to the 5th embodiment of the present disclosure, and FIG. 5B is another schematic view of the imaging lens assembly module 500 according to the 5th embodiment in FIG. 5A. In FIG. 5A and FIG. 5B, the imaging lens assembly module 500 includes an imaging lens element set 510, a lens carrier 520 and a light blocking structure 530.

The imaging lens element set 510 includes a plurality of lens elements and has an optical axis X. In the 5th embodiment, the imaging lens element set 510 from an object side to an image side includes a first lens element 511, a second lens element 512 and a third lens element 513.

At least one lens element of the lens elements of the imaging lens element set 510 is disposed in the lens carrier 520, and the light blocking structure 530 is located on an image side of the lens elements. In the 5th embodiment, the first lens element 511, the second lens element 512 and the third lens element 513 are disposed in the lens carrier 520, and the light blocking structure 530 is located on an image side of the third lens element 513. Specifically, the light blocking structure 530 is disposed on the image side of the third lens element 513.

Furthermore, the lens carrier 520 can be a lens barrel or a plastic injection-molded member where a driver is disposed, wherein the lens carrier 520 can be any structure which can carry the lens elements, but the present disclosure is not limited thereto.

The light blocking structure 530 can be a light blocking sheet, a spacer, a retainer, a lens carrier or a metal light blocking sheet, but the present disclosure is not limited thereto. In the 5th embodiment, the light blocking structure 530 is a black plastic element. Specifically, the light blocking structure 530 is a spacer and disposed in the lens carrier 520. Hence, it is favorable for providing an opening structure in a high accuracy and increasing the yield rate of the products. The light blocking structure 530 can be an aperture stop of the imaging lens assembly module 500 for controlling an amount of an incident light of the imaging lens assembly module 500. Hence, it is favorable for increasing an efficiency of eliminating the stray light.

Figure 5C:
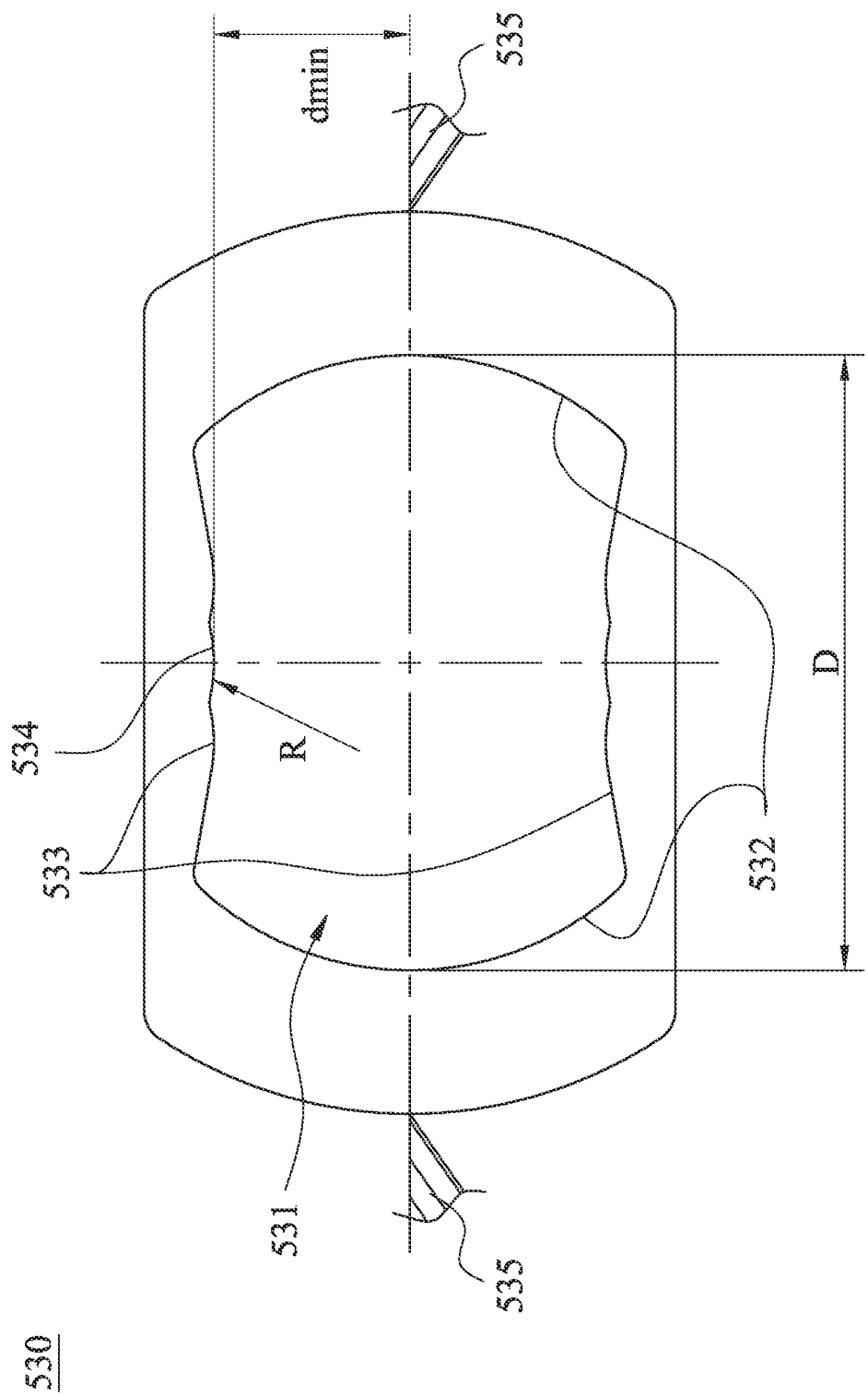
FIG. 5C is a schematic view of the parameters of the light blocking structure according to the 5th embodiment in FIG. 5A.

FIG. 5C is a schematic view of the parameters of the light blocking structure 530 according to the 5th embodiment in FIG. 5A. In FIG. 5C, the light blocking structure 530 includes a light blocking opening 531, and the optical axis X passes through the light blocking opening 531. The light blocking opening 531 includes at least two arc portions 532, a shrinking portion 533 and at least two gate traces 535, and the light blocking opening 531 forms an opening at a center of the light blocking structure 530. Each of the at least two arc portions 532 has a first curvature radius, and the first curvature radius is for defining a maximum diameter of the light blocking opening 531. The arc portions 532 can be arranged relatively along the optical axis X as a center. The shrinking portion 533 is connected to the arc portions 532 for forming the light blocking opening 531 into a non-circular shape, and the shrinking portion 533 includes at least one protruding arc 534. The protruding arc 534 extends and shrinks gradually from the shrinking portion 533 to the optical axis X, and the protruding arc 534 has a second curvature radius. In the 5th embodiment, a number of the arc portions 532 is two, a number of the gate traces 535 is two, a number of the at least one protruding arc 534 is six, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 5th embodiment, a possibility of the stray light generated by the blocking opening 531 is decreased and the better image quality is maintained via a design of the light blocking opening 531. Moreover, an intensity of a light diffraction can be decreased via the protruding arc 534.

The protruding arc 534 can be a convex-shape arc or a shrinking protrusion made of concave arcs, but the present disclosure is not limited thereto. Specifically, the protruding arc 534 can further be a convex light blocking structure formed by one of a concave arc having a curvature radius and a convex arc having a curvature radius.

In FIG. 5C, when the maximum diameter of the light blocking opening 531 is D, the second curvature radius of the protruding arc 534 is R, a cross-sectional area of the light blocking opening 531 is A, a minimum distance between the protruding arc 534 and a center of the light blocking opening 531 is dmin, a maximum field of view of the imaging lens assembly module 500 is FOV, and a number of the lens elements of the imaging lens element set 510 is N, wherein π is a ratio of a circumference of a circle to a diameter of the circle, the condition related to the parameters can be satisfied as the following Table 5.

TABLE 5 the 5th embodiment

| D (mm) | 5.66 | A/[π × (D/2)$^2$] | 0.774 |
|---|---|---|---|
| R (mm) | 1.50 | dmin/D | 0.318 |
| A (mm$^2$) | 19.47 | FOV (degree) | 10.1 |
| dmin (mm) | 1.80 | N | 3 |
| R/D | 0.265 | | |

6th Embodiment

Figure 6A:
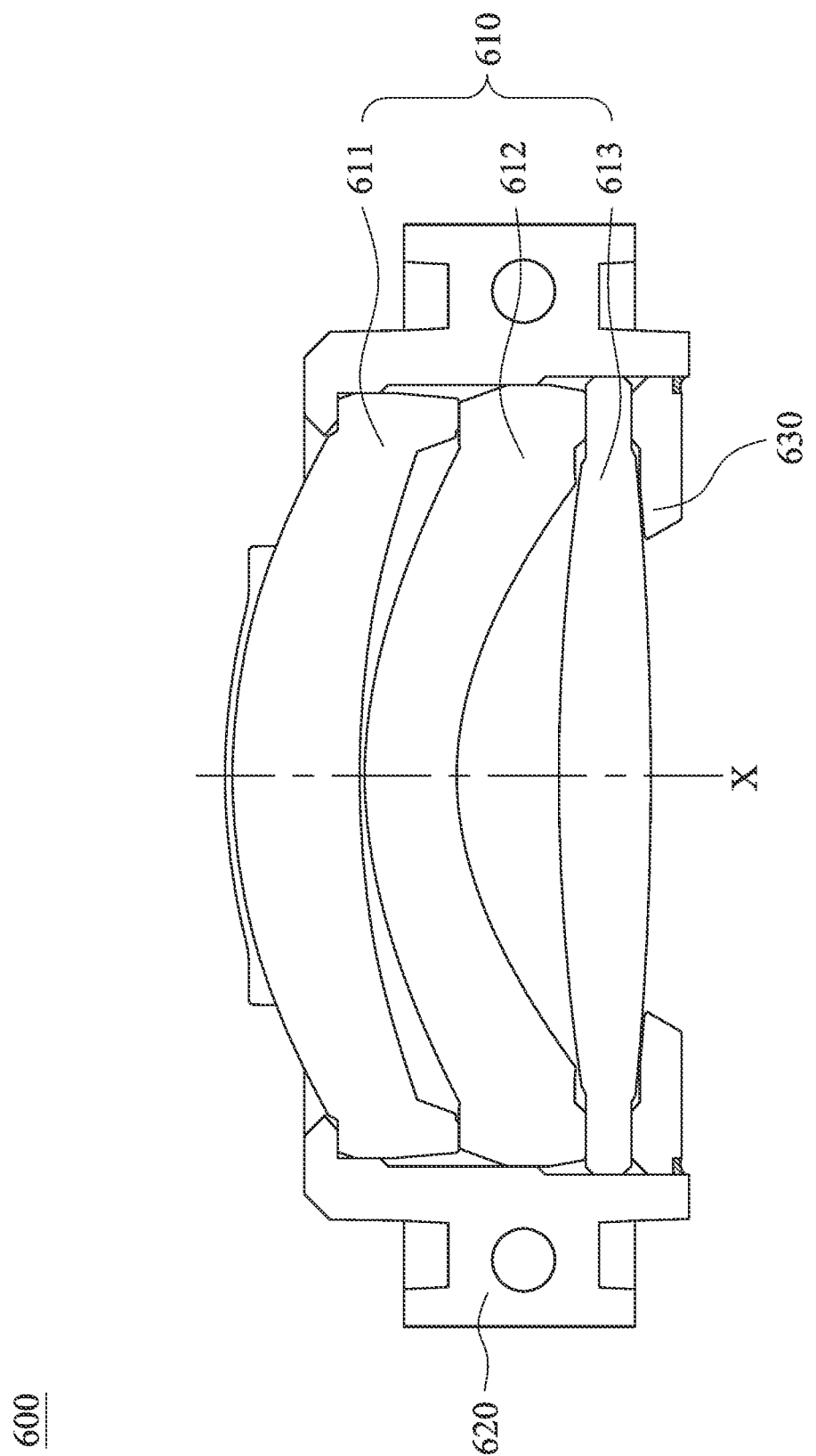
FIG. 6A is a schematic view of an imaging lens assembly module according to the 6th embodiment of the present disclosure.
Figure 6C:
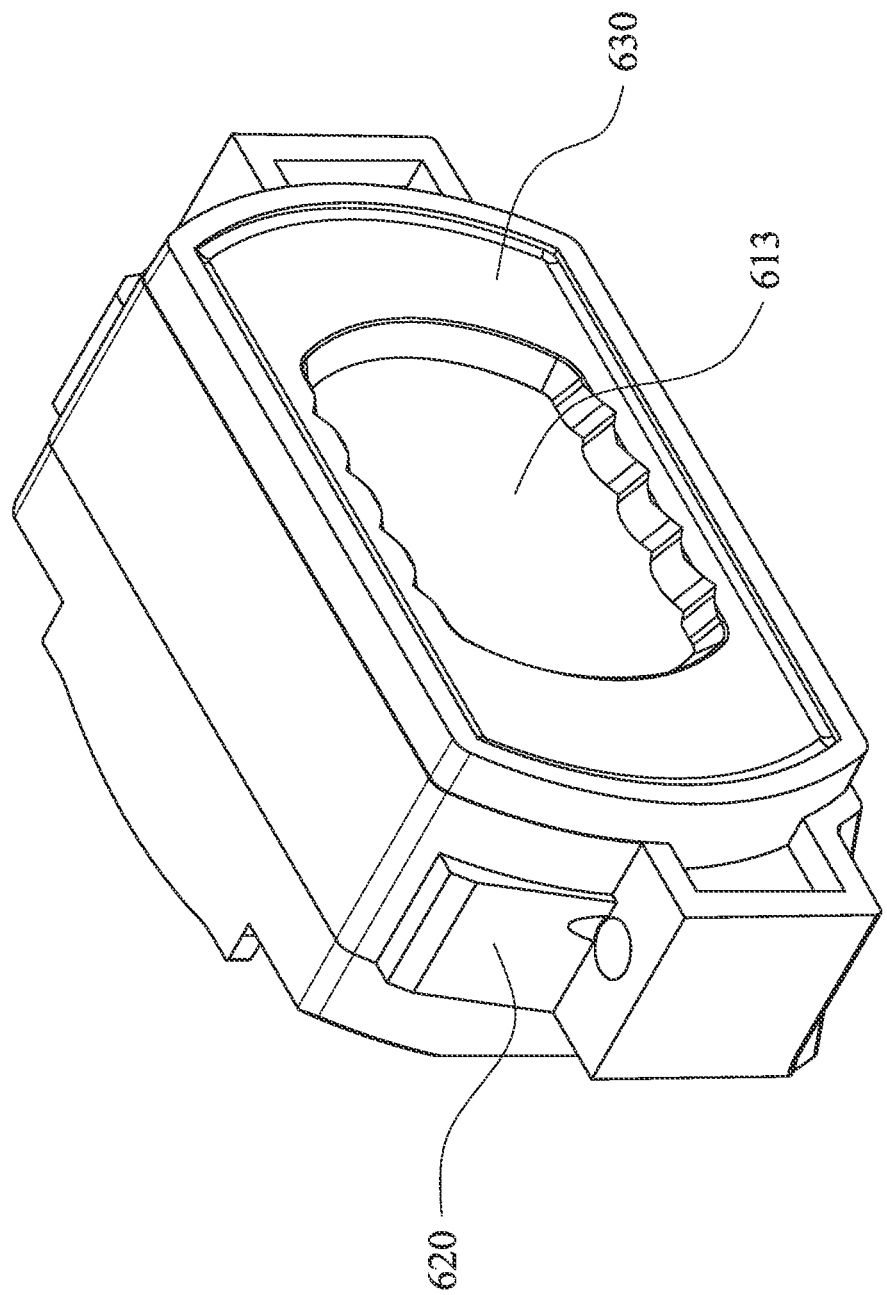
FIG. 6C is a three-dimensional schematic view of the imaging lens assembly module according to the 6th embodiment in FIG. 6A.
Figure 6D:
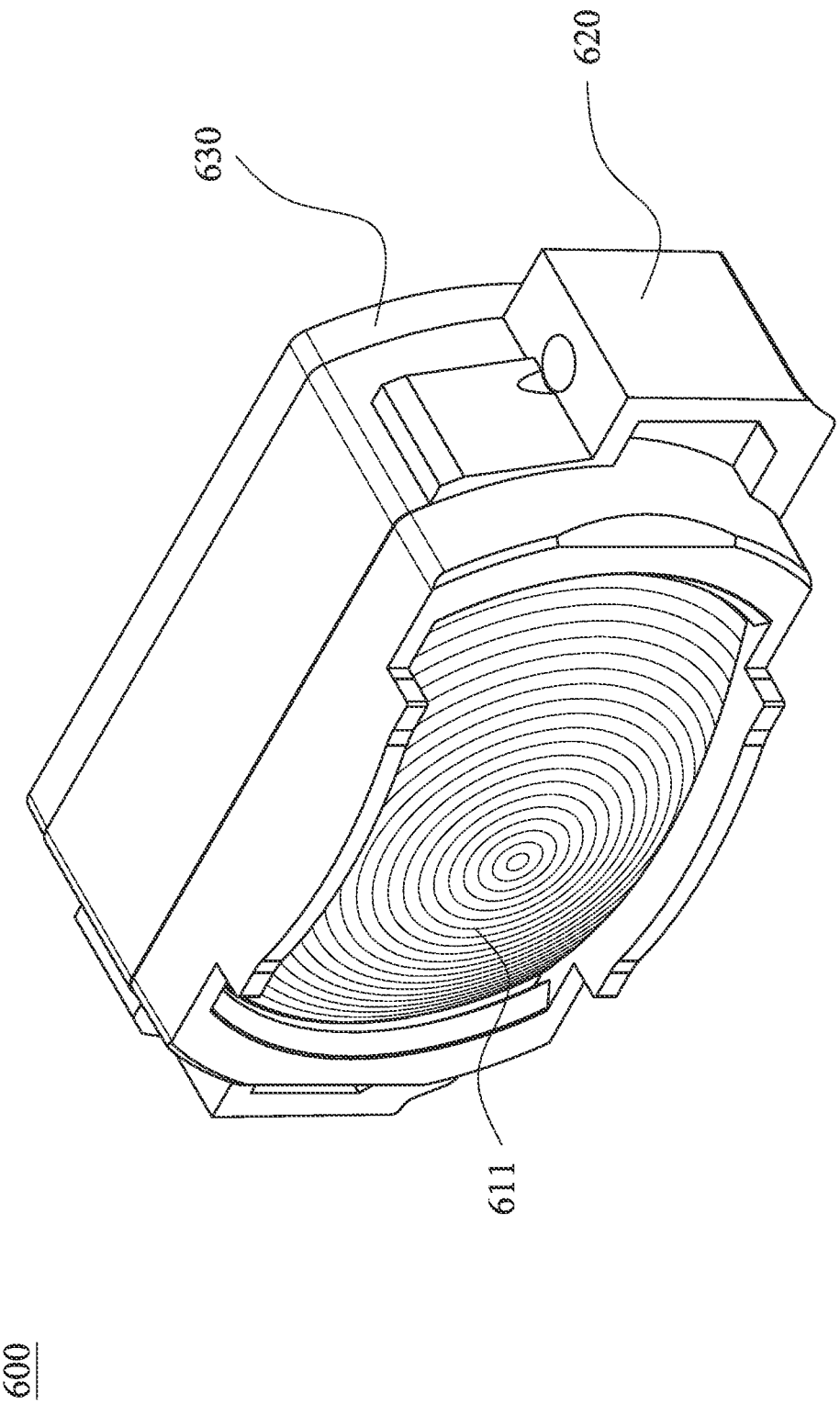
FIG. 6D is another three-dimensional schematic view of the imaging lens assembly module according to the 6th embodiment in FIG. 6A.
Figure 6E:
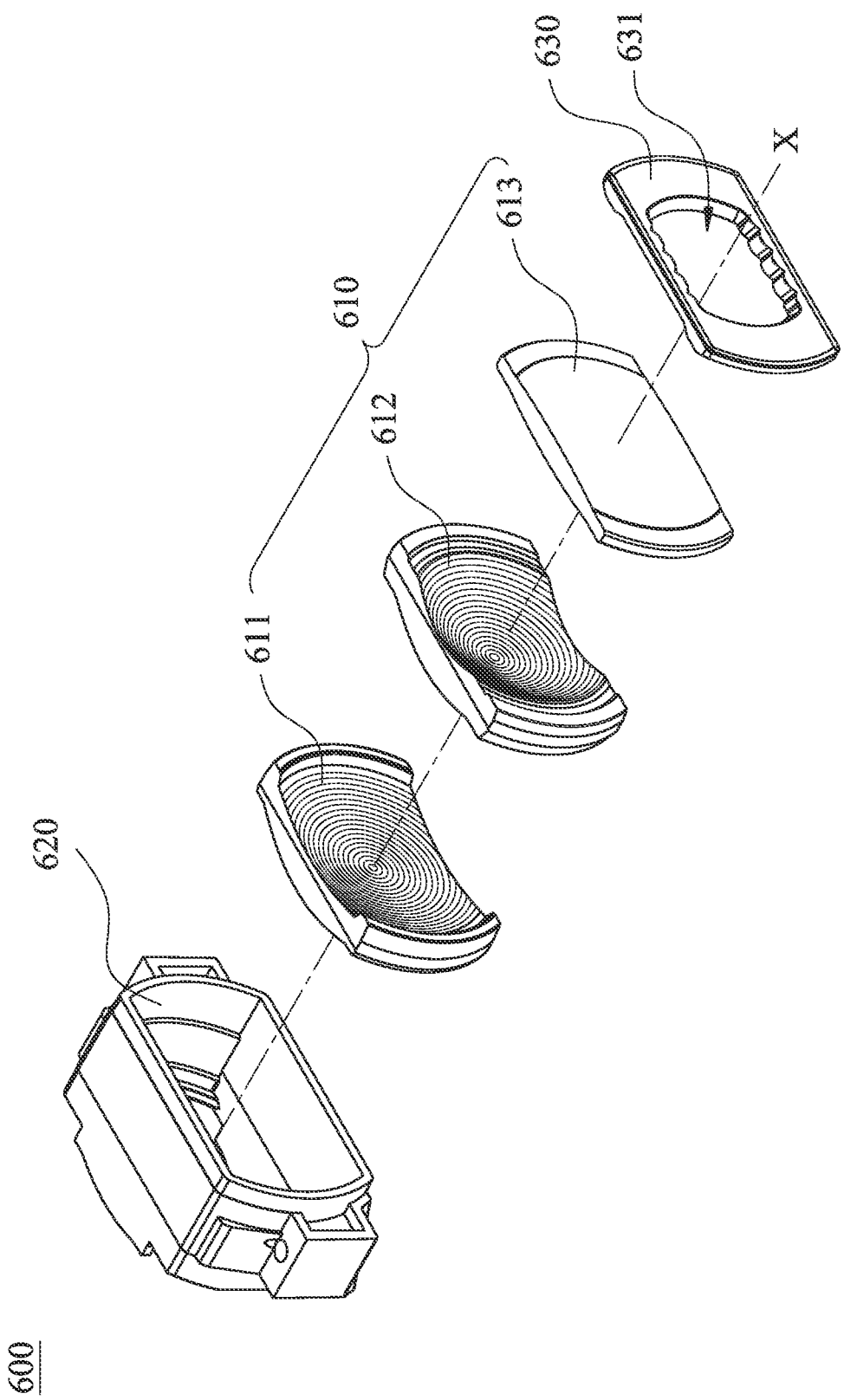
FIG. 6E is an exploded view of the imaging lens assembly module according to the 6th embodiment in FIG. 6A.

FIG. 6A is a schematic view of an imaging lens assembly module 600 according to the 6th embodiment of the present disclosure, FIG. 6B is another schematic view of the imaging lens assembly module 600 according to the 6th embodiment in FIG. 6A, FIG. 6C is a three-dimensional schematic view of the imaging lens assembly module 600 according to the 6th embodiment in FIG. 6A, FIG. 6D is another three-dimensional schematic view of the imaging lens assembly module 600 according to the 6th embodiment in FIG. 6A, and FIG. 6E is an exploded view of the imaging lens assembly module 600 according to the 6th embodiment in FIG. 6A. In FIG. 6A to FIG. 6E, the imaging lens assembly module 600 includes an imaging lens element set 610, a lens carrier 620 and a light blocking structure 630.

The imaging lens element set 610 includes a plurality of lens elements and has an optical axis X. In the 6th embodiment, the imaging lens element set 610 from an object side to an image side includes a first lens element 611, a second lens element 612 and a third lens element 613.

At least one lens element of the lens elements of the imaging lens element set 610 is disposed in the lens carrier 620, and the light blocking structure 630 is located on an image side of the lens elements. In the 6th embodiment, the first lens element 611, the second lens element 612 and the third lens element 613 are disposed in the lens carrier 620, and the light blocking structure 630 is located on an image side of the third lens element 613. Specifically, the light blocking structure 630 is disposed on the image side of the third lens element 613.

Furthermore, the lens carrier 620 can be a lens barrel or a plastic injection-molded member where a driver is disposed, wherein the lens carrier 620 can be any structure which can carry the lens elements, but the present disclosure is not limited thereto.

The light blocking structure 630 can be a light blocking sheet, a spacer, a retainer, a lens carrier or a metal light blocking sheet, but the present disclosure is not limited thereto. In the 6th embodiment, the light blocking structure 630 is a black plastic element. Specifically, the light blocking structure 630 is a spacer and disposed in the lens carrier 620. Hence, it is favorable for providing an opening structure in a high accuracy and increasing the yield rate of the products. The light blocking structure 630 can be an aperture stop of the imaging lens assembly module 600 for controlling an amount of an incident light of the imaging lens assembly module 600. Hence, it is favorable for increasing an efficiency of eliminating the stray light.

Figure 6F:
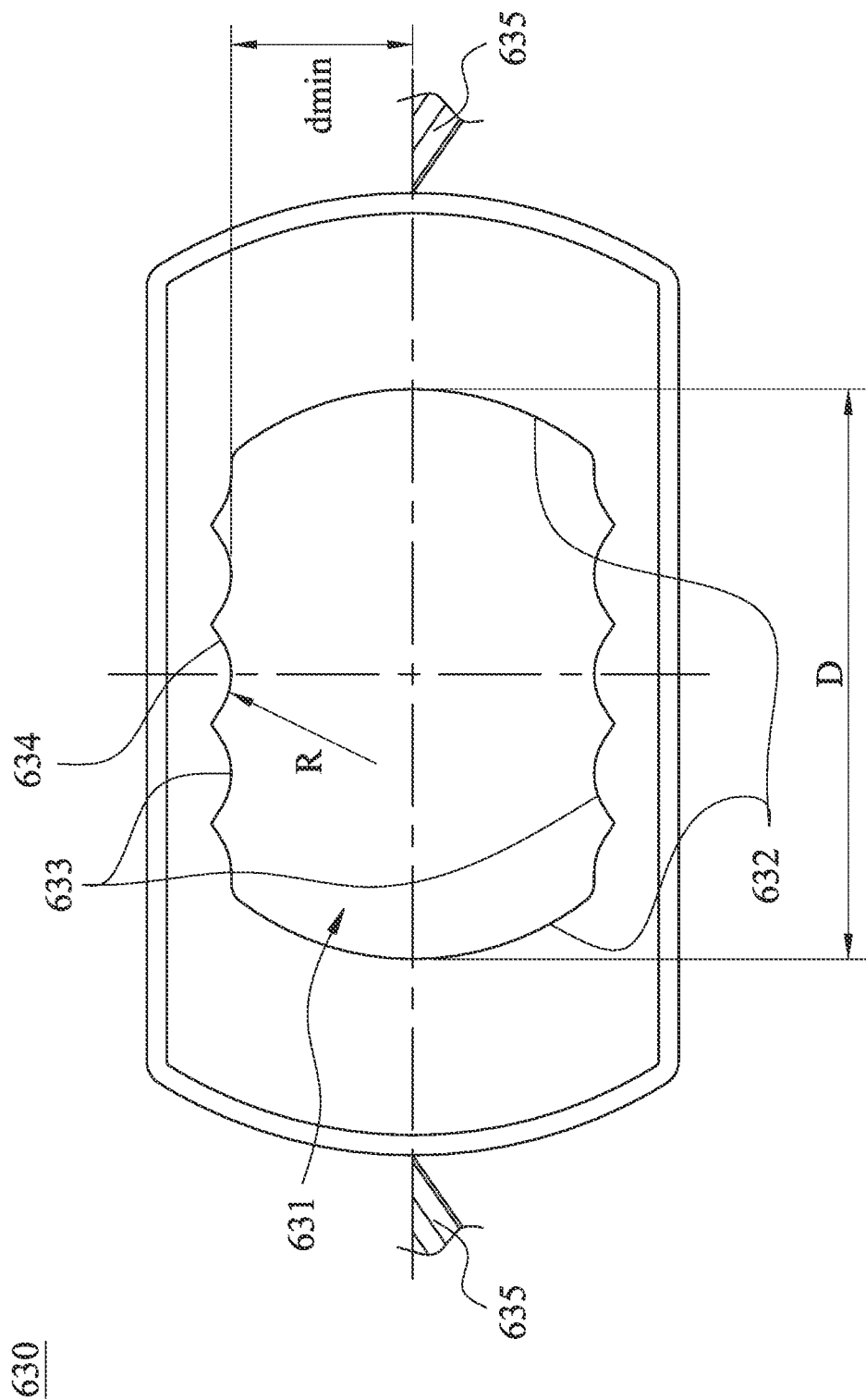
FIG. 6F is a schematic view of the parameters of the light blocking structure according to the 6th embodiment in FIG. 6A.

FIG. 6F is a schematic view of the parameters of the light blocking structure 630 according to the 6th embodiment in FIG. 6A. In FIG. 6E and FIG. 6F, the light blocking structure 630 includes a light blocking opening 631, and the optical axis X passes through the light blocking opening 631. The light blocking opening 631 includes at least two arc portions 632, a shrinking portion 633 and at least two gate traces 635, and the light blocking opening 631 forms an opening at a center of the light blocking structure 630. Each of the at least two arc portions 632 has a first curvature radius, and the first curvature radius is for defining a maximum diameter of the light blocking opening 631. The arc portions 632 can be arranged relatively along the optical axis X as a center. The shrinking portion 633 is connected to the arc portions 632 for forming the light blocking opening 631 into a non-circular shape, and the shrinking portion 633 includes at least one protruding arc 634. The protruding arc 634 extends and shrinks gradually from the shrinking portion 633 to the optical axis X, and the protruding arc 634 has a second curvature radius. In the 6th embodiment, a number of the arc portions 632 is two, a number of the gate traces 635 is two, a number of the at least one protruding arc 634 is ten, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 6th embodiment, a possibility of the stray light generated by the blocking opening 631 is decreased and the better image quality is maintained via a design of the light blocking opening 631. Moreover, an intensity of a light diffraction can be decreased via the protruding arc 634.

The protruding arc 634 can be a convex-shape arc or a shrinking protrusion made of concave arcs, but the present disclosure is not limited thereto. Specifically, the protruding arc 634 can further be a convex light blocking structure formed by one of a concave arc having a curvature radius and a convex arc having a curvature radius.

In FIG. 6F, when the maximum diameter of the light blocking opening 631 is D, the second curvature radius of the protruding arc 634 is R, a cross-sectional area of the light blocking opening 631 is A, a minimum distance between the protruding arc 634 and a center of the light blocking opening 631 is dmin, a maximum field of view of the imaging lens assembly module 600 is FOV, and a number of the lens elements of the imaging lens element set 610 is N, wherein $\pi$ is a ratio of a circumference of a circle to a diameter of the circle, the condition related to the parameters can be satisfied as the following Table 6.

TABLE 6

| the 6th embodiment | | | |
|---|---|---|---|
| D (mm) | 5.66 | $A/[\pi \times (D/2)^2]$ | 0.773 |
| R (mm) | 0.63 | dmin/D | 0.318 |
| A (mm$^2$) | 19.44 | FOV (degree) | 10.1 |
| dmin (mm) | 1.80 | N | 3 |
| R/D | 0.111 | | |

7th Embodiment

Figure 7A:
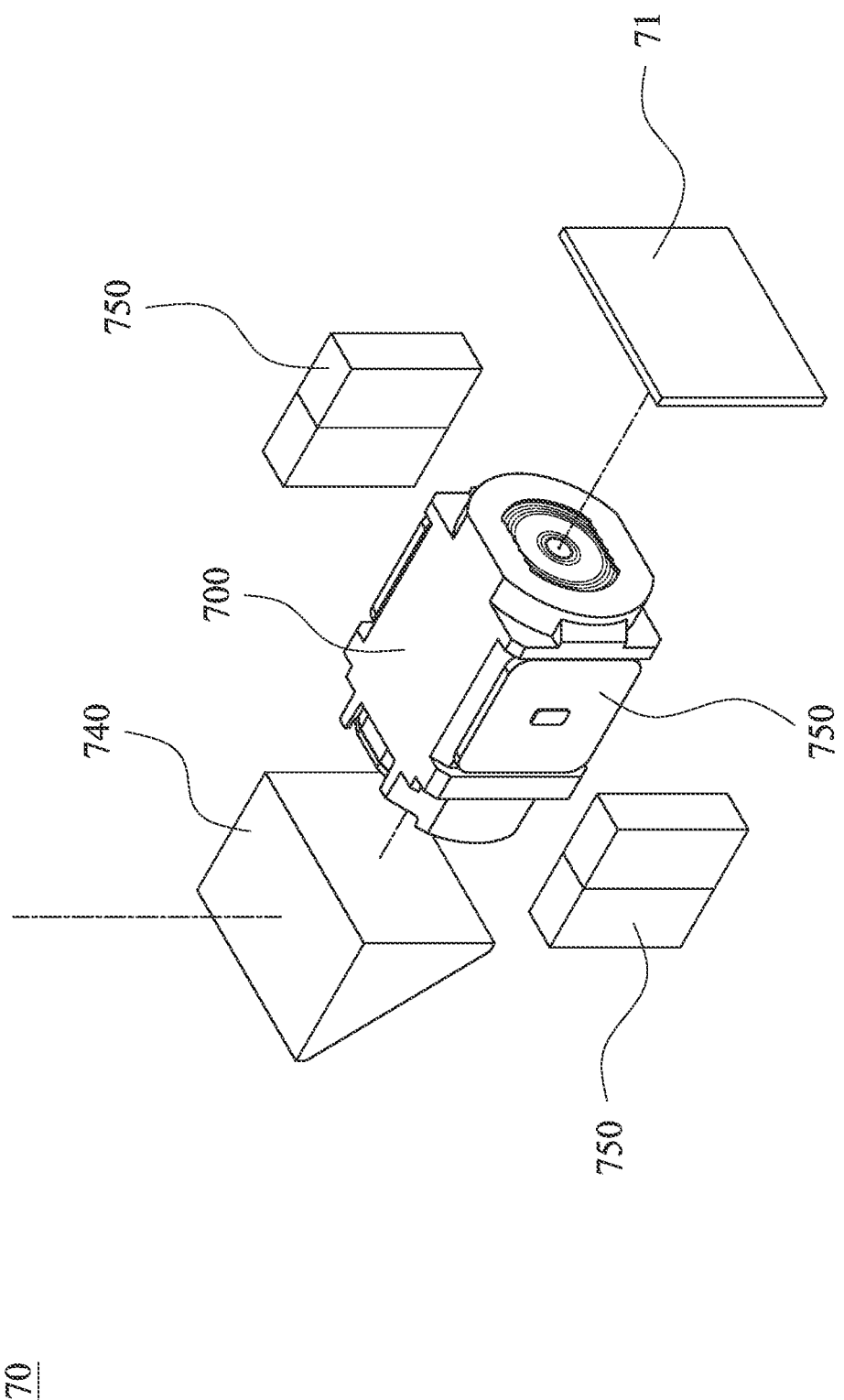
FIG. 7A is a schematic view of a camera module according to the 7th embodiment of the present disclosure.

FIG. 7A is a schematic view of a camera module 70 according to the 7th embodiment of the present disclosure. In FIG. 7A, the camera module 70 includes an imaging lens assembly module 700 and an image sensor 71, wherein the image sensor 71 is disposed on an image surface (not shown) of the imaging lens assembly module 700.

Figure 7B:
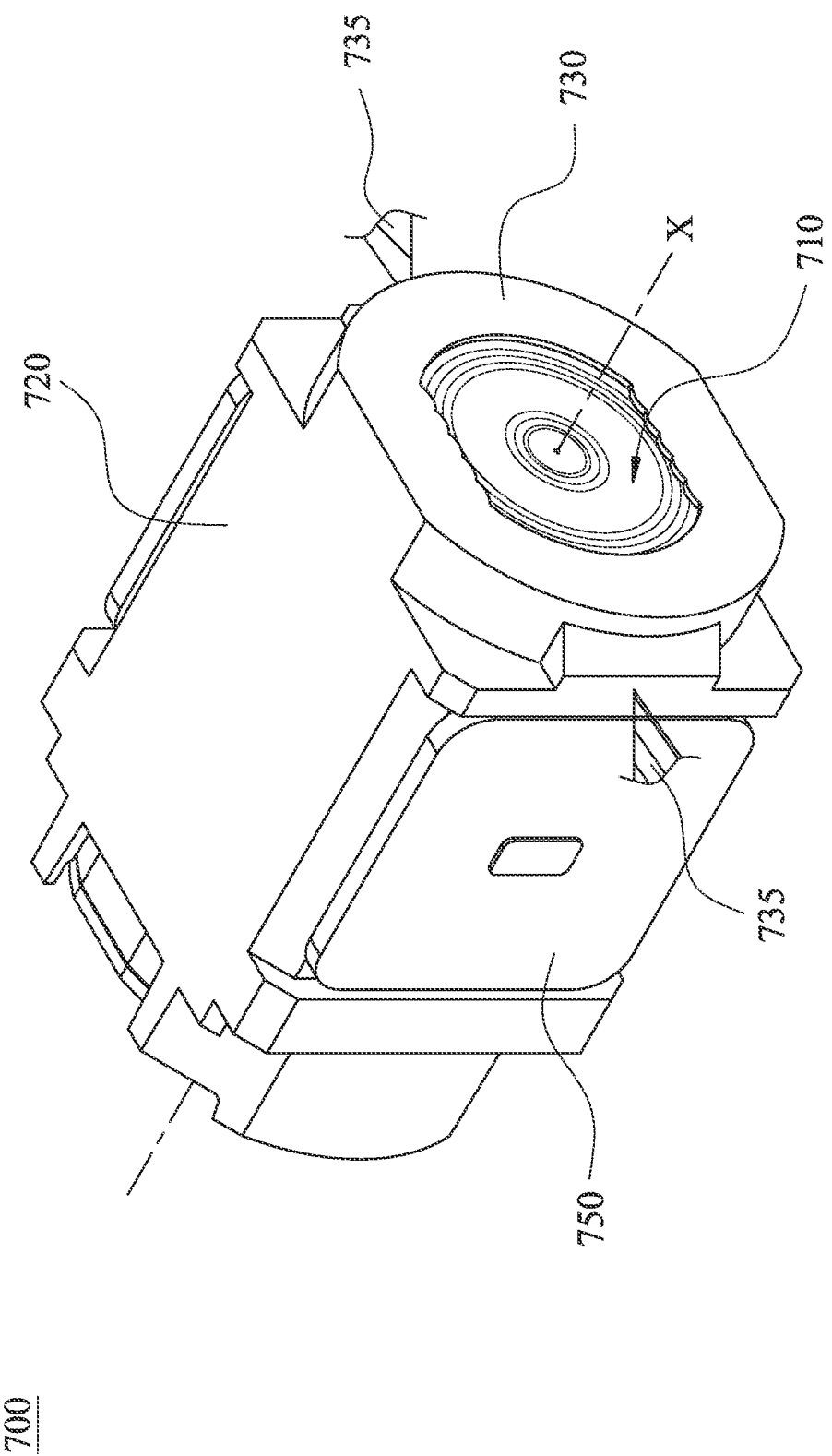
FIG. 7B is a schematic view of an imaging lens assembly module according to the 7th embodiment in FIG. 7A.

FIG. 7B is a schematic view of the imaging lens assembly module 700 according to the 7th embodiment in FIG. 7A. In FIG. 7A and FIG. 7B, the imaging lens assembly module 700 includes an imaging lens element set 710, a lens carrier 720, a light blocking structure 730, at least one reflecting element 740 and a driving device 750.

The imaging lens element set 710 includes a plurality of lens elements and has an optical axis X. In the 7th embodiment, a number of the lens elements of the imaging lens element set 710 can be three to eight, but a number of the lens elements is not limited thereto. Hence, it is favorable for providing the better resolving power.

At least one lens element of the lens elements of the imaging lens elements set 710 is disposed in the lens carrier 720, and the light blocking structure 730 is located on an image side of the lens elements.

Furthermore, the lens carrier 720 can be a lens barrel or a plastic injection-molded member where a driver is disposed, wherein the lens carrier 720 can be any structure which can carry the lens elements, but the present disclosure is not limited thereto.

The light blocking structure 730 can be a light blocking sheet, a spacer, a retainer, a lens carrier or a metal light blocking sheet, but the present disclosure is not limited thereto. In the 7th embodiment, the light blocking structure 730 is a black plastic element. Hence, it is favorable for providing an opening structure in a high accuracy and increasing the yield rate of the products. Simultaneously, the light blocking structure 730 and the lens carrier 720 can be made of plastic material and formed integrally. Hence, it is favorable for simplifying a procedure of manufacturing so as to promote the production. The light blocking structure 730 can be an aperture stop of the imaging lens assembly module 700 for controlling an amount of an incident light of the imaging lens assembly module 700. Hence, it is favorable for increasing an efficiency of eliminating the stray light.

The reflecting element 740 is located on at least one side of an object side and an image side of the imaging lens element set 710. In the 7th embodiment, the reflecting element 740 is located on the object side of the imaging lens element set 710. Hence, it is favorable for a space usage of a miniaturized lens assembly to achieve more efficient arrangement.

The driving device 750 is for driving the imaging lens element set 710 and the light blocking structure 730 to move simultaneously along at least one direction, wherein the driving device can be a voice coil motor, a piezoelectric motor or a MEMS actuator, but the present disclosure is not limited thereto. Hence, it is favorable for achieving an autofocus or image stabilizing function.

Figure 7C:
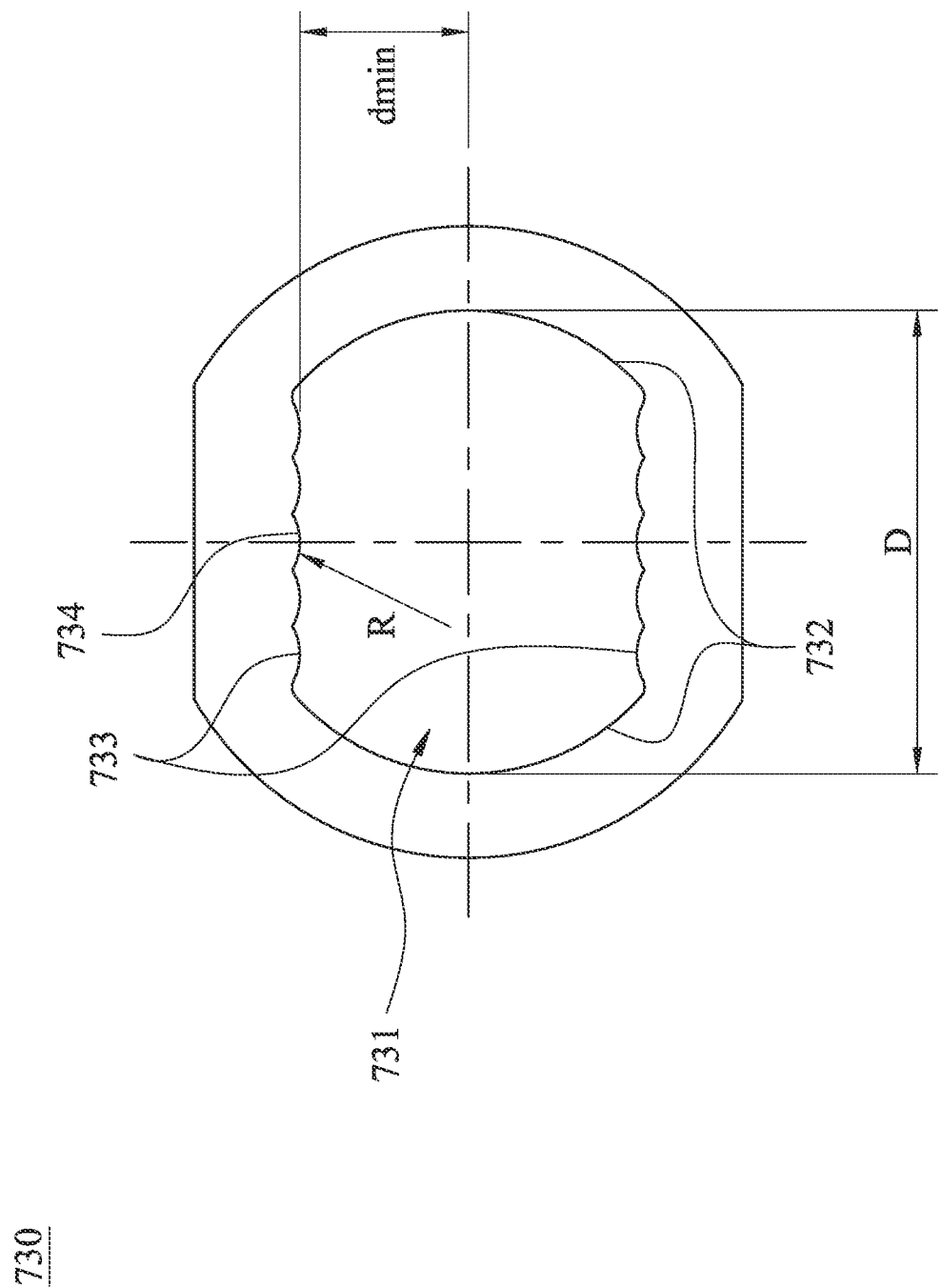
FIG. 7C is a schematic view of the parameters of the light blocking structure according to the 7th embodiment in FIG. 7A.

FIG. 7C is a schematic view of the parameters of the light blocking structure 730 according to the 7th embodiment in FIG. 7A. In FIG. 7C, the light blocking structure 730 includes a light blocking opening 731, and the optical axis X passes through the light blocking opening 731. The light blocking opening 731 includes at least two arc portions 732, a shrinking portion 733 and at least two gate traces 735, and the light blocking opening 731 forms an opening at a center of the light blocking structure 730. Each of the at least two arc portions 732 has a first curvature radius, and the first curvature radius is for defining a maximum diameter of the light blocking opening 731. The arc portions 732 can be arranged relatively along the optical axis X as a center. The shrinking portion 733 is connected to the arc portions 732 for forming the light blocking opening 731 into a non-circular shape, and the shrinking portion 733 includes at least one protruding arc 734. The protruding arc 734 extends and shrinks gradually from the shrinking portion 733 to the optical axis X, and the protruding arc 734 has a second curvature radius. In the 7th embodiment, a number of the arc portions 732 is two, a number of the gate traces 735 is two, a number of the at least one protruding arc 734 is ten, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 7th embodiment, a possibility of the stray light generated by the blocking opening 731 is decreased and the better image quality is maintained via a design of the light blocking opening 731. Moreover, an intensity of a light diffraction can be decreased via the protruding arc 734.

The protruding arc 734 can be a convex-shape arc or a shrinking protrusion made of concave arcs, but the present disclosure is not limited thereto. Specifically, the protruding arc 734 can further be a convex light blocking structure formed by one of a concave arc having a curvature radius and a convex arc having a curvature radius.

In FIG. 7C, when the maximum diameter of the light blocking opening 731 is D, the second curvature radius of the protruding arc 734 is R, a cross-sectional area of the light blocking opening 731 is A, a minimum distance between the protruding arc 734 and a center of the light blocking opening 731 is dmin, a maximum field of view of the imaging lens assembly module 700 is FOV, and a number of the lens elements of the imaging lens element set 710 is N, wherein π is a ratio of a circumference of a circle to a diameter of the circle, the condition related to the parameters can be satisfied as the following Table 7.

TABLE 7

| the 7th embodiment | | | |
|---|---|---|---|
| D (mm) | 3.30 | $A/[\pi \times (D/2)^2]$ | 0.845 |
| R (mm) | 0.4 | dmin/D | 0.364 |
| A (mm$^2$) | 7.23 | FOV (degree) | 19.5 |
| dmin (mm) | 1.20 | N | 5 |
| R/D | 0.121 | | |

8th Embodiment

Figure 8A:
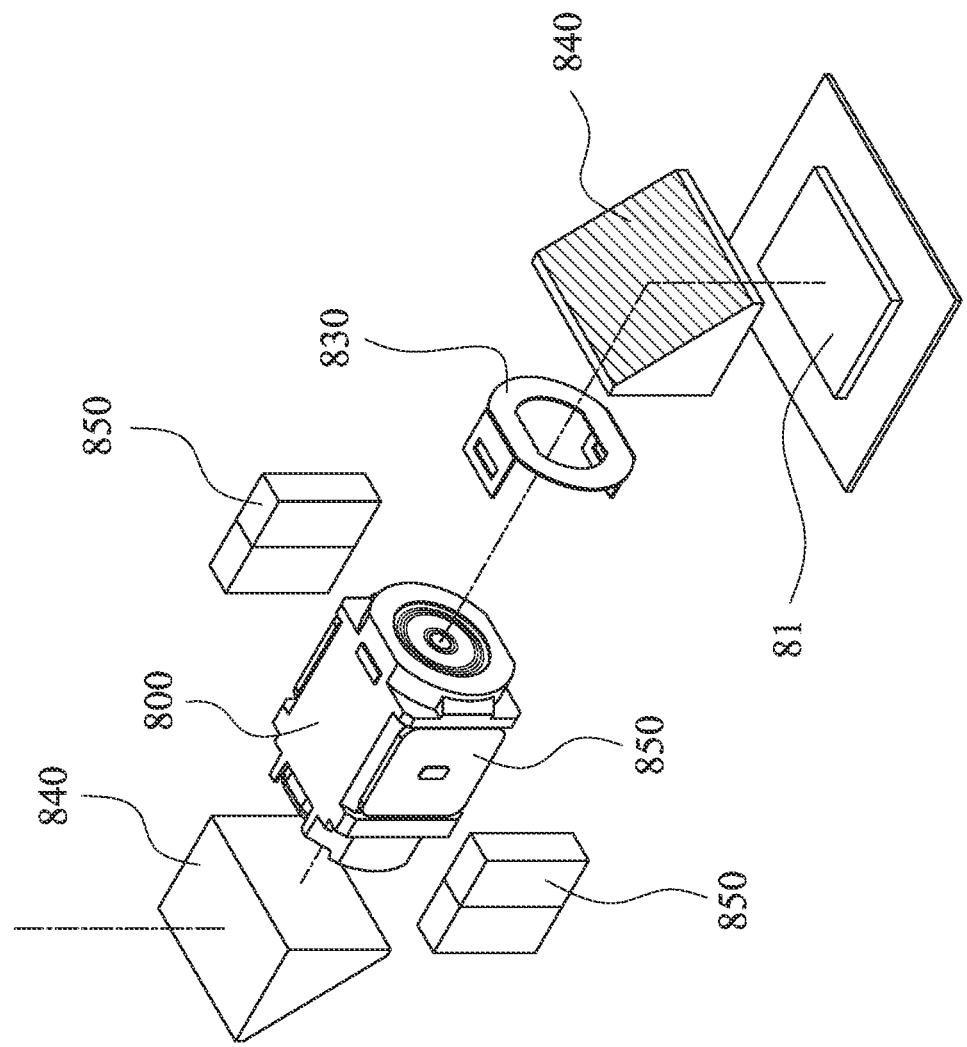
FIG. 8A is a schematic view of a camera module according to the 8th embodiment of the present disclosure.

FIG. 8A is a schematic view of a camera module 80 according to the 8th embodiment of the present disclosure. In FIG. 8A, the camera module 80 includes an imaging lens assembly module 800 and an image sensor 81, wherein the image sensor 81 is disposed on an image surface (not shown) of the imaging lens assembly module 800.

Figure 8B:
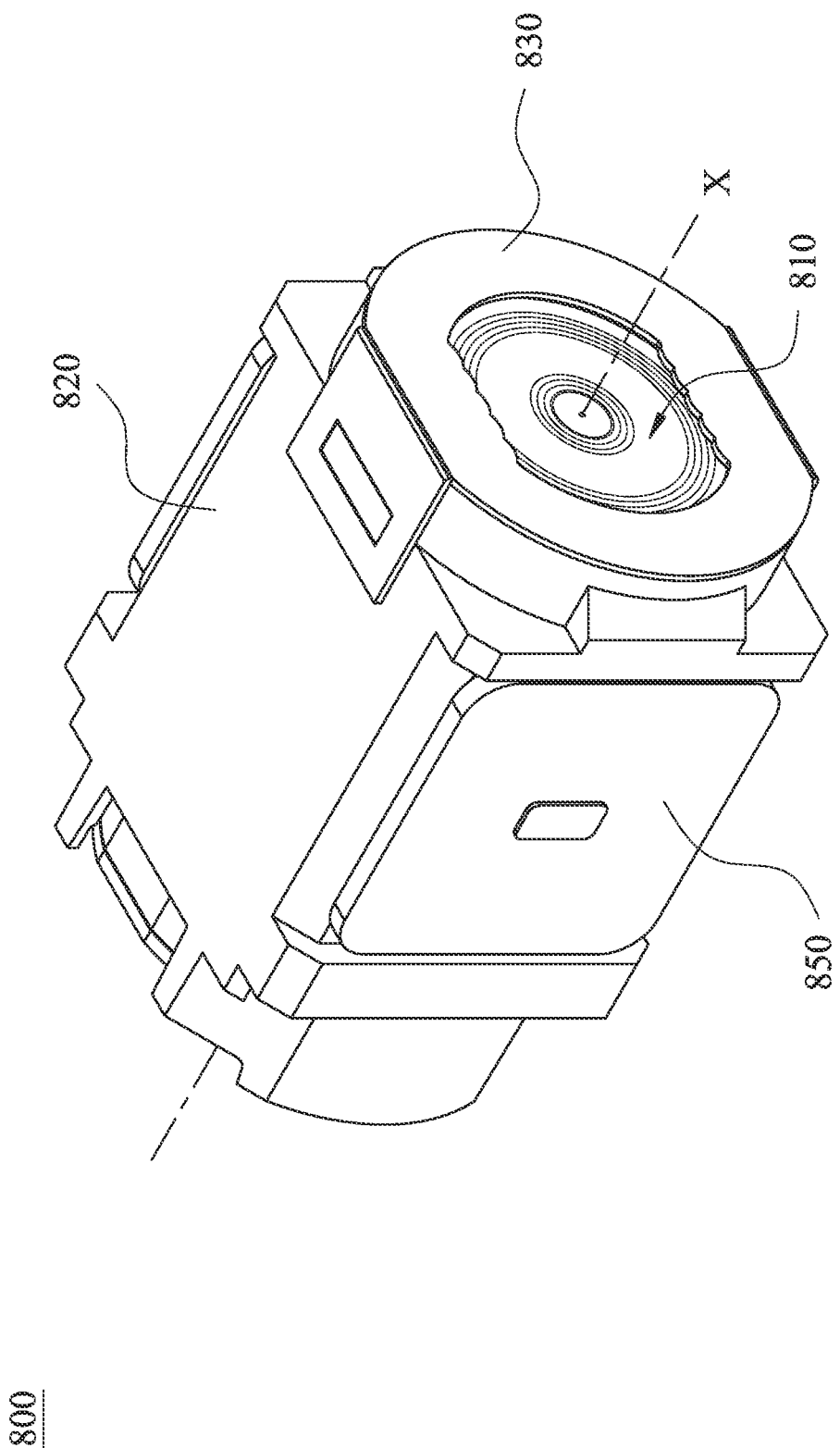
FIG. 8B is a schematic view of an imaging lens assembly module according to the 8th embodiment in FIG. 8A.

FIG. 8B is a schematic view of the imaging lens assembly module 800 according to the 8th embodiment in FIG. 8A. In FIG. 8A and FIG. 8B, the imaging lens assembly module 800 includes an imaging lens element set 810, a lens carrier 820, a light blocking structure 830, at least one reflecting element 840 and a driving device 850.

The imaging lens element set 810 includes a plurality of lens elements and has an optical axis X. In the 8th embodiment, a number of the lens elements of the imaging lens element set 810 can be three to eight, but a number of the lens elements is not limited thereto. Hence, it is favorable for providing the better resolving power.

At least one lens element of the lens elements of the imaging lens elements set 810 is disposed in the lens carrier 820, and the light blocking structure 830 is located on an image side of the lens elements. Specifically, the light blocking structure 830 is disposed on an image side of the lens elements.

Furthermore, the lens carrier 820 can be a lens barrel or a plastic injection-molded member where a driver is disposed, wherein the lens carrier 820 can be any structure which can carry the lens elements, but the present disclosure is not limited thereto.

The light blocking structure 830 can be a light blocking sheet, a spacer, a retainer, a lens carrier or a metal light blocking sheet, but the present disclosure is not limited thereto. In the 8th embodiment, the light blocking structure 830 is a light blocking sheet mounted on the lens carrier 820. Specifically, the light blocking structure 830 is a metal light blocking sheet and disposed on the image side of the lens carrier 820, wherein the assembling can be a assembling via overlaying elements, an adhesion via spot gluing, arrangement of spatial mechanisms and so on, but the present disclosure is not limited thereto. Hence, it is favorable for assembling and does not occupy too much the space. The light blocking structure 830 can be an aperture stop of the imaging lens assembly module 800 for controlling an amount of an incident light of the imaging lens assembly module 800. Hence, it is favorable for increasing an efficiency of eliminating the stray light.

The reflecting element 840 is located on at least one side of an object side and an image side of the imaging lens element set 810. In the 8th embodiment, the reflecting element 840 is located on the object side and the image side of the imaging lens element set 810. Hence, it is favorable for a space usage of a miniaturized lens assembly to achieve more efficient arrangement.

The driving device 850 is for driving the imaging lens element set 810 and the light blocking structure 830 to move simultaneously along at least one direction, wherein the driving device can be a voice coil motor, a piezoelectric motor or a MEMS actuator, but the present disclosure is not limited thereto. Hence, it is favorable for achieving an autofocus or image stabilizing function.

Figure 8C:
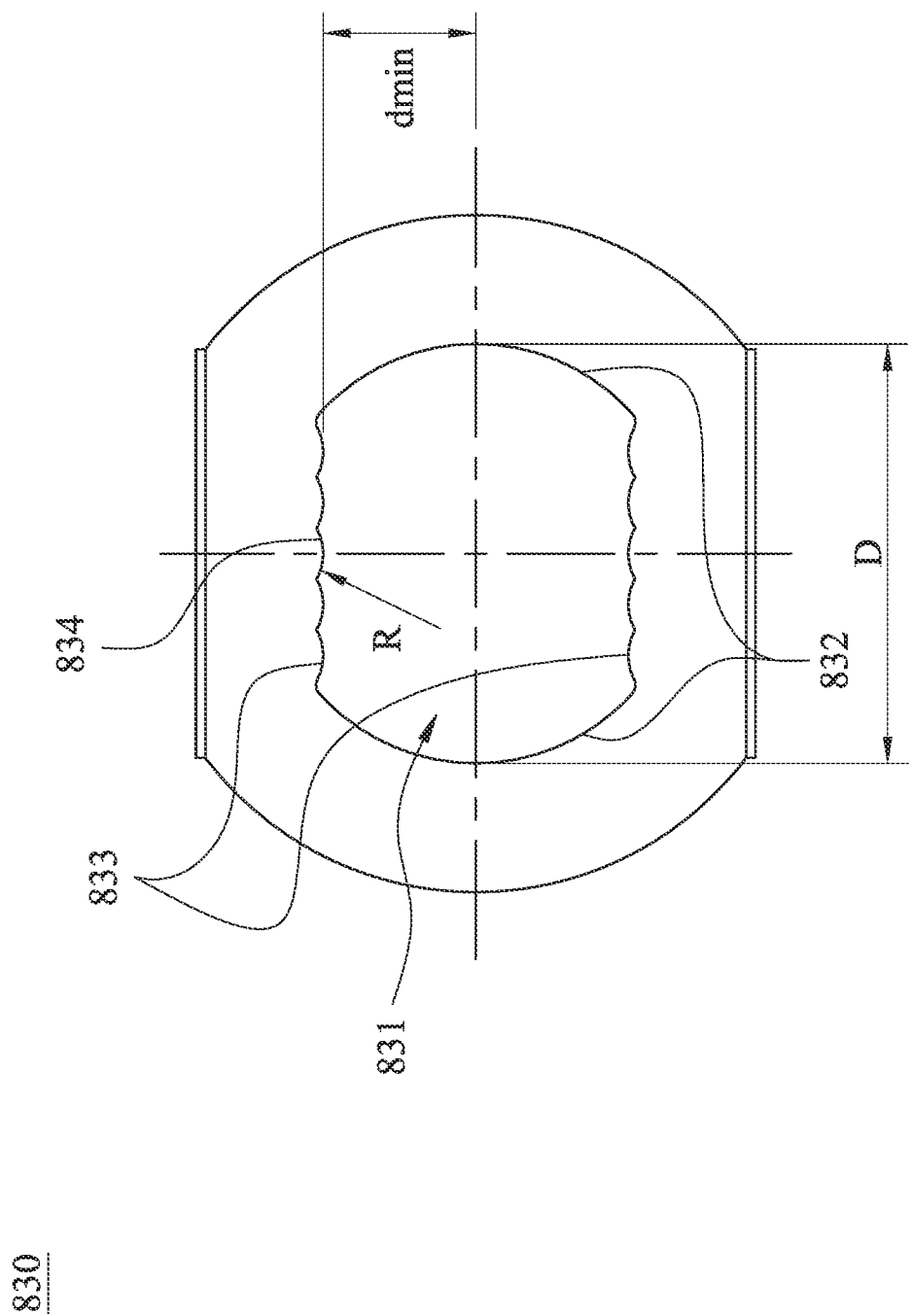
FIG. 8C is a schematic view of the parameters of the light blocking structure according to the 8th embodiment in FIG. 8A.

FIG. 8C is a schematic view of the parameters of the light blocking structure 830 according to the 8th embodiment in FIG. 8A. In FIG. 8C, the light blocking structure 830 includes a light blocking opening 831, and the optical axis X passes through the light blocking opening 831. The light blocking opening 831 includes at least two arc portions 832 and a shrinking portion 833, and the light blocking opening 831 forms an opening at a center of the light blocking structure 830. Each of the at least two arc portions 832 has a first curvature radius, and the first curvature radius is for defining a maximum diameter of the light blocking opening 831. The arc portions 832 can be arranged relatively along the optical axis X as a center. The shrinking portion 833 is connected to the arc portions 832 for forming the light blocking opening 831 into a non-circular shape, and the shrinking portion 833 includes at least one protruding arc 834. The protruding arc 834 extends and shrinks gradually from the shrinking portion 833 to the optical axis X, and the protruding arc 834 has a second curvature radius. In the 8th embodiment, a number of the arc portions 832 is two, a number of the at least one protruding arc 834 is ten, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 8th embodiment, a possibility of the stray light generated by the blocking opening 831 is decreased and the better image quality is maintained via a design of the light blocking opening 831. Moreover, an intensity of a light diffraction can be decreased via the protruding arc 834.

The protruding arc 834 can be a convex-shape arc or a shrinking protrusion made of concave arcs, but the present disclosure is not limited thereto. Specifically, the protruding arc 834 can further be a convex light blocking structure formed by one of a concave arc having a curvature radius and a convex arc having a curvature radius.

In FIG. 8C, when the maximum diameter of the light blocking opening 831 is D, the second curvature radius of the protruding arc 834 is R, a cross-sectional area of the light blocking opening 831 is A, a minimum distance between the protruding arc 834 and a center of the light blocking opening 831 is dmin, a maximum field of view of the imaging lens assembly module 800 is FOV, and a number of the lens elements of the imaging lens element set 810 is N, wherein $\pi$ is a ratio of a circumference of a circle to a diameter of the circle, the condition related to the parameters can be satisfied as the following Table 8.

TABLE 8

| the 8th embodiment | | | |
|---|---|---|---|
| D (mm) | 4.40 | $A/[\pi \times (D/2)^2]$ | 0.845 |
| R (mm) | 0.53 | dmin/D | 0.364 |
| A (mm$^2$) | 12.85 | FOV (degree) | 26.9 |
| dmin (mm) | 1.60 | N | 4 |
| R/D | 1.20 | | |

9th Embodiment

FIG. 9 is a schematic view of a light blocking structure 930 according to the 9th embodiment of the present disclosure. In FIG. 9, an imaging lens assembly module (not shown) includes an imaging lens element set (not shown), a lens carrier (not shown) and a light blocking structure 930. The imaging lens element set includes a plurality of lens elements and has an optical axis (its reference numeral is omitted). At least one lens element of the lens elements of the imaging lens elements set is disposed in the lens carrier, and the light blocking structure 930 is located on an image side of the lens elements. Specifically, the light blocking structure 930 is disposed on the image side of the lens elements.

The light blocking structure 930 can be a light blocking sheet, a spacer, a retainer, a lens carrier or a metal light blocking sheet, but the present disclosure is not limited thereto. In the 9th embodiment, the light blocking structure 930 is a light blocking sheet mounted on the lens carrier, and the light blocking structure 930 is disposed on an image side of the lens carrier. The assembling can be a assembling via overlaying elements, an adhesion via spot gluing, arrangement of spatial mechanisms and so on, but the present disclosure is not limited thereto. Hence, it is favorable for assembling and does not occupy too much the space. The light blocking structure 930 can be an aperture stop of the imaging lens assembly module for controlling an amount of an incident light of the imaging lens assembly module. Hence, it is favorable for increasing an efficiency of eliminating the stray light.

The light blocking structure 930 includes a light blocking opening 931, and the optical axis passes through the light blocking opening 931. The light blocking opening 931 includes at least two arc portions 932 and a shrinking portion 933, and the light blocking opening 931 forms an opening at a center of the light blocking structure 930. Each of the at least two arc portions 932 has a first curvature radius, and the first curvature radius is for defining a maximum diameter of the light blocking opening 931. The arc portions 932 can be arranged relatively along the optical axis as a center. The shrinking portion 933 is connected to the arc portions 932 for forming the light blocking opening 931 into a non-circular shape, and the shrinking portion 933 includes at least one protruding arc 934. The protruding arc 934 extends and shrinks gradually from the shrinking portion 933 to the optical axis, and the protruding arc 934 has a second curvature radius. In the 9th embodiment, a number of the arc portions 932 is two, a number of the at least one protruding arc 934 is twenty two, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 9th embodiment, a possibility of the stray light generated by the blocking opening 931 is decreased and the better image quality is maintained via a design of the light blocking opening 931. Moreover, an intensity of a light diffraction can be decreased via the protruding arc 934.

The protruding arc 934 can be a convex-shape arc or a shrinking protrusion made of concave arcs, but the present disclosure is not limited thereto. Specifically, the protruding arc 934 can further be a convex light blocking structure formed by one of a concave arc having a curvature radius and a convex arc having a curvature radius.

Because the only difference between the 9th embodiment and 2nd embodiment is the light blocking structure, numbers and arrangements of the other elements according to the 9th embodiment are the same and will not be described again herein.

In FIG. 9, when the maximum diameter of the light blocking opening 931 is D, the second curvature radius of the protruding arc 934 is R, a cross-sectional area of the light blocking opening 931 is A, a minimum distance between the protruding arc 934 and a center of the light blocking opening 931 is dmin, a maximum field of view of the imaging lens assembly module is FOV, and a number of the lens elements of the imaging lens element set is N, wherein π is a ratio of a circumference of a circle to a diameter of the circle, the condition related to the parameters can be satisfied as the following Table 9.

TABLE 9

| the 9th embodiment | | | |
|---|---|---|---|
| D (mm) | 5.66 | A/[π × (D/2)$^2$] | 0.775 |
| R (mm) | 0.20 | dmin/D | 0.318 |
| A (mm$^2$) | 19.49 | FOV (degree) | 10.1 |
| dmin (mm) | 1.80 | N | 3 |
| R/D | 0.035 | | |

10th Embodiment

Figure 10:
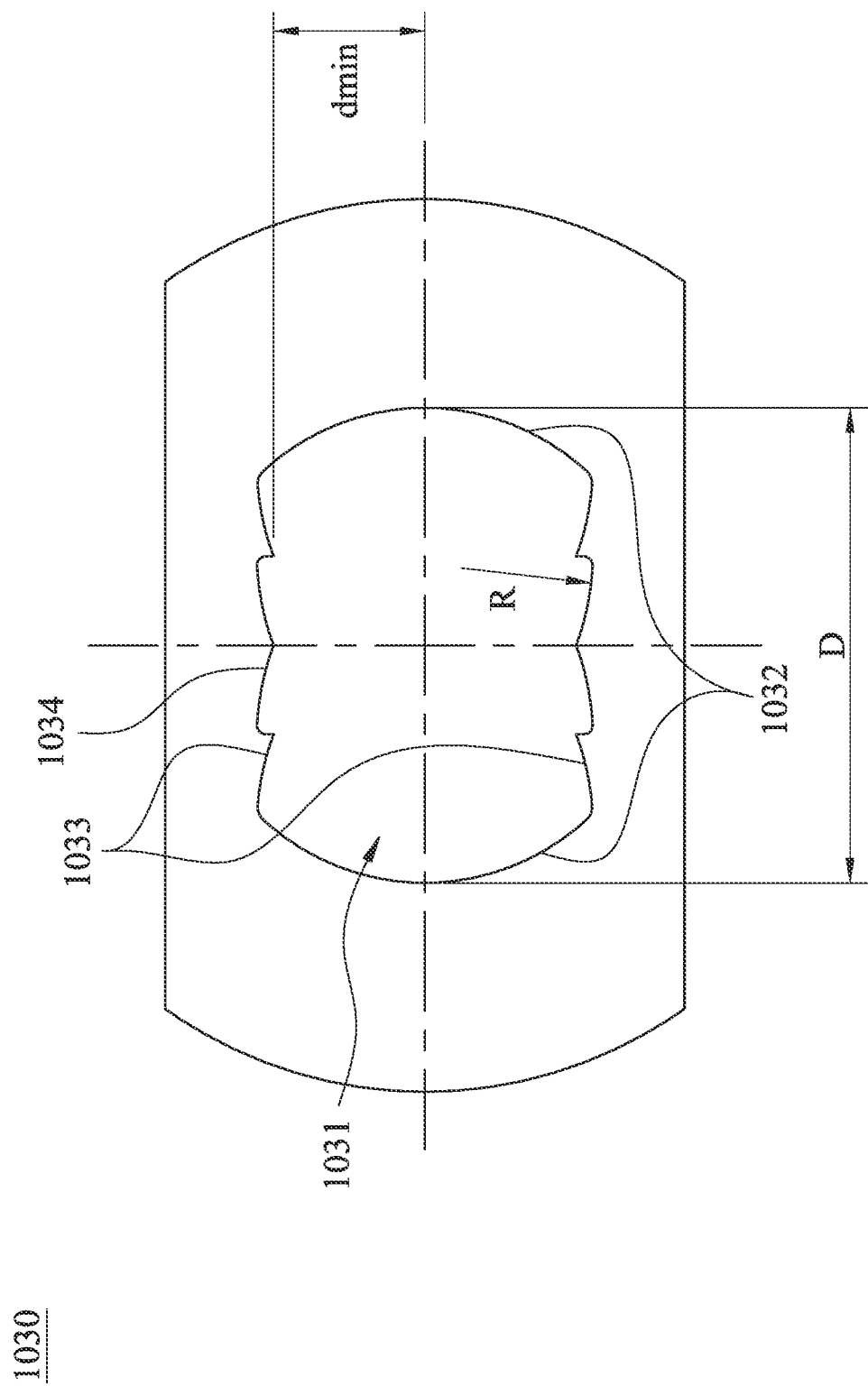
FIG. 10 is a three-dimensional schematic view of the imaging lens assembly module according to the 1st embodiment in FIG. 1A.

FIG. 10 is a schematic view of a light blocking structure 1030 according to the 10th embodiment of the present disclosure. In FIG. 10, an imaging lens assembly module (not shown) includes an imaging lens element set (not shown), a lens carrier (not shown) and a light blocking structure 1030. The imaging lens element set includes a plurality of lens elements and has an optical axis (its reference numeral is omitted). At least one lens element of the lens elements of the imaging lens elements set is disposed in the lens carrier, and the light blocking structure 1030 is located on an image side of the lens elements.

The light blocking structure 1030 can be a light blocking sheet, a spacer, a retainer, a lens carrier or a metal light blocking sheet, but the present disclosure is not limited thereto. In the 10th embodiment, the light blocking structure 1030 is a black plastic element. Hence, it is favorable for providing an opening structure in a high accuracy and increasing the yield rate of the products. Simultaneously, the light blocking structure 1030 and the lens carrier can be made of plastic material and formed integrally. Hence, it is favorable for simplifying a procedure of manufacturing so as to promote the production. The light blocking structure 1030 can be an aperture stop of the imaging lens assembly module for controlling an amount of an incident light of the imaging lens assembly module. Hence, it is favorable for increasing an efficiency of eliminating the stray light.

The light blocking structure 1030 includes a light blocking opening 1031, and the optical axis passes through the light blocking opening 1031. The light blocking opening 1031 includes at least two arc portions 1032 and a shrinking portion 1033, and the light blocking opening 1031 forms an opening at a center of the light blocking structure 1030. Each of the at least two arc portions 1032 has a first curvature radius, and the first curvature radius is for defining a maximum diameter of the light blocking opening 1031. The arc portions 1032 can be arranged relatively along the optical axis as a center. The shrinking portion 1033 is connected to the arc portions 1032 for forming the light blocking opening 1031 into a non-circular shape, and the shrinking portion 1033 includes at least one protruding arc 1034. The protruding arc 1034 extends and shrinks gradually from the shrinking portion 1033 to the optical axis, and the protruding arc 1034 has a second curvature radius. In the 10th embodiment, a number of the arc portions 1032 is two, a number of the at least one protruding arc 1034 is six, but the present disclosure is not limited to the aforementioned numbers.

In the conventional art, in order to satisfy a miniaturization of the imaging lens assembly module, a light blocking opening is disposed on an imaging lens assembly module; however, the light blocking opening will be forced to shrink so that a high intensity of a stray light is easily to be generated on the light blocking opening. Thus, in the 10th embodiment, a possibility of the stray light generated by the blocking opening 1031 is decreased and the better image quality is maintained via a design of the light blocking opening 1031. Moreover, an intensity of a light diffraction can be decreased via the protruding arc 1034.

The protruding arc 1034 can be a convex-shape arc or a shrinking protrusion made of concave arcs, but the present disclosure is not limited thereto. Specifically, the protruding arc 1034 can further be a convex light blocking structure formed by one of a concave arc having a curvature radius and a convex arc having a curvature radius.

Because the only difference between the 10th embodiment and 1st embodiment is the light blocking structure, numbers and arrangements of the other elements according to the 10th embodiment are the same and will not be described again herein.

In FIG. 10, when the maximum diameter of the light blocking opening 1031 is D, the second curvature radius of the protruding arc 1034 is R, a cross-sectional area of the light blocking opening 1031 is A, a minimum distance between the protruding arc 1034 and a center of the light blocking opening 1031 is dmin, a maximum field of view of the imaging lens assembly module is FOV, and a number of the lens elements of the imaging lens element set is N, wherein π is a ratio of a circumference of a circle to a diameter of the circle, the condition related to the parameters can be satisfied as the following Table 10.

TABLE 10

| the 10th embodiment | | | |
|---|---|---|---|
| D (mm) | 5.66 | A/[π × (D/2)$^2$] | 0.794 |
| R (mm) | 3.12 | dmin/D | 0.318 |
| A (mm$^2$) | 19.99 | FOV (degree) | 10.1 |
| dmin (mm) | 1.80 | N | 3 |
| R/D | 0.551 | | |

11th Embodiment

Figure 11A:
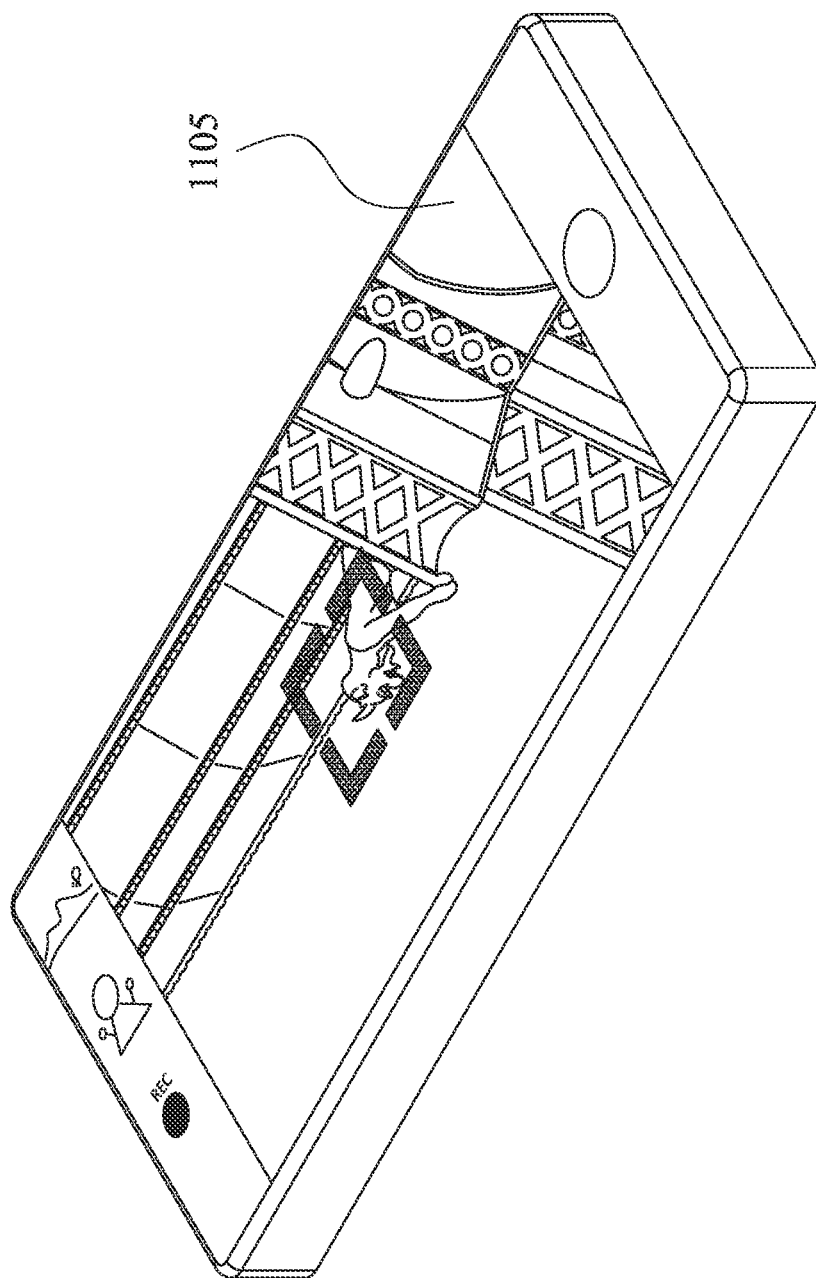
FIG. 11A is a schematic view of an electronic device according to the 11th embodiment of the present disclosure.
Figure 11B:
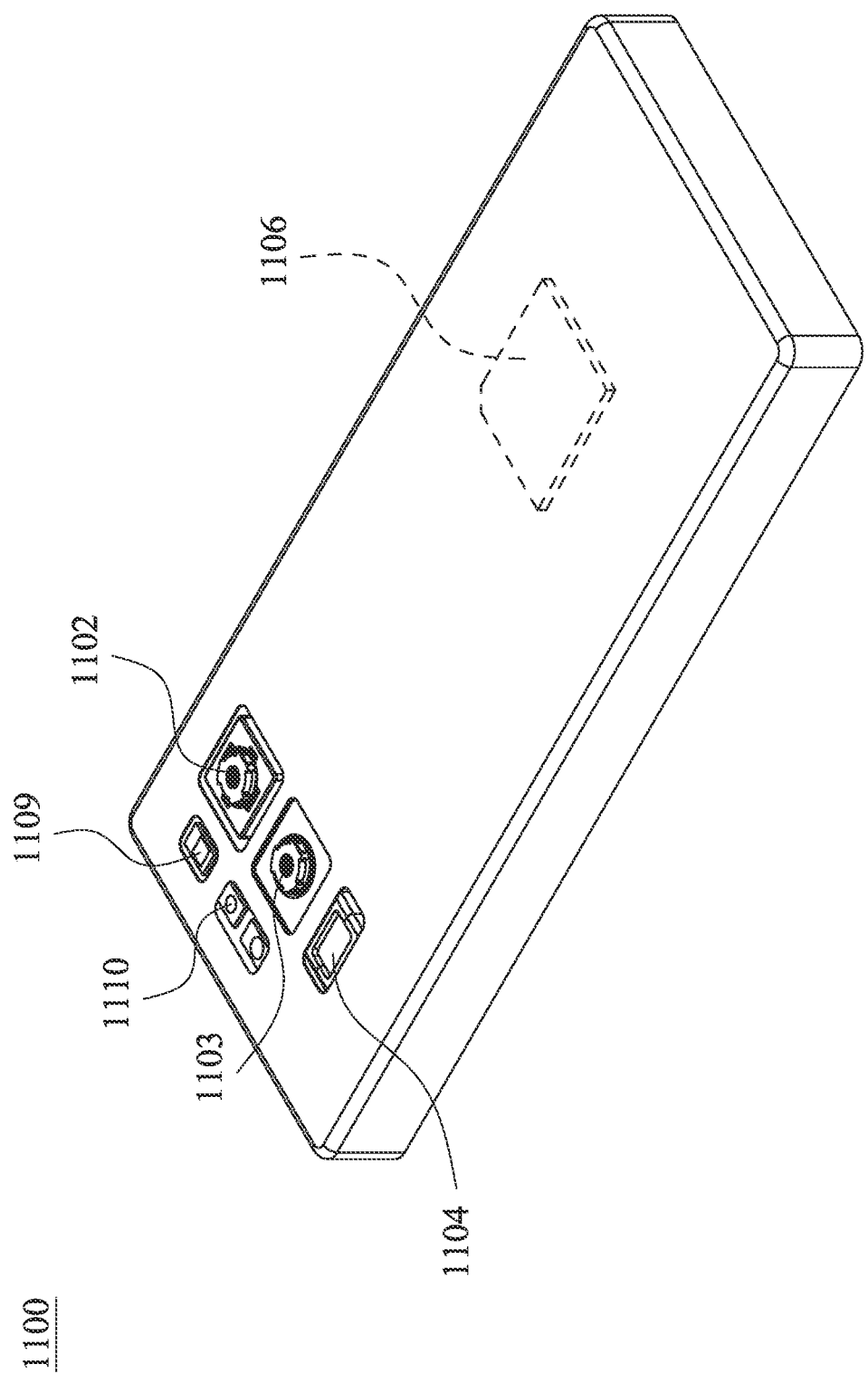
FIG. 11B is another schematic view of the electronic device according to the 11th embodiment in FIG. 11A.
Figure 11C:
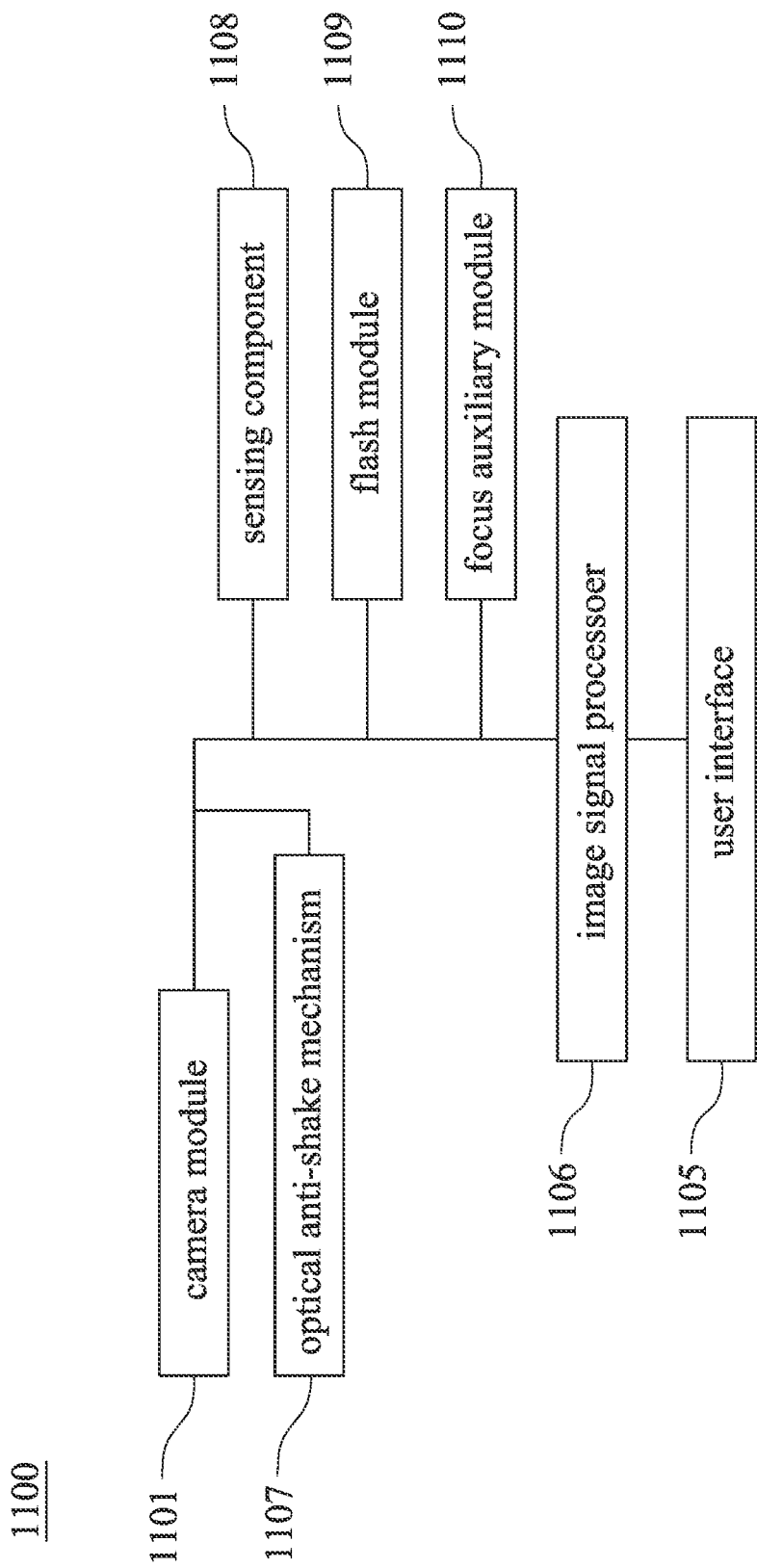
FIG. 11C is a block diagram of the electronic device according to the 11th embodiment in FIG. 11A.

FIG. 11A is a schematic view of an electronic device 1100 according to the 11th embodiment of the present disclosure, and FIG. 11B is another schematic view of the electronic device 1100 according to the 11th embodiment in FIG. 11A. In FIG. 11A and FIG. 11B, the electronic device 1100 according to the 11th embodiment is a smartphone, the electronic device 1100 includes a camera module 1101 (as shown in FIG. 11C), and the camera module 1101 is an ultra-wide angle camera module 1102, a high-pixel camera module 1103 and a telephoto camera module 1104. The camera module 1101 includes an imaging lens assembly module (not shown) and an image sensor (not shown), and the image sensor is disposed on an image surface (not shown). Furthermore, the imaging lens assembly module can be any one according to the 1st embodiment to the 10th embodiment, but the present disclosure is not limited thereto. Hence, it is favorable for fulfilling a mass production and an appearance requirement of a camera module where the imaging lens assembly module is carried in the recent market of electronic devices.

Furthermore, the user can activate the capturing mode by a user interface 1105 of the electronic device 1100, wherein the user interface 1105 according to the 11th embodiment can be a touch screen for displaying a screen and having a touch function, and the user interface 1105 can be for manually adjusting field of view to switch the different camera module 1101. At this moment, the imaging lens assembly module of the camera module 1101 collects an imaging light on the image sensor and outputs electronic signals associated with images to an image signal processor (ISP) 1106.

FIG. 11C is a block diagram of the electronic device 1100 according to the 11th embodiment in FIG. 11A. In FIG. 11B and FIG. 11C, the electronic device 1100 can further include an optical anti-shake mechanism 1107. Moreover, the electronic device 1100 can further include at least one focusing assisting module 1110 and at least one sensing component 1108. The focusing assisting module 1110 can be a flash module 1109, an infrared distance measurement component, a laser focus module, etc. The flash module 1109 is for compensating the color temperature. The sensing component 1108 can have functions for sensing physical momentum and kinetic energies, such as an accelerator, a gyroscope, and a Hall effect element, so as to sense shaking or jitters applied by hands of the user or external environments. Thus the autofocus function and the optical anti-shake mechanism 1107 of the imaging lens assembly module disposed on the electronic device 1100 can function to obtain a great image quality and facilitate the electronic device 1100 according to the present disclosure to have a capturing function with multiple modes, such as taking optimized selfies, high dynamic range (HDR) with a low light source, 4K resolution recording, etc. Furthermore, the user can visually see the captured image of the camera through the user interface 1105 and manually operate the view finding range on the user interface 1105 to achieve the auto focus function of what you see is what you get.

Furthermore, the imaging lens assembly module, the image sensor, the optical anti-shake mechanism 1107, the sensing component 1108 and the focusing assisting module 1110 can be disposed on a flexible printed circuit board (FPC) (its reference numeral is omitted) and electrically connected to the ISP 1106 and so on via a connector (not shown) so as to operate a picturing process. Recent electronic devices such as smartphones have a trend towards thinness and lightness. The imaging lens assembly module and the related elements are disposed on a FPC and circuits are assembled into a main board of an electronic device by a connector. Hence, it can fulfill a mechanical design of a limited inner space of the electronic device and a requirement of a circuit layout and obtain a larger allowance, and it is also favorable for an autofocus function of the imaging lens assembly module obtaining a flexible control via a touch screen of the electronic device. In the 11th embodiment, the electronic device 1100 can include a plurality of the sensing component 1108 and a plurality of the focusing assisting module 1110, and the sensing component 1108 and the focusing assisting module 1110 are disposed on a FPC and another at least one FPC (not shown) and electrically connected to the ISP 1106 and so on via a corresponding connector so as to operate a picturing process. In other embodiment (not shown), the sensing component and the auxiliary optical elements can be disposed on a main board of an electronic device or a board of the other form according to a mechanical design and a requirement of a circuit layout.

Furthermore, the electronic device 1100 can further include, but not be limited to, a display, a control unit, a storage unit, a random-access memory (RAM), a read-only memory (ROM), or the combination thereof.

Figure 11D:
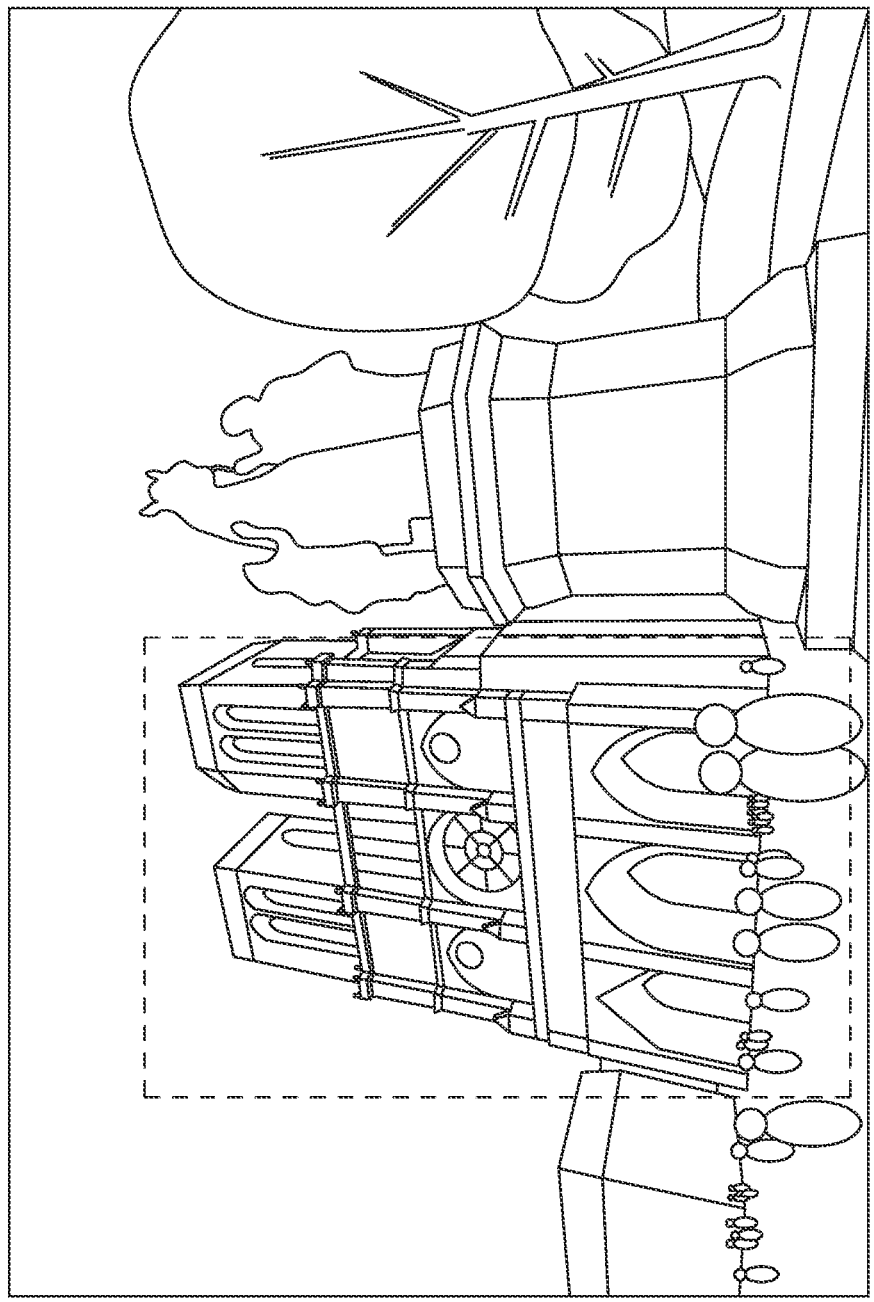
FIG. 11D is a schematic view of an image captured by an ultra-wide angle camera module according to the 11th embodiment in FIG. 11A.

FIG. 11D is a schematic view of an image captured by the ultra-wide angle camera module 1102 according to the 11th embodiment in FIG. 11A. In FIG. 11D, a larger ranged image can be captured via the ultra-wide angle camera module 1102, and the ultra-wide angle camera module 1102 has a function for containing more views.

Figure 11E:
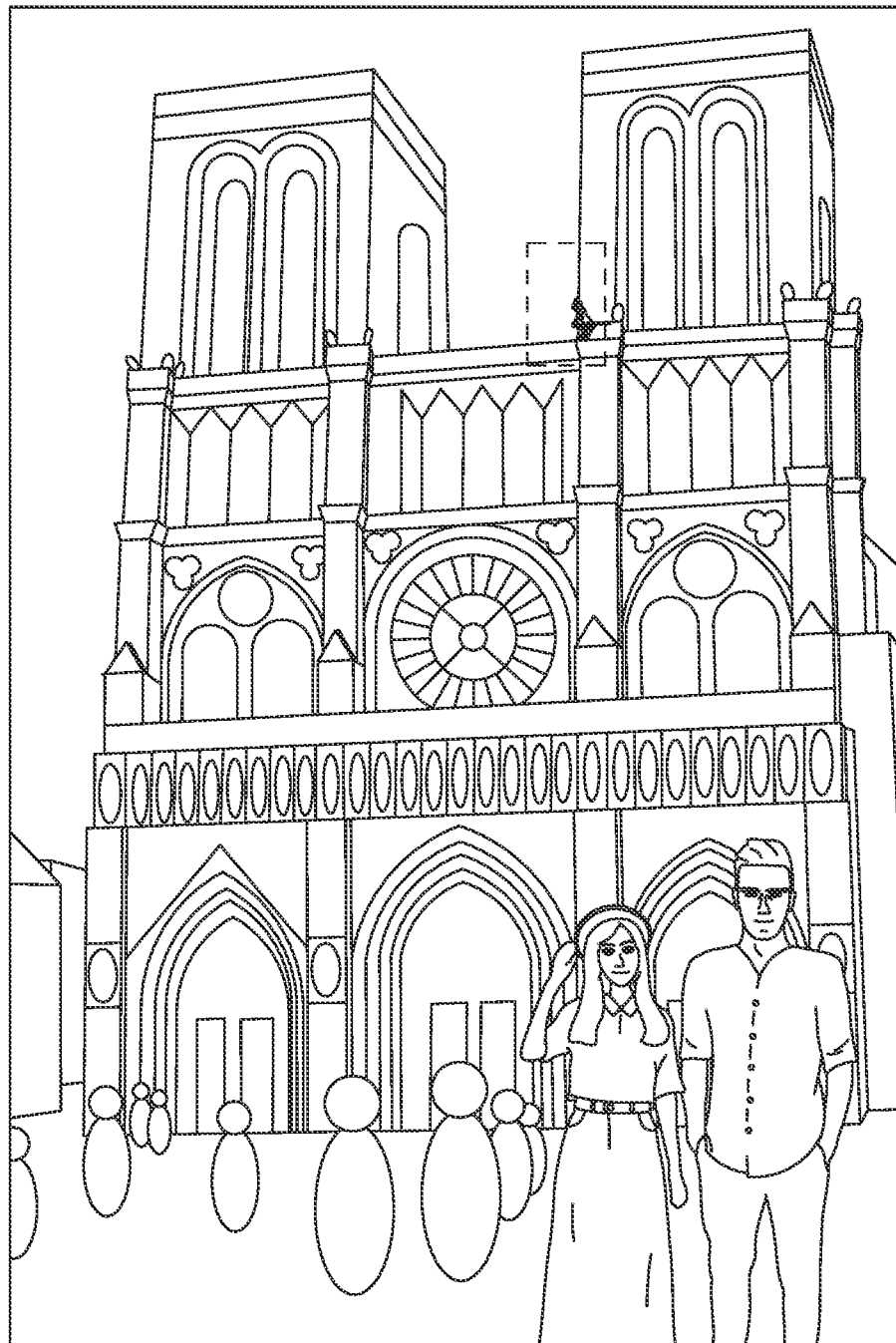
FIG. 11E is a schematic view of an image captured by a high-pixel camera module according to the 11th embodiment in FIG. 11A.

FIG. 11E is a schematic view of an image captured by the high-pixel camera module 1103 according to the 11th embodiment in FIG. 11A. In FIG. 11E, a certain ranged and high-pixel image can be captured via the high-pixel camera module 1103, and the high-pixel camera module 1103 has a function for high resolution and low distortion.

Figure 11F:
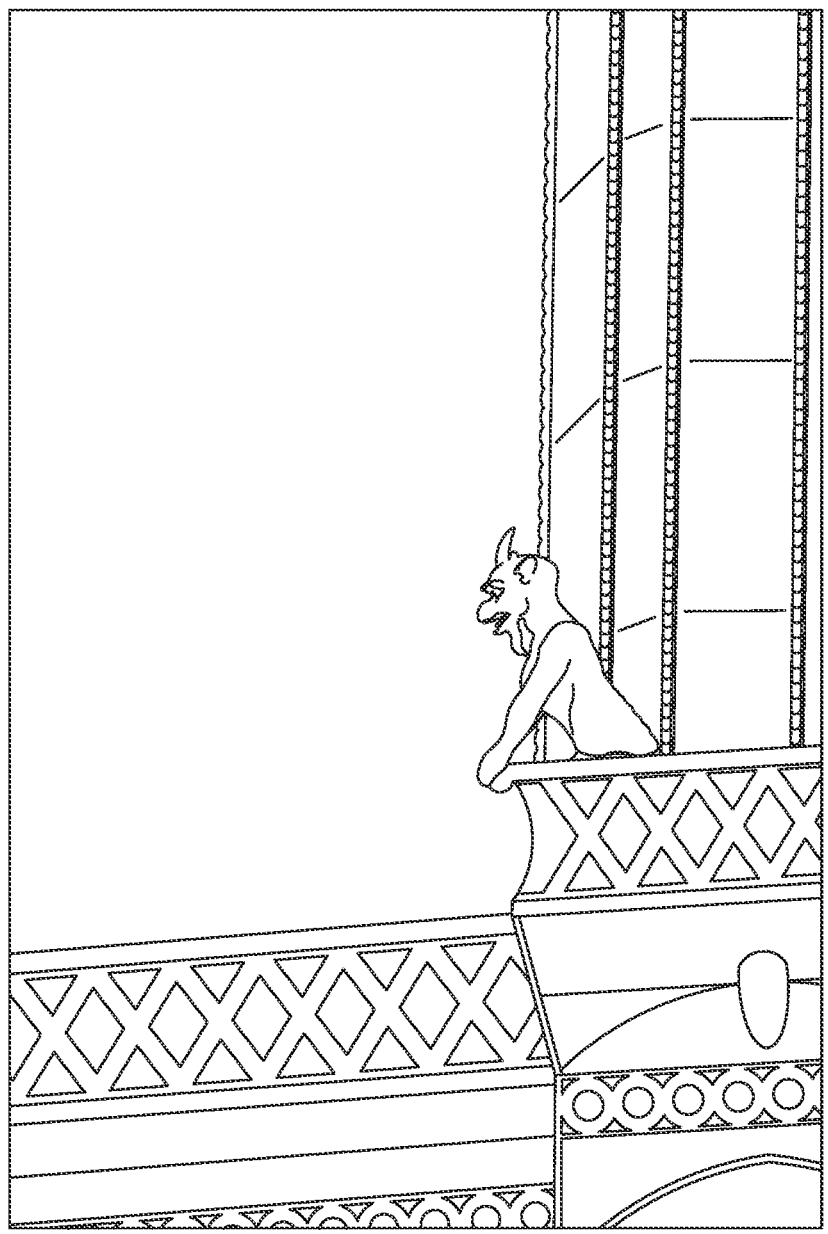
FIG. 11F is a schematic view of an image captured by a telephoto camera module according to the 11th embodiment in FIG. 11A.

FIG. 11F is a schematic view of an image captured by the telephoto camera module 1104 according to the 11th embodiment in FIG. 11A. In FIG. 11F, a far image can be captured and enlarged to a high magnification via the telephoto camera module 1104, and the telephoto camera module 1104 has a function for a high magnification.

In FIG. 11D to FIG. 11F, when an image is captured via the camera module 1101 having various focal lengths and processed via a technology of an image processing, a zoom function of the electronic device 1100 can be achieved.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. An imaging lens assembly module, comprising:
   an imaging lens element set comprising a plurality of lens elements, and having an optical axis;
   a lens carrier, wherein at least one lens element of the lens elements is disposed in the lens carrier;
   a light blocking structure located on an image side of the at least one lens element, and comprising:

a light blocking opening, the optical axis passing through the light blocking opening, and the light blocking opening comprising:
at least two arc portions, wherein each of the at least two arc portions has a first curvature radius, and the first curvature radius is for defining a maximum diameter of the light blocking opening; and
a shrinking portion connected to the at least two arc portions for forming the light blocking opening into a non-circular shape, wherein the shrinking portion comprises at least one protruding arc extending and shrinking gradually from the shrinking portion to the optical axis, and the at least one protruding arc has a second curvature radius; and
at least one reflecting element located on at least one side of an object side and an image side of the imaging lens element set;
wherein the maximum diameter of the light blocking opening is D, the second curvature radius of the protruding arc is R, and the following condition is satisfied:

$0.01 < R/D < 3$.

2. The imaging lens assembly module of claim 1, wherein the light blocking structure is an aperture stop of the imaging lens assembly module for controlling an amount of an incident light of the imaging lens assembly module.

3. The imaging lens assembly module of claim 1, wherein the maximum diameter of the light blocking opening is D, a minimum distance between the protruding arc and a center of the light blocking opening is dmin, and the following condition is satisfied:

$0.20 < d\text{min}/D < 0.45$.

4. The imaging lens assembly module of claim 3, wherein the maximum diameter of the light blocking opening is D, the minimum distance between the protruding arc and the center of the light blocking opening is dmin, and the following condition is satisfied:

$0.25 < d\text{min}/D < 0.40$.

5. The imaging lens assembly module of claim 1, wherein the light blocking structure is a light blocking sheet mounted on the lens carrier.

6. The imaging lens assembly module of claim 1, wherein the light blocking structure is a black plastic element and comprises at least two gate traces.

7. The imaging lens assembly module of claim 6, wherein the light blocking structure and the lens carrier are made of plastic material and formed integrally.

8. The imaging lens assembly module of claim 1, wherein a number of the lens elements of the imaging lens element set is N, and the following condition is satisfied:

$3 \leq N \leq 8$.

9. The imaging lens assembly module of claim 1, wherein a maximum field of view of the imaging lens assembly module is FOV, and the following condition is satisfied:

3 degrees $\leq FOV \leq$ 40 degrees.

10. The imaging lens assembly module of claim 1, further comprising:
a driving device for driving the imaging lens element set and the light blocking structure to move simultaneously along at least one direction.

11. An imaging lens assembly module, comprising:
an imaging lens element set comprising a plurality of lens elements, and having an optical axis;
a lens carrier, wherein at least one lens element of the lens elements is disposed in the lens carrier;
a light blocking structure located on an image side of the at least one lens element, and comprising:
a light blocking opening, the optical axis passing through the light blocking opening, and the light blocking opening comprising:
at least two arc portions, wherein each of the at least two arc portions has a first curvature radius, and the first curvature radius is for defining a maximum diameter of the light blocking opening; and
a shrinking portion connected to the at least two arc portions and comprising at least one protruding arc, wherein the at least one protruding arc extends and shrinks gradually from the shrinking portion to the optical axis, and the at least one protruding arc has a second curvature radius; and
at least one reflecting element located on at least one side of an object side and an image side of the imaging lens element set;
wherein the maximum diameter of the light blocking opening is D, a cross-sectional area of the light blocking opening is A, and the following condition is satisfied:

$0.30 < A/[\pi \times (D/2)^2] < 0.95$, wherein $\pi$ is a ratio of a circumference of a circle to a diameter of the circle.

12. The imaging lens assembly module of claim 11, wherein the maximum diameter of the light blocking opening is D, the cross-sectional area of the light blocking opening is A, and the following condition is satisfied:

$0.50 < A/[\pi \times (D/2)^2] < 0.90$, wherein $\pi$ is the ratio of the circumference of the circle to the diameter of the circle.

13. The imaging lens assembly module of claim 11, wherein the maximum diameter of the light blocking opening is D, the second curvature radius of the protruding arc is R, and the following condition is satisfied:

$0.01 < R/D < 3$.

14. The imaging lens assembly module of claim 11, wherein the maximum diameter of the light blocking opening is D, a minimum distance between the protruding arc and a center of the light blocking opening is dmin, and the following condition is satisfied:

$0.20 < d\text{min}/D < 0.45$.

15. The imaging lens assembly module of claim 14, wherein the diameter of the light blocking opening is D, the minimum distance between the protruding arc and the center of the light blocking opening is dmin, and the following condition is satisfied:

$0.25 < d\text{min}/D < 0.40$.

16. The imaging lens assembly module of claim 11, wherein a maximum field of view of the imaging lens assembly module is FOV, and the following condition is satisfied:

3 degrees $\leq FOV \leq$ 40 degrees.

17. The imaging lens assembly module of claim 11, further comprising:
a driving device for driving the imaging lens element set and the light blocking structure to move simultaneously along at least one direction.

18. A camera module, comprising:
the imaging lens assembly module of claim 11; and
an image sensor disposed on an image surface of the imaging lens assembly module.

19. An electronic device, comprising:
the camera module of claim 18.

* * * * *